Sept. 28, 1954 H. L. READ 2,690,297
COMBINED RECORD SORTING AND ACCOUNTING MACHINE
Filed May 7, 1951 45 Sheets-Sheet 1

INVENTOR.
HAROLD L. READ
BY
*J. W. Lomnitzer*
ATTORNEY

Sept. 28, 1954     H. L. READ     2,690,297
COMBINED RECORD SORTING AND ACCOUNTING MACHINE
Filed May 7, 1951     45 Sheets-Sheet 2
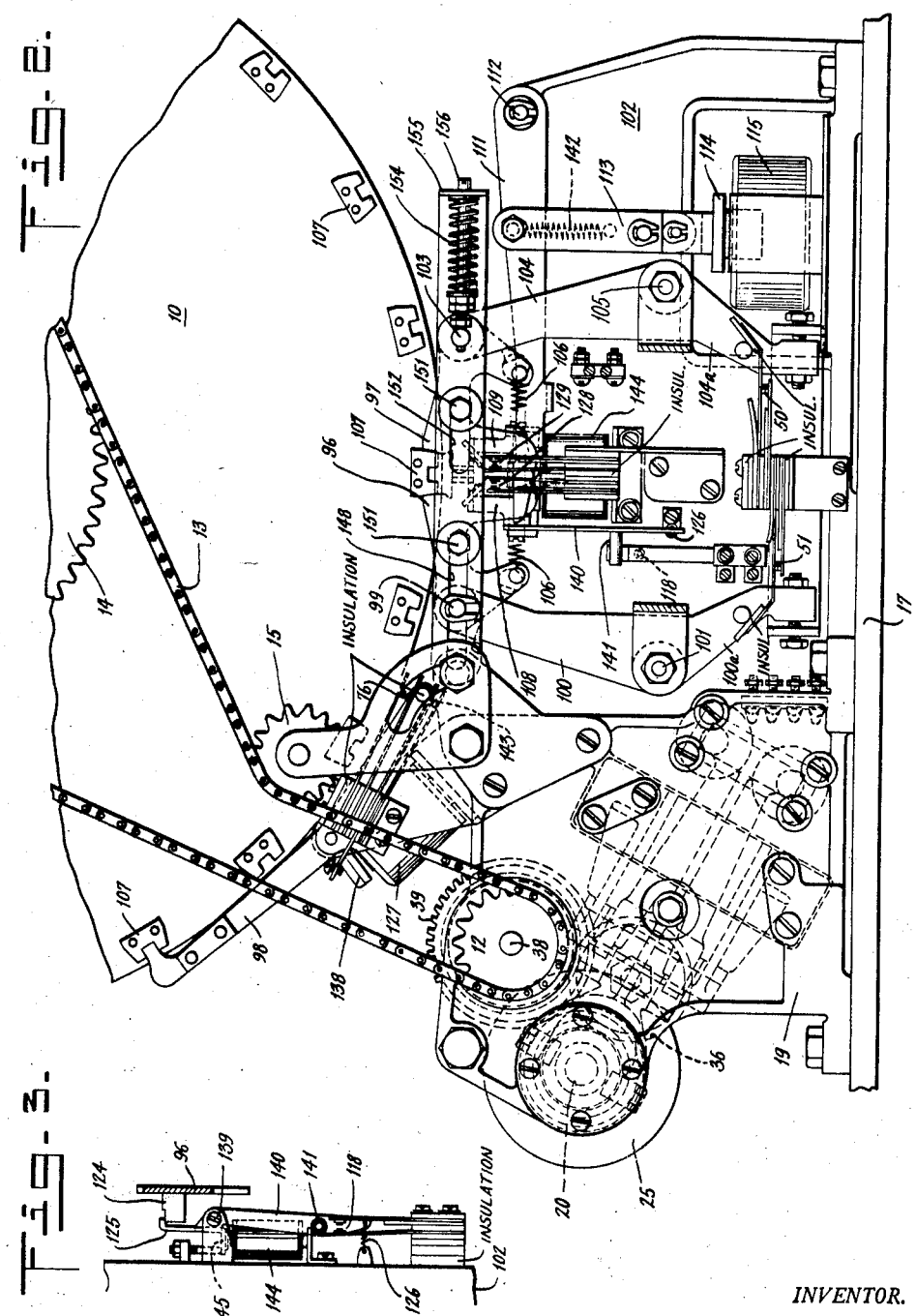
INVENTOR.
HAROLD L. READ
BY
*J. W. Lomnitzer*
ATTORNEY Sept. 28, 1954            H. L. READ            2,690,297
COMBINED RECORD SORTING AND ACCOUNTING MACHINE
Filed May 7, 1951            45 Sheets-Sheet 3
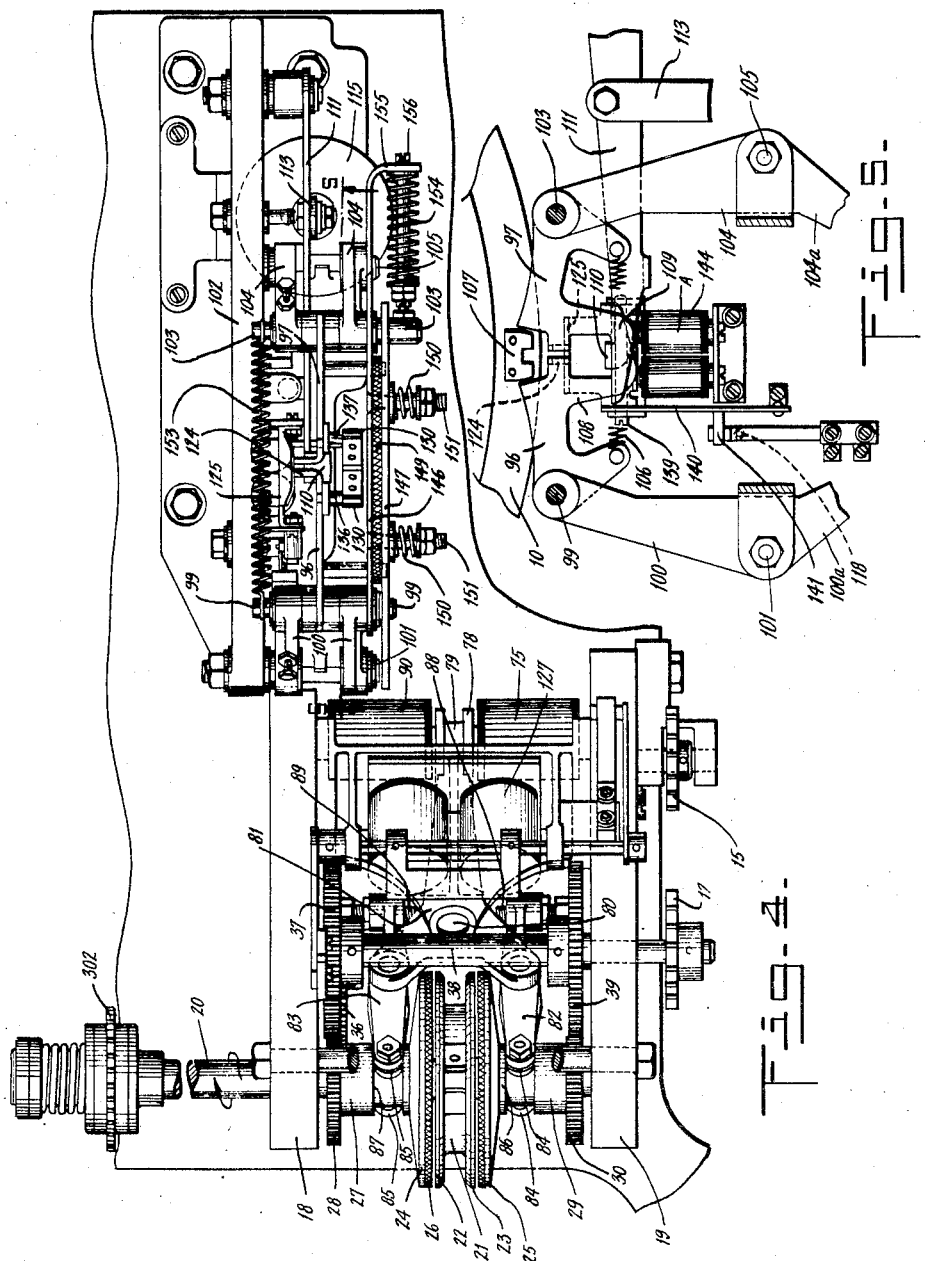
INVENTOR.
HAROLD L. READ
BY
*J. W. Lomnitzer*
ATTORNEY

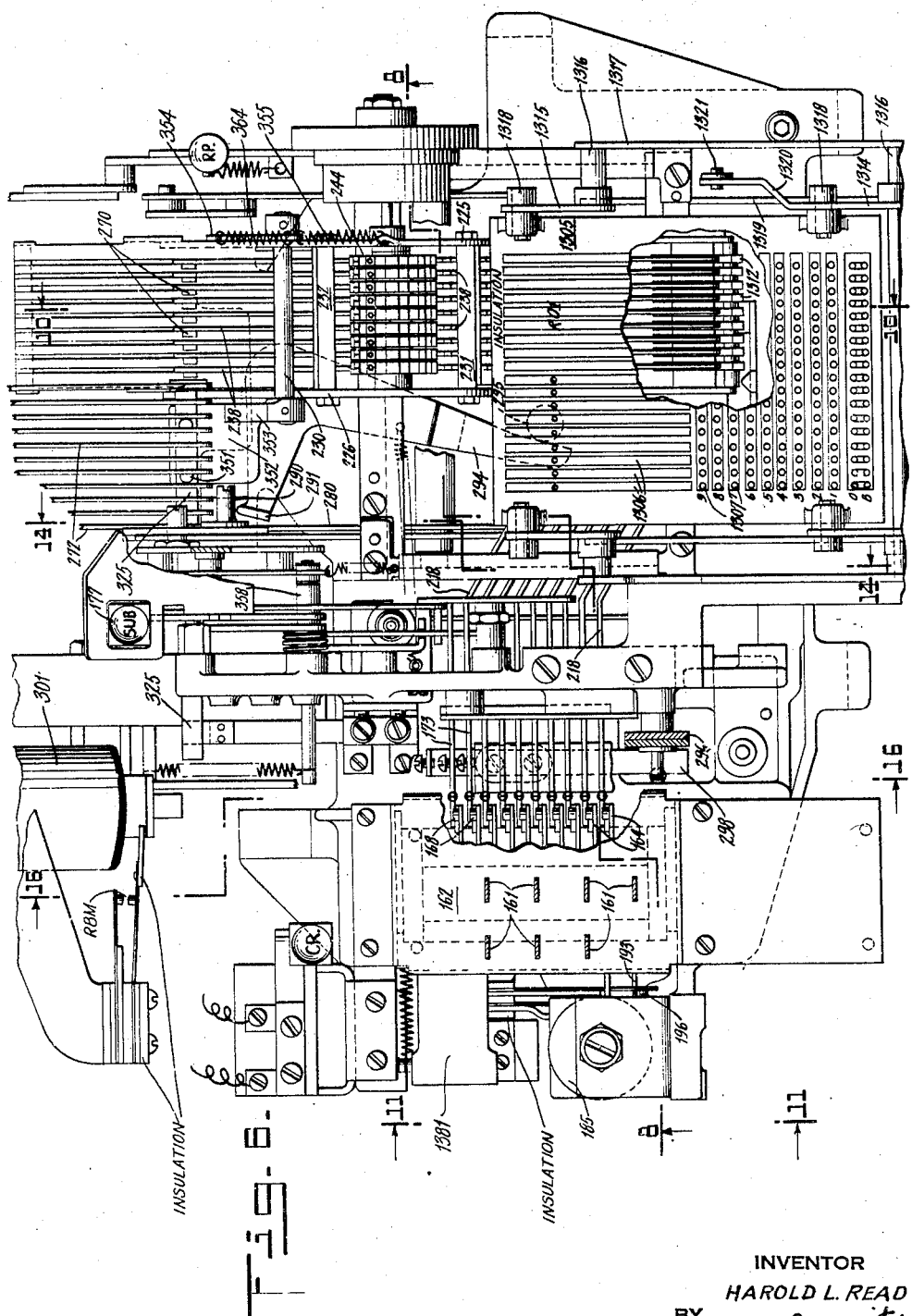

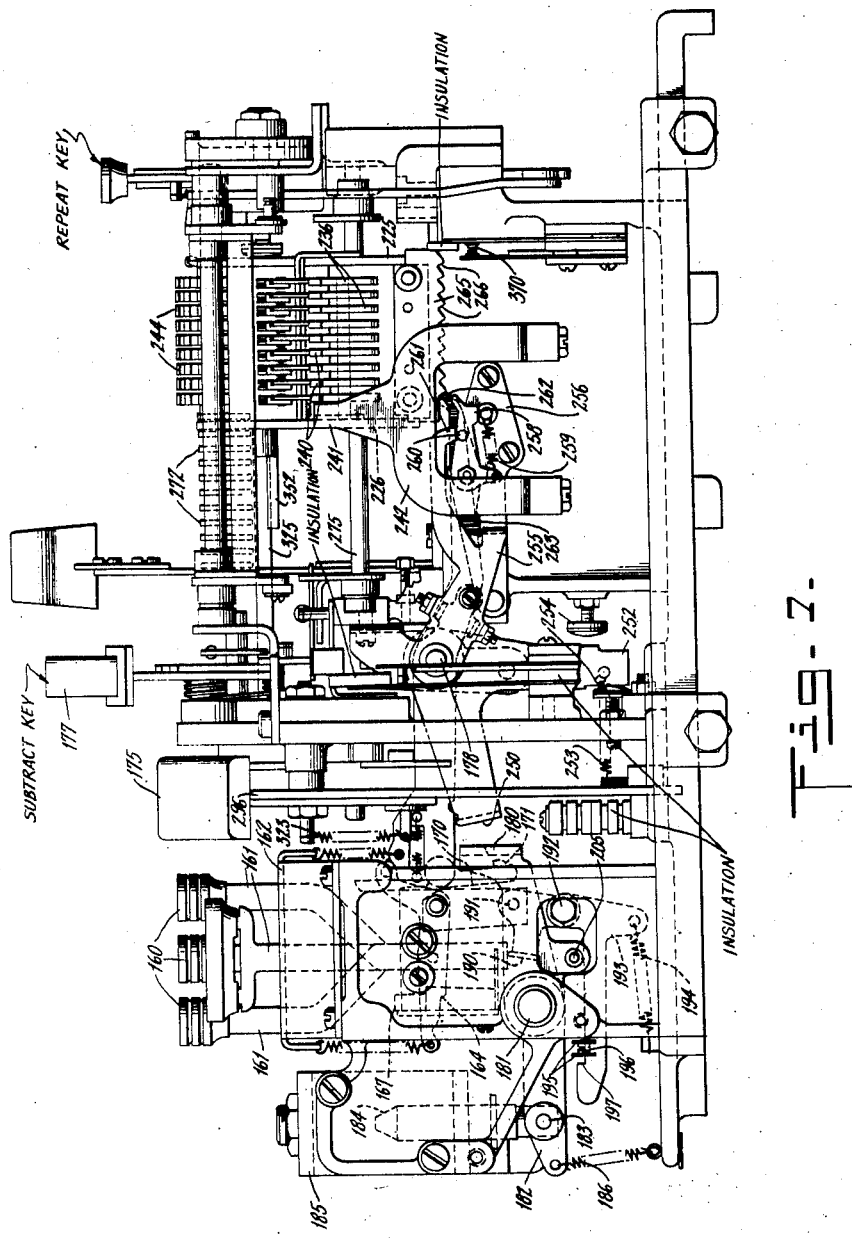

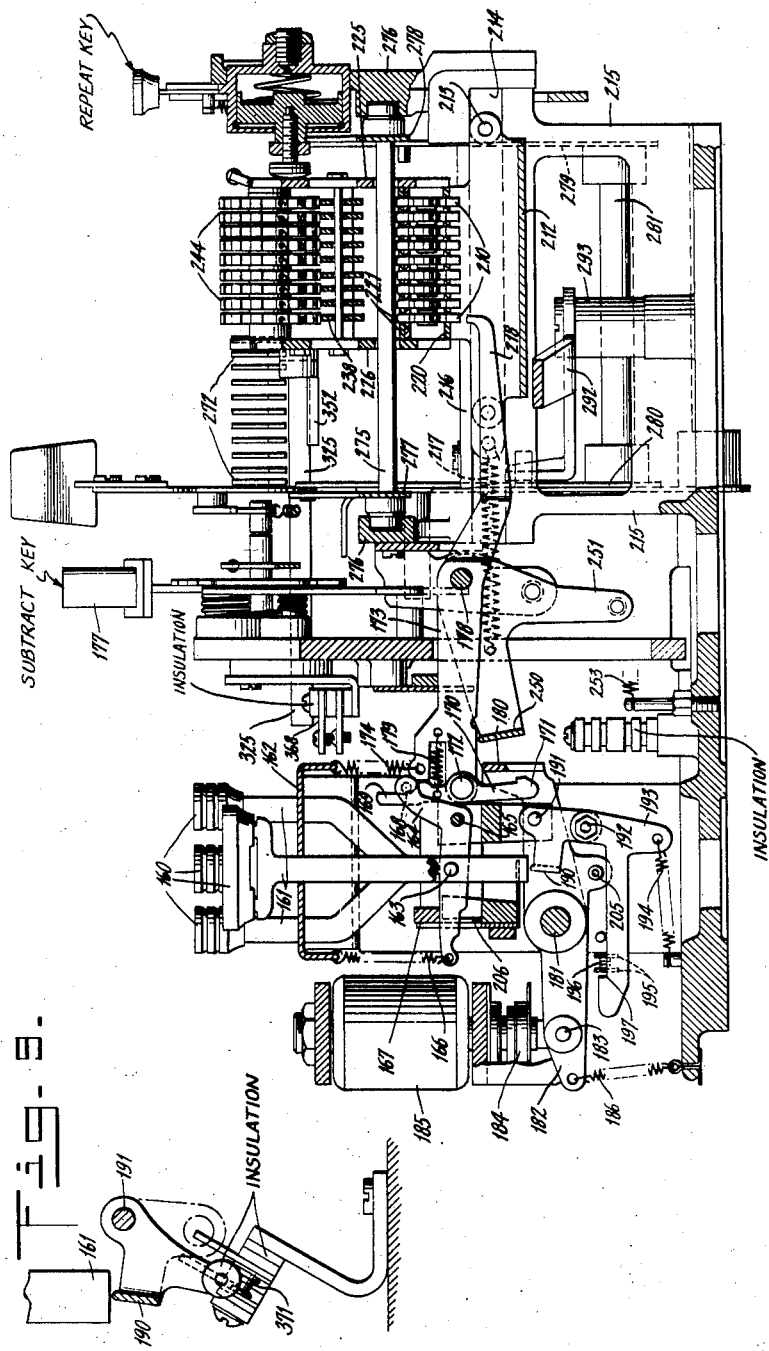

Sept. 28, 1954
H. L. READ
2,690,297
COMBINED RECORD SORTING AND ACCOUNTING MACHINE
Filed May 7, 1951
45 Sheets-Sheet 7
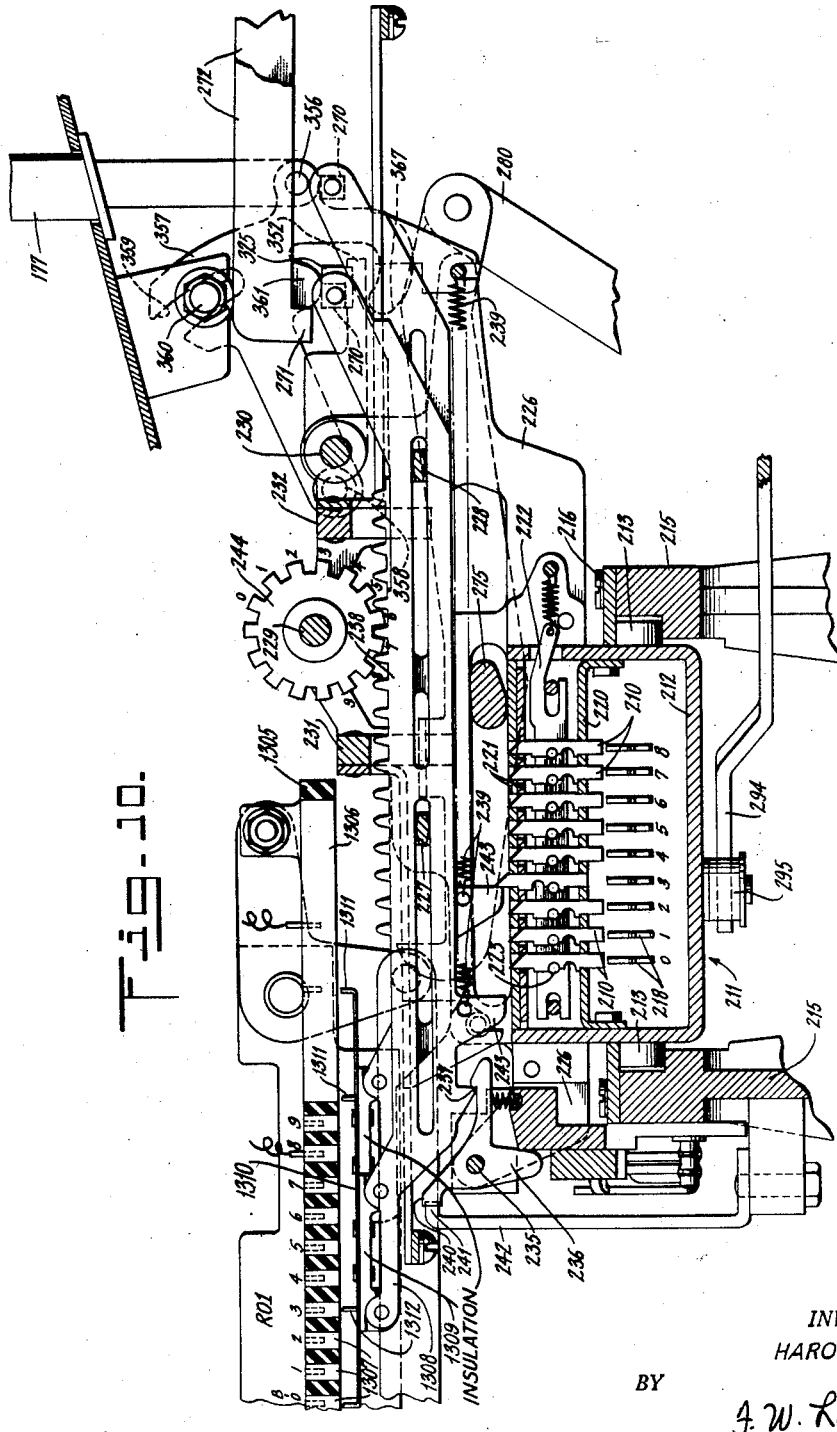
INVENTOR.
HAROLD L. READ
BY
J. W. Lounitzer
ATTORNEY

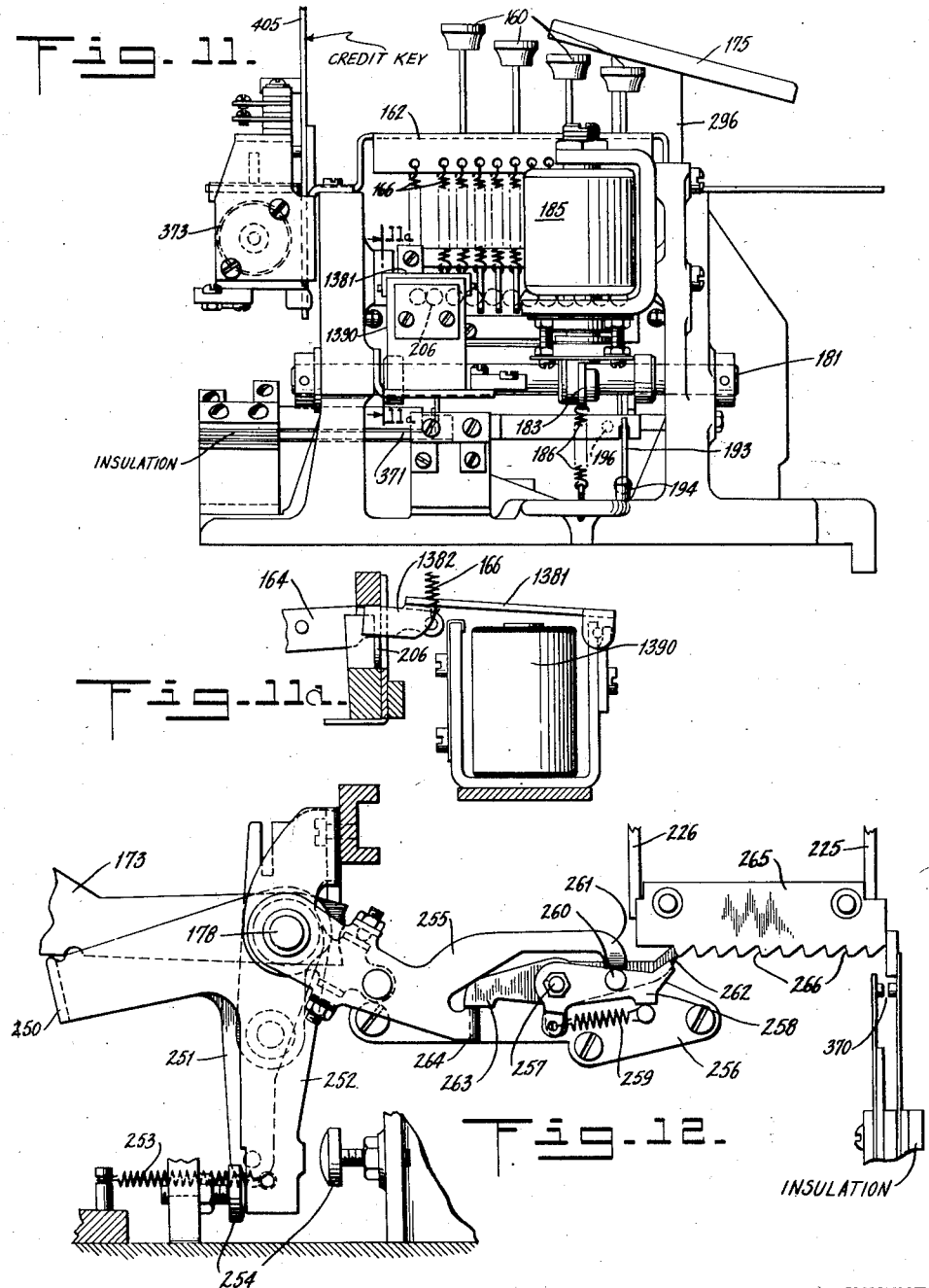

Sept. 28, 1954     H. L. READ     2,690,297
COMBINED RECORD SORTING AND ACCOUNTING MACHINE
Filed May 7, 1951     45 Sheets-Sheet 9
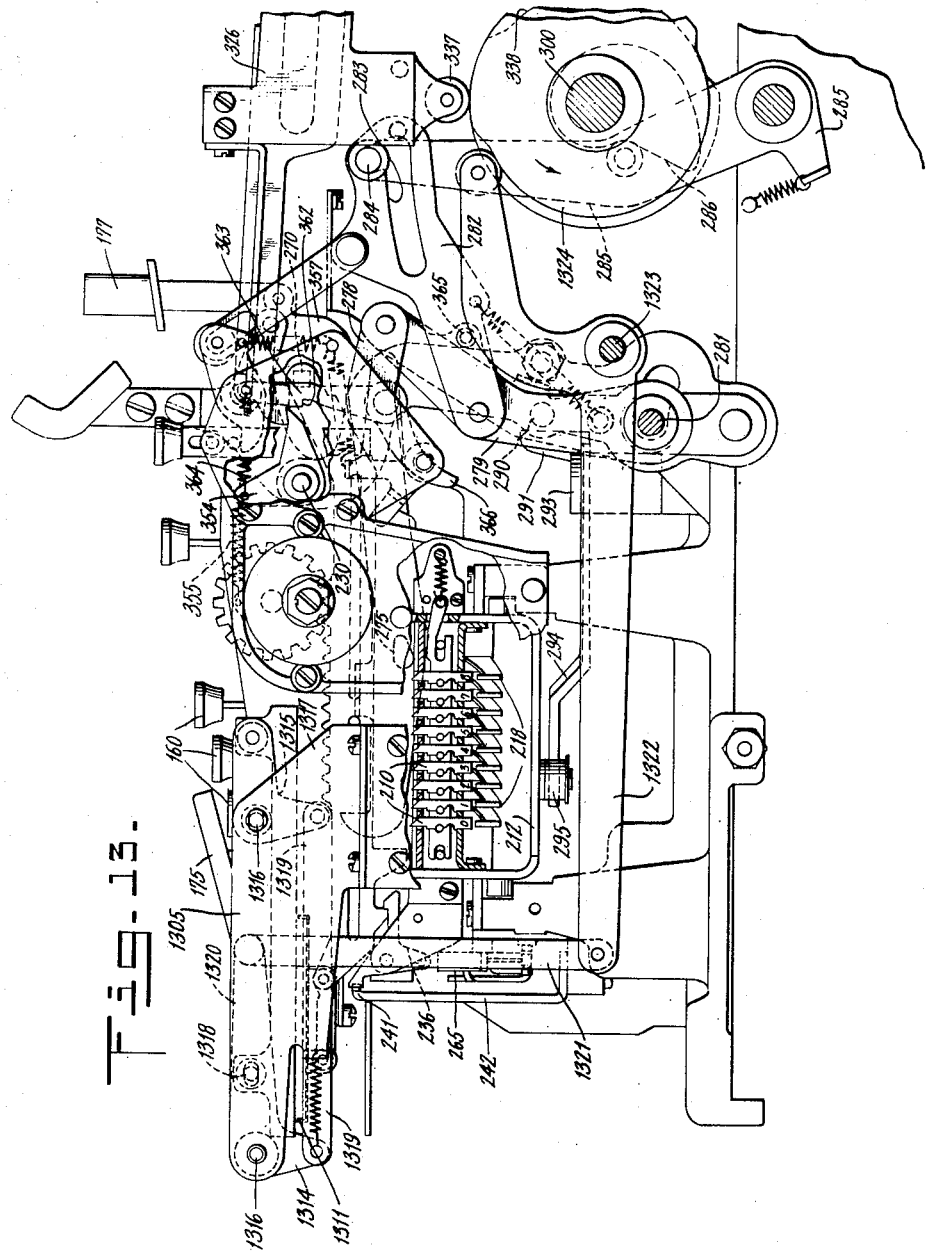
INVENTOR.
HAROLD L. READ
BY
*A. W. Lomnitzer*
ATTORNEY

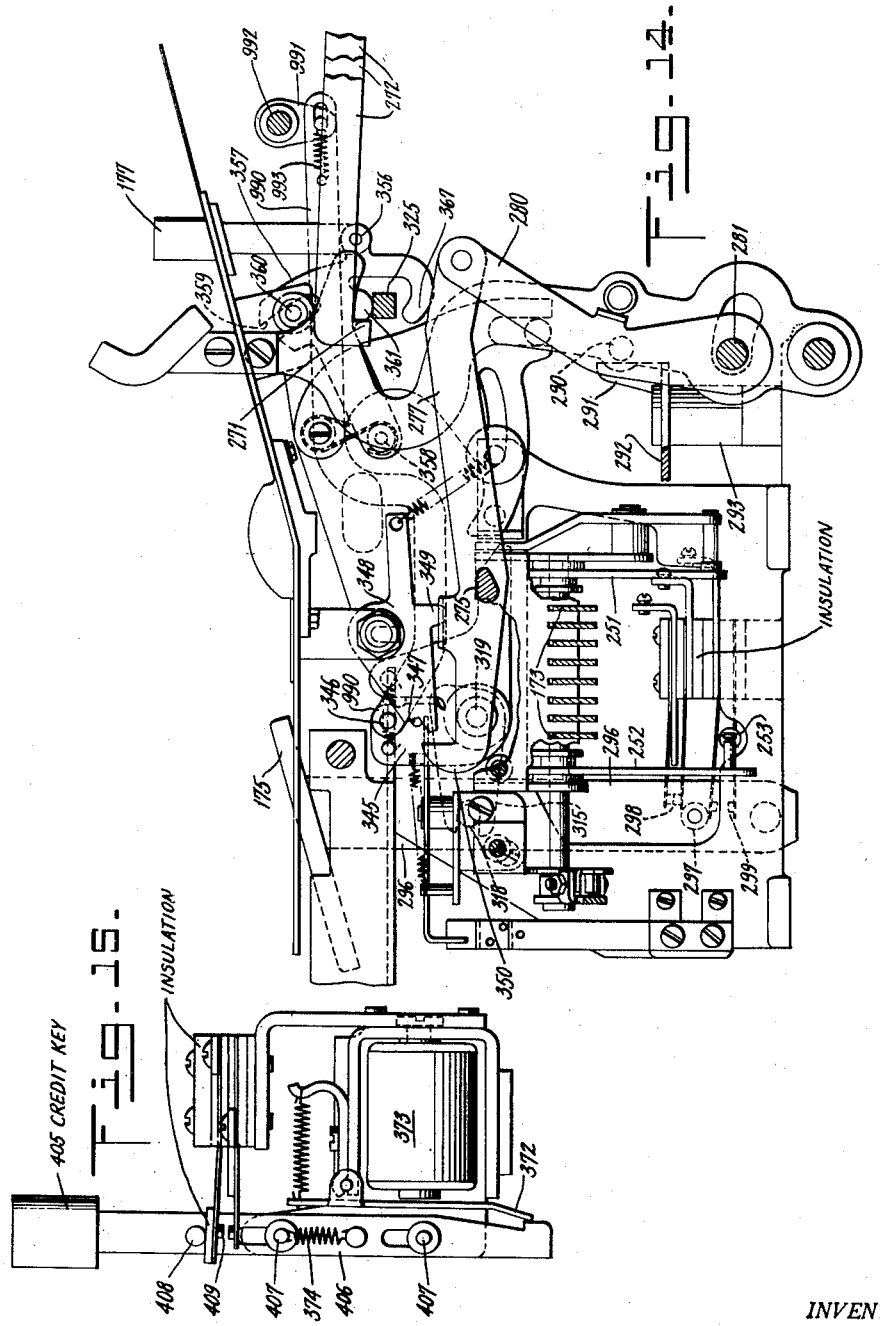

Sept. 28, 1954 H. L. READ 2,690,297
COMBINED RECORD SORTING AND ACCOUNTING MACHINE
Filed May 7, 1951 45 Sheets-Sheet 11
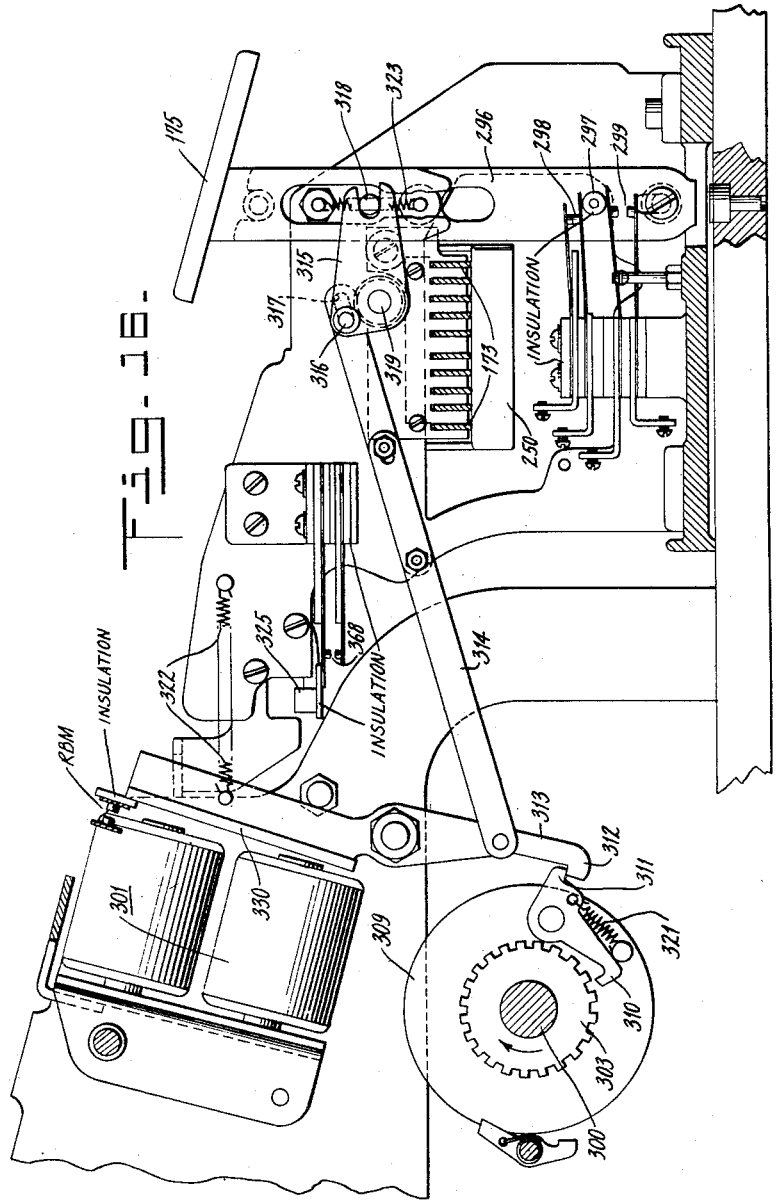
INVENTOR.
HAROLD L. READ
BY
*J. W. Lomnitzer*
ATTORNEY

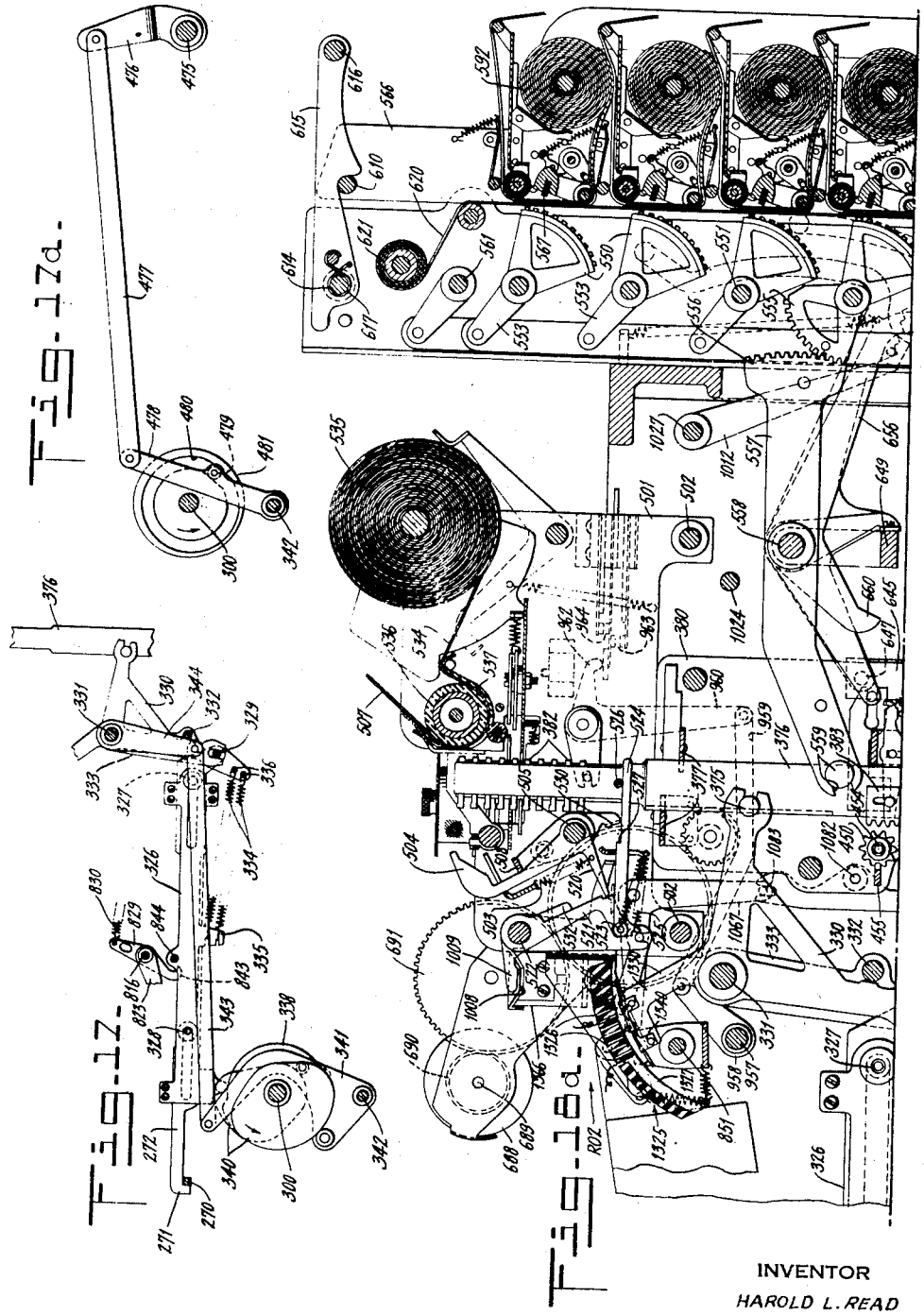

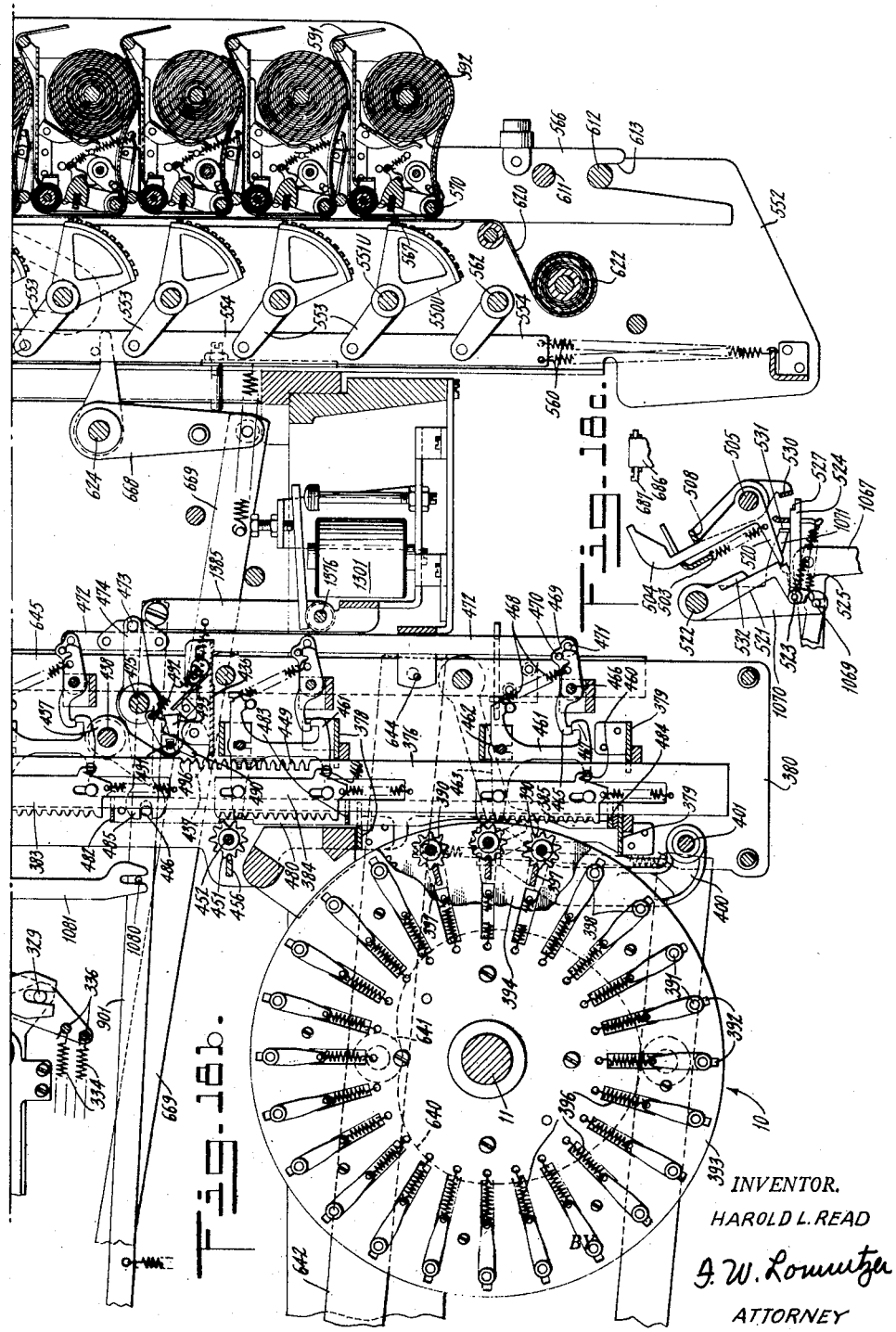

Sept. 28, 1954          H. L. READ          2,690,297
COMBINED RECORD SORTING AND ACCOUNTING MACHINE
Filed May 7, 1951          45 Sheets-Sheet 14
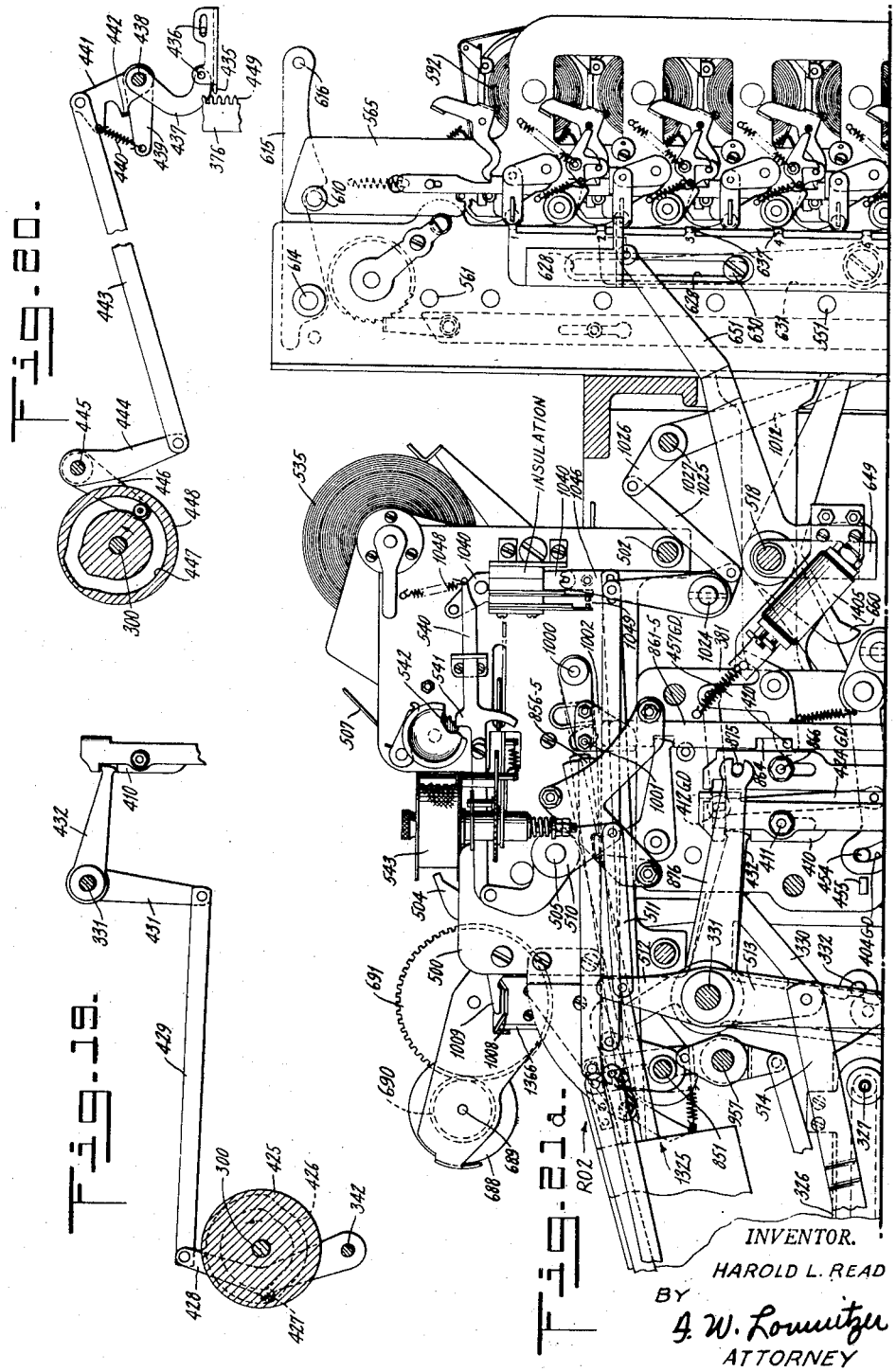
INVENTOR.
HAROLD L. READ
BY
*J. W. Lomnitzer*
ATTORNEY

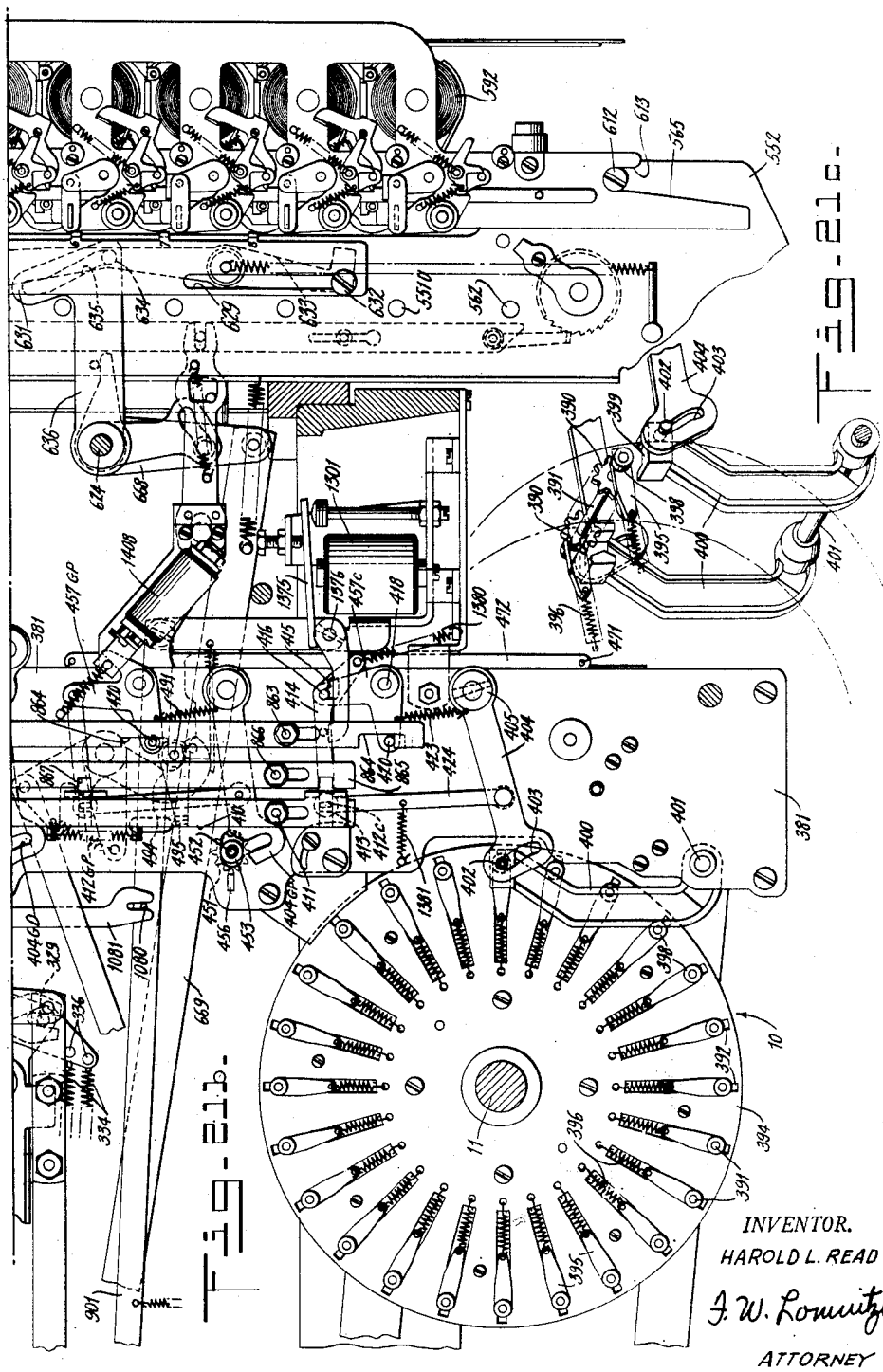

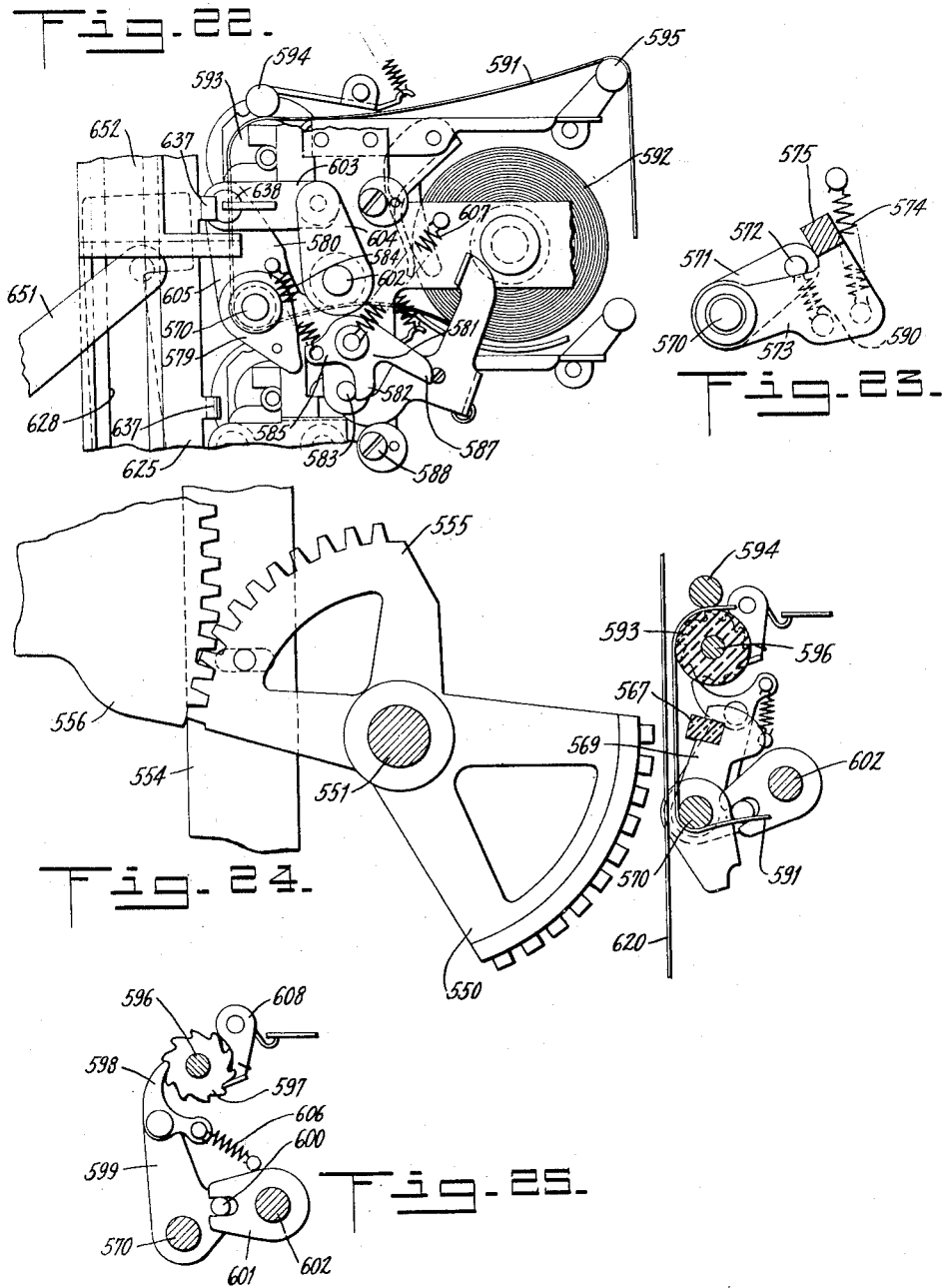

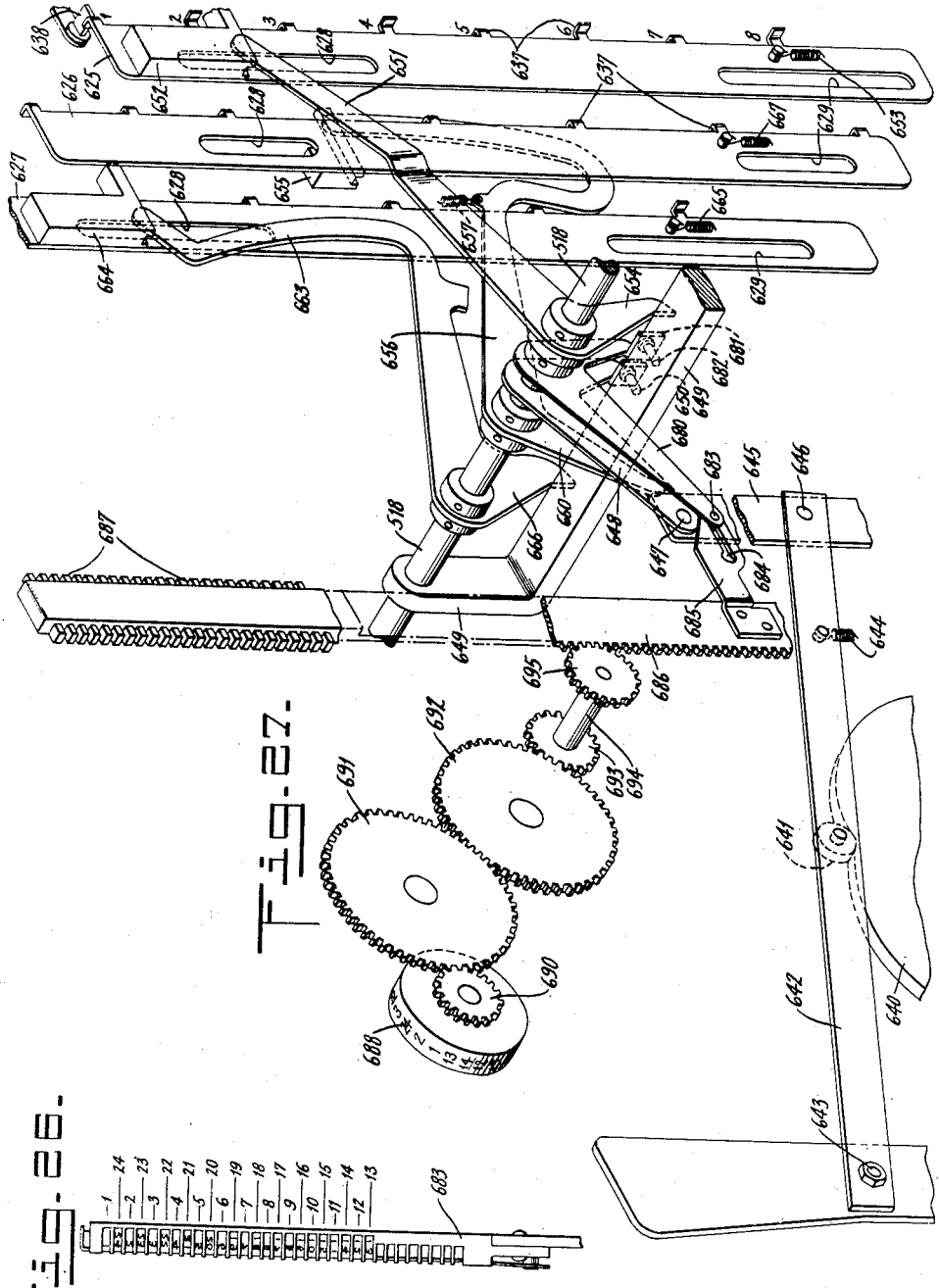

Sept. 28, 1954  H. L. READ  2,690,297
COMBINED RECORD SORTING AND ACCOUNTING MACHINE
Filed May 7, 1951  45 Sheets-Sheet 18
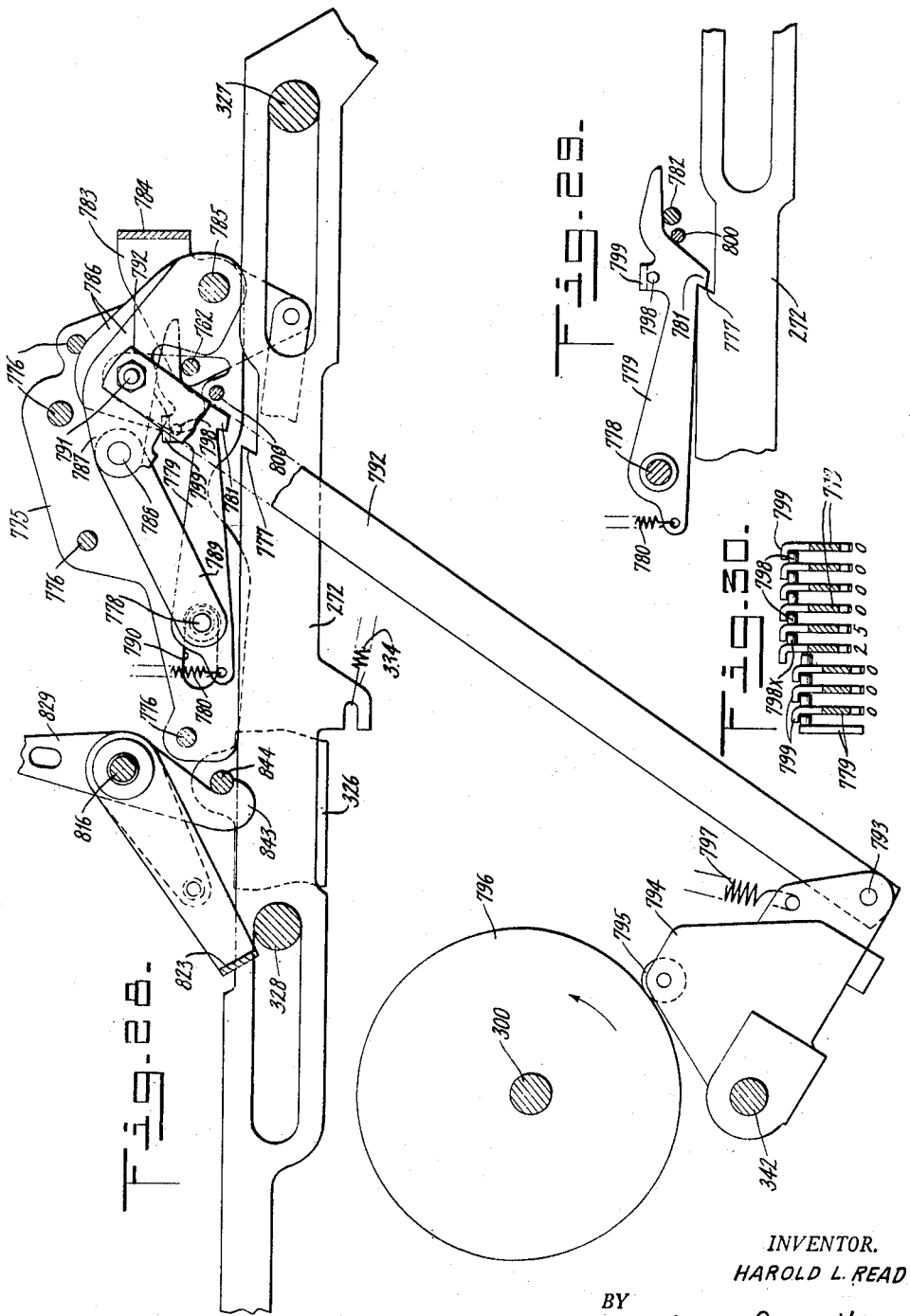
INVENTOR.
HAROLD L. READ
BY
J. W. Lomnitzer
ATTORNEY Sept. 28, 1954     H. L. READ     2,690,297
COMBINED RECORD SORTING AND ACCOUNTING MACHINE
Filed May 7, 1951     45 Sheets-Sheet 19

INVENTOR
HAROLD L. READ
BY
*J. W. Lonnitzer*
ATTORNEY

Sept. 28, 1954  H. L. READ  2,690,297
COMBINED RECORD SORTING AND ACCOUNTING MACHINE
Filed May 7, 1951  45 Sheets-Sheet 20

INVENTOR
HAROLD L. READ
BY
*J. W. Lomnitzer*
ATTORNEY

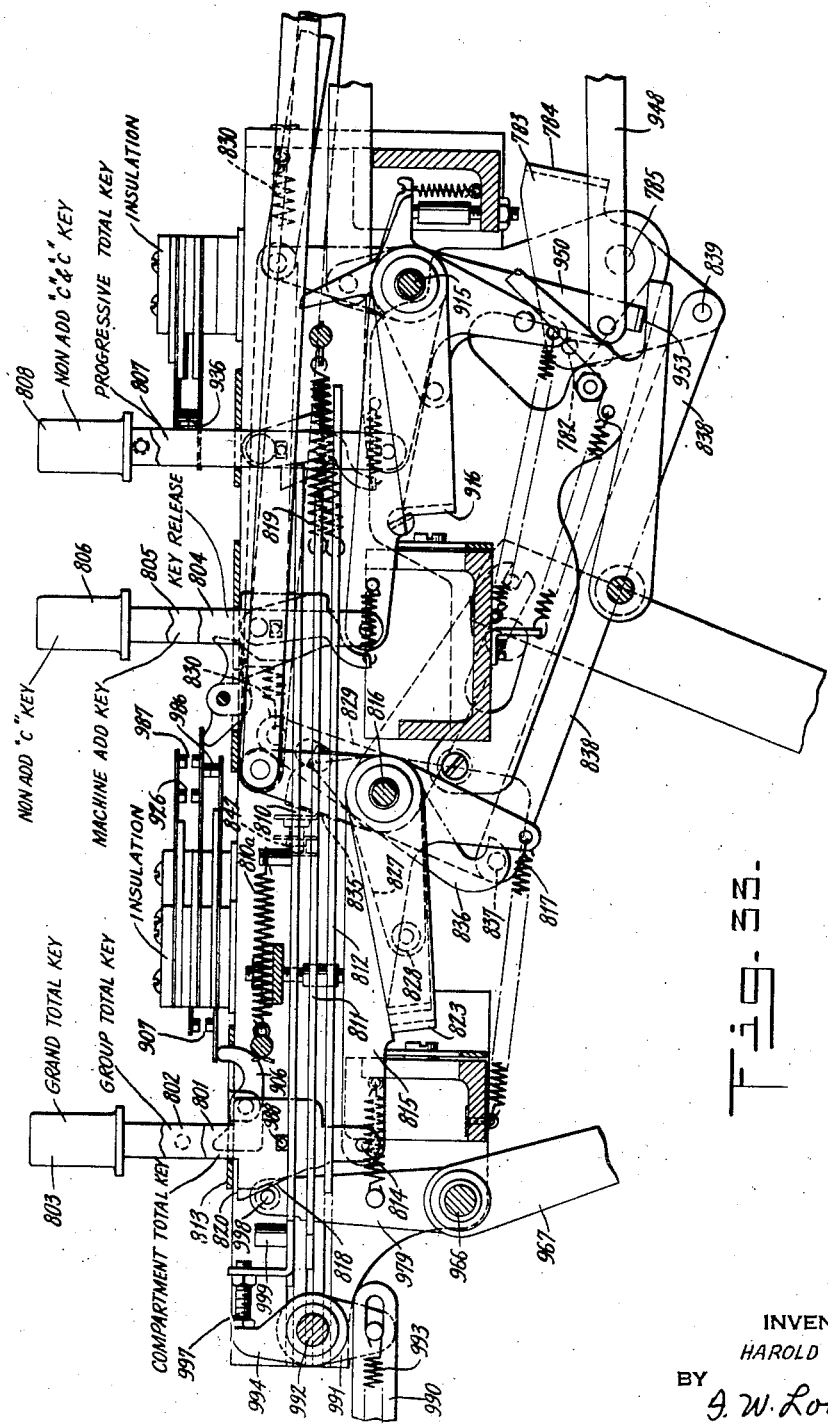

Sept. 28, 1954  H. L. READ  2,690,297
COMBINED RECORD SORTING AND ACCOUNTING MACHINE
Filed May 7, 1951  45 Sheets-Sheet 22
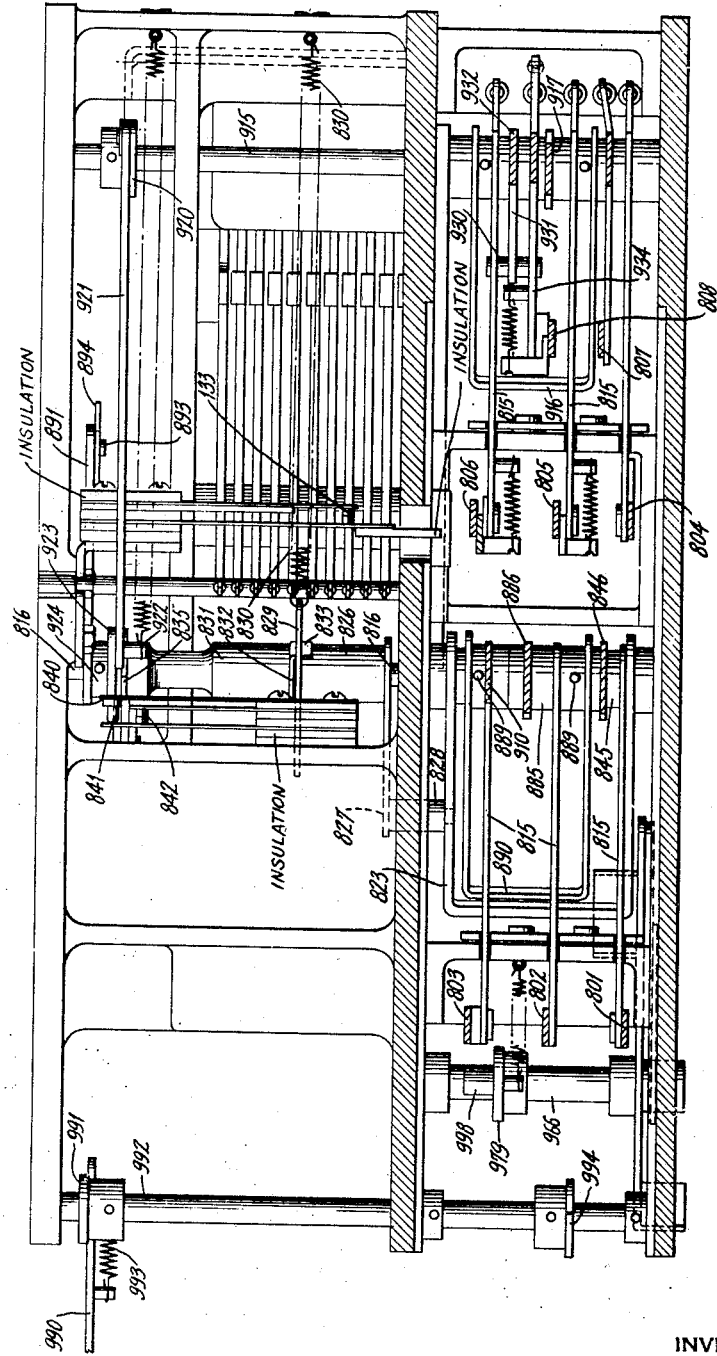
INVENTOR
HAROLD L. READ
BY
J. W. Lownitzer
ATTORNEY

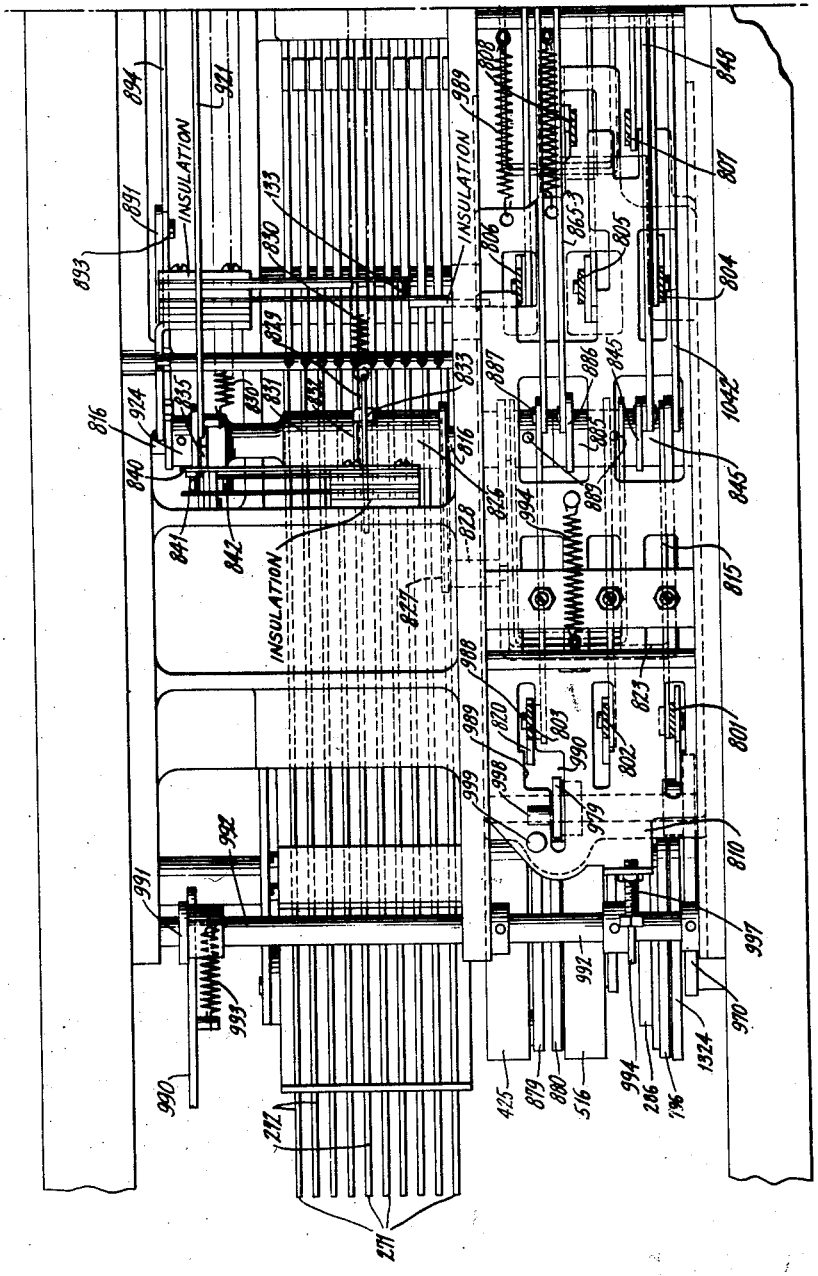

Sept. 28, 1954 H. L. READ 2,690,297
COMBINED RECORD SORTING AND ACCOUNTING MACHINE
Filed May 7, 1951 45 Sheets-Sheet 24

INVENTOR.
HAROLD L. READ
BY G. W. Lomnitz
ATTORNEY

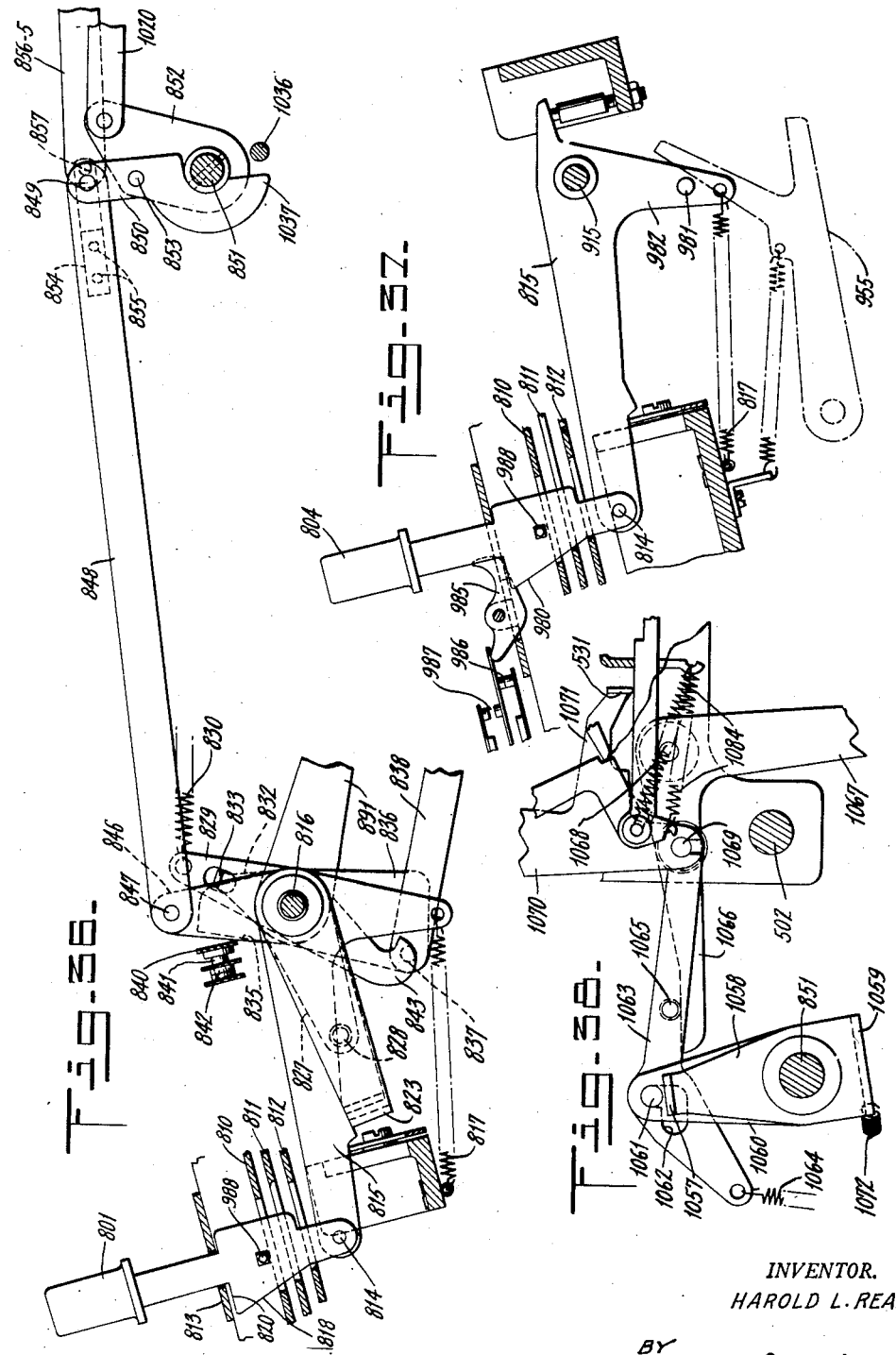

Sept. 28, 1954 H. L. READ 2,690,297
COMBINED RECORD SORTING AND ACCOUNTING MACHINE
Filed May 7, 1951 45 Sheets-Sheet 26
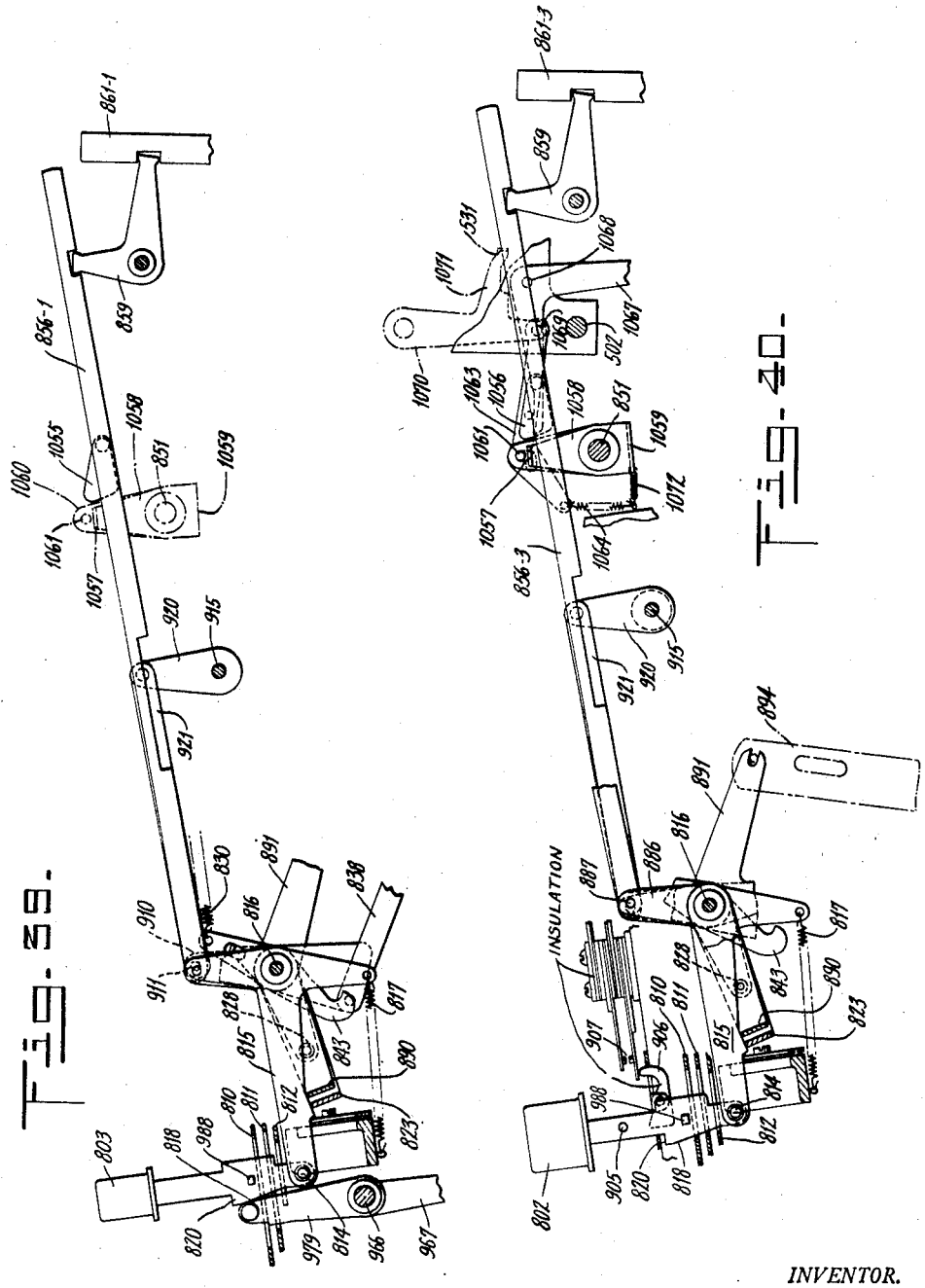
INVENTOR.
HAROLD L. READ
BY
J. W. Lomnitzer
ATTORNEY

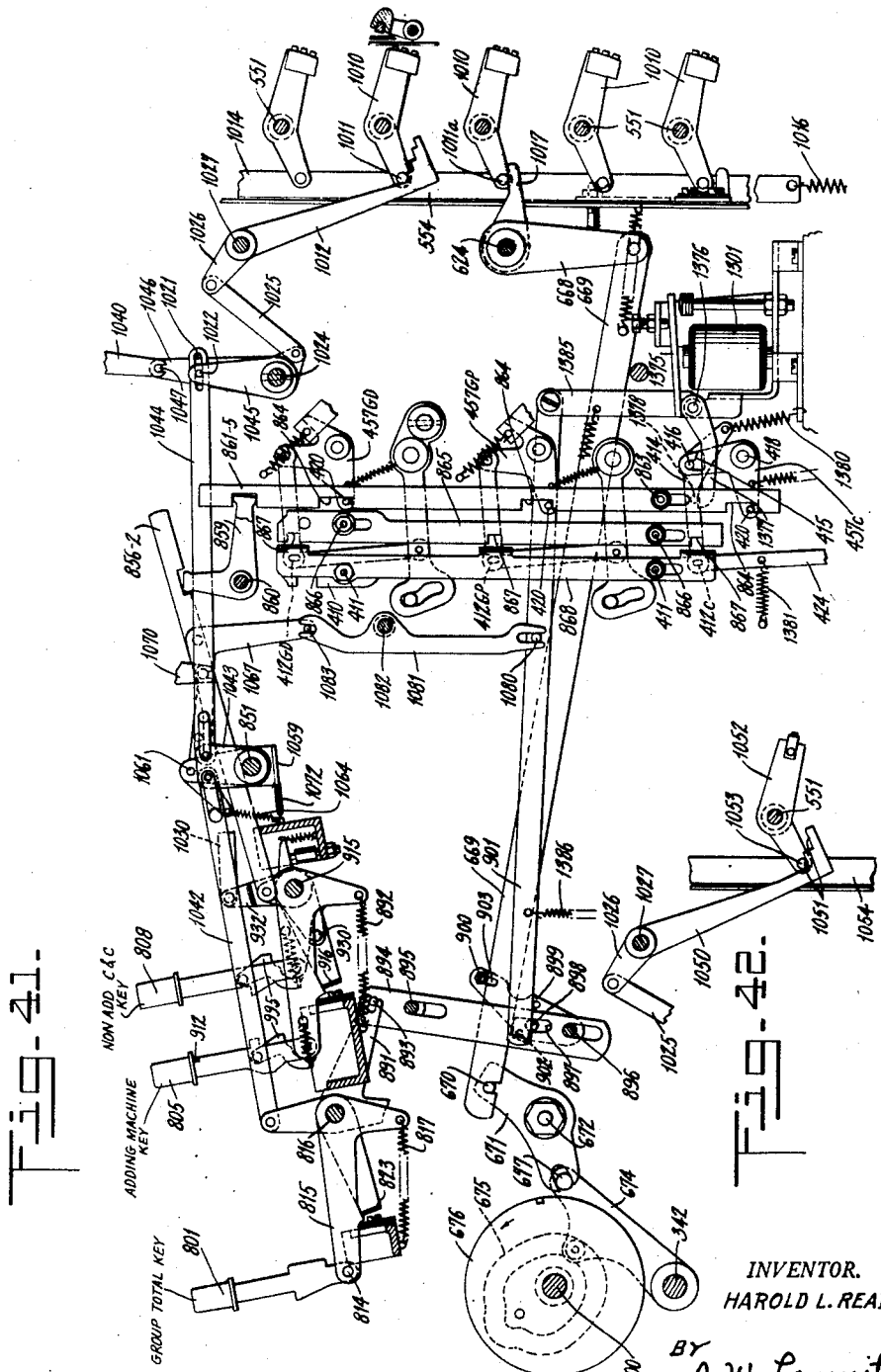

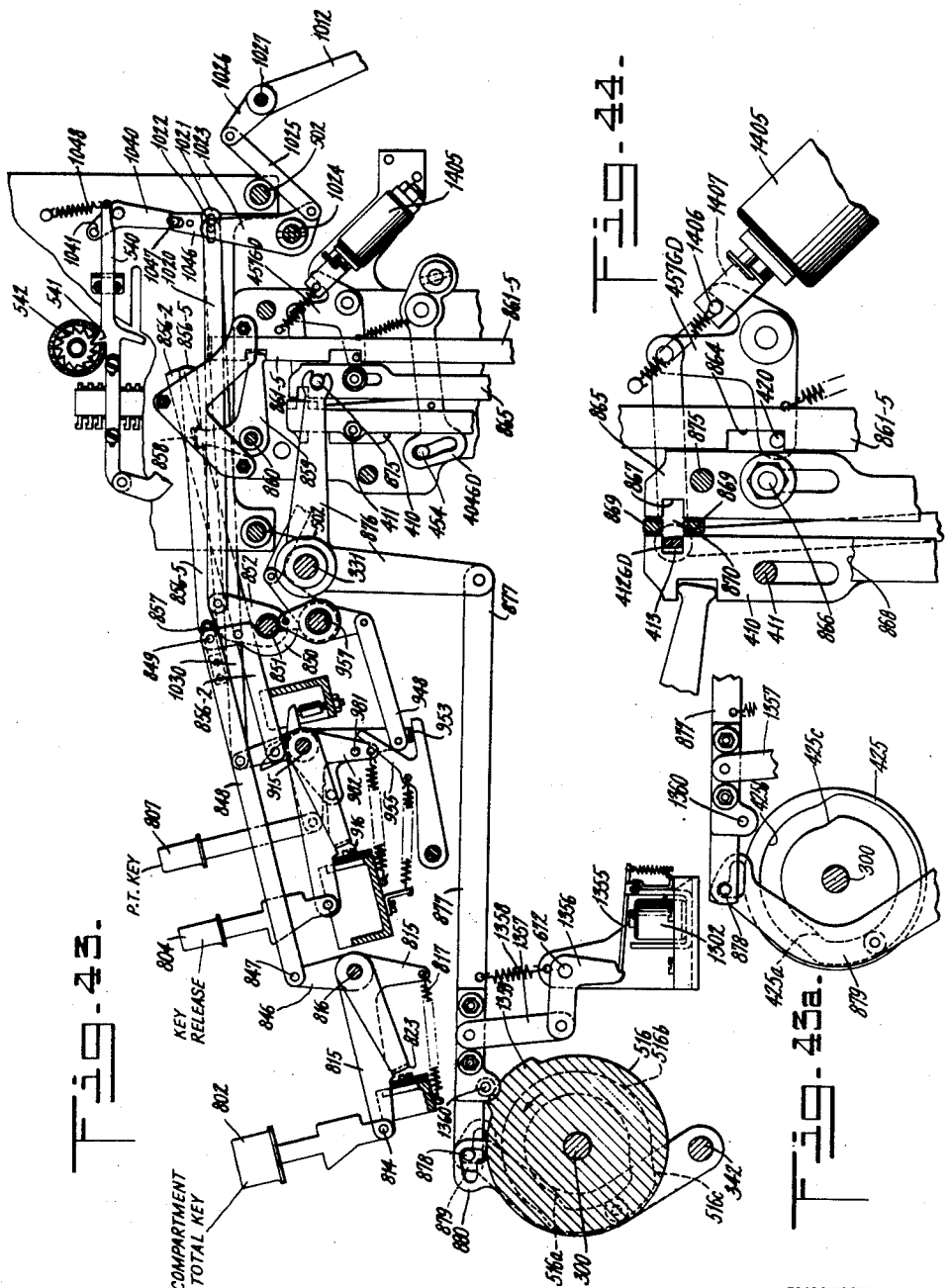
Sept. 28, 1954     H. L. READ     2,690,297
COMBINED RECORD SORTING AND ACCOUNTING MACHINE
Filed May 7, 1951     45 Sheets-Sheet 28
INVENTOR.
HAROLD L. READ
BY
ATTORNEY

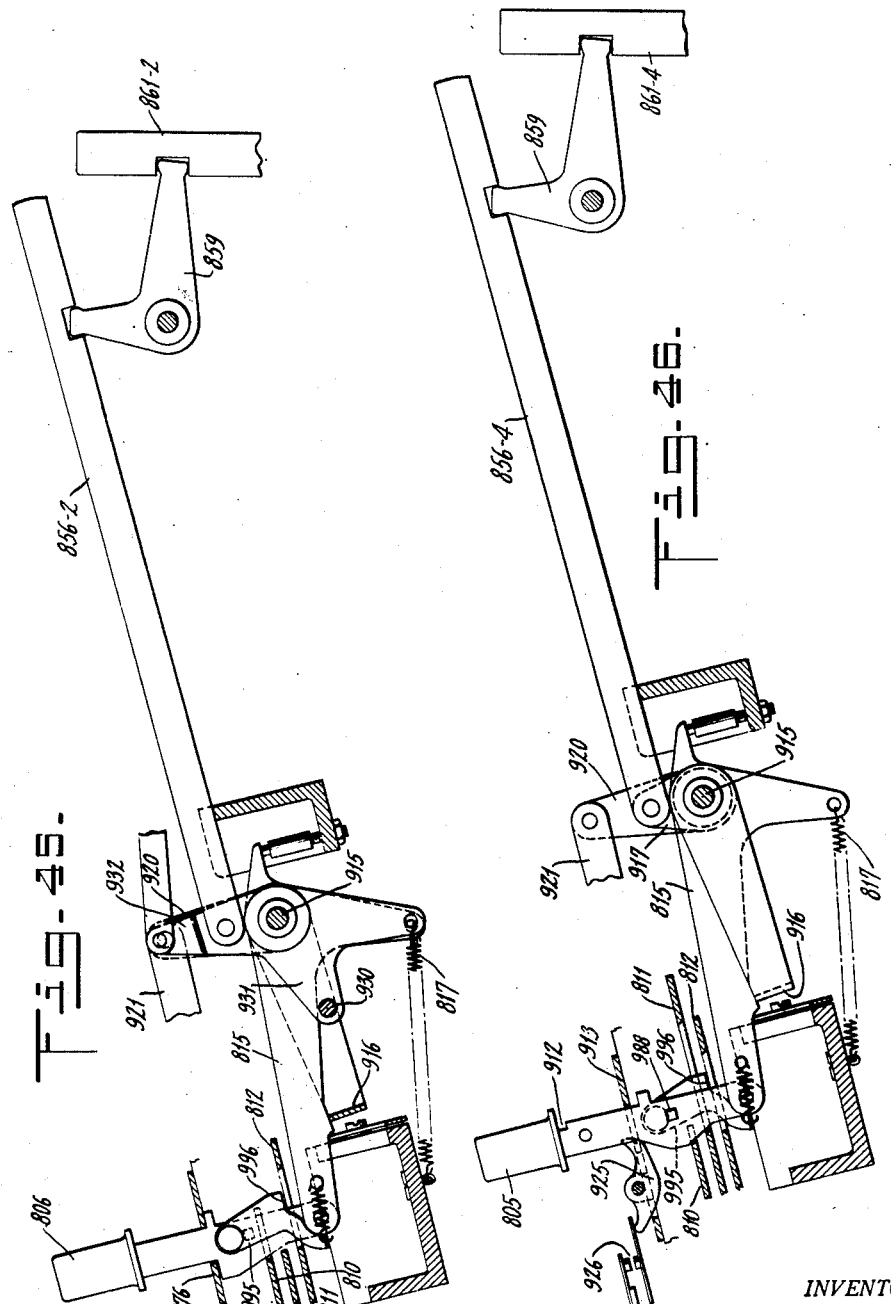

Sept. 28, 1954          H. L. READ                2,690,297
          COMBINED RECORD SORTING AND ACCOUNTING MACHINE
Filed May 7, 1951                              45 Sheets-Sheet 30
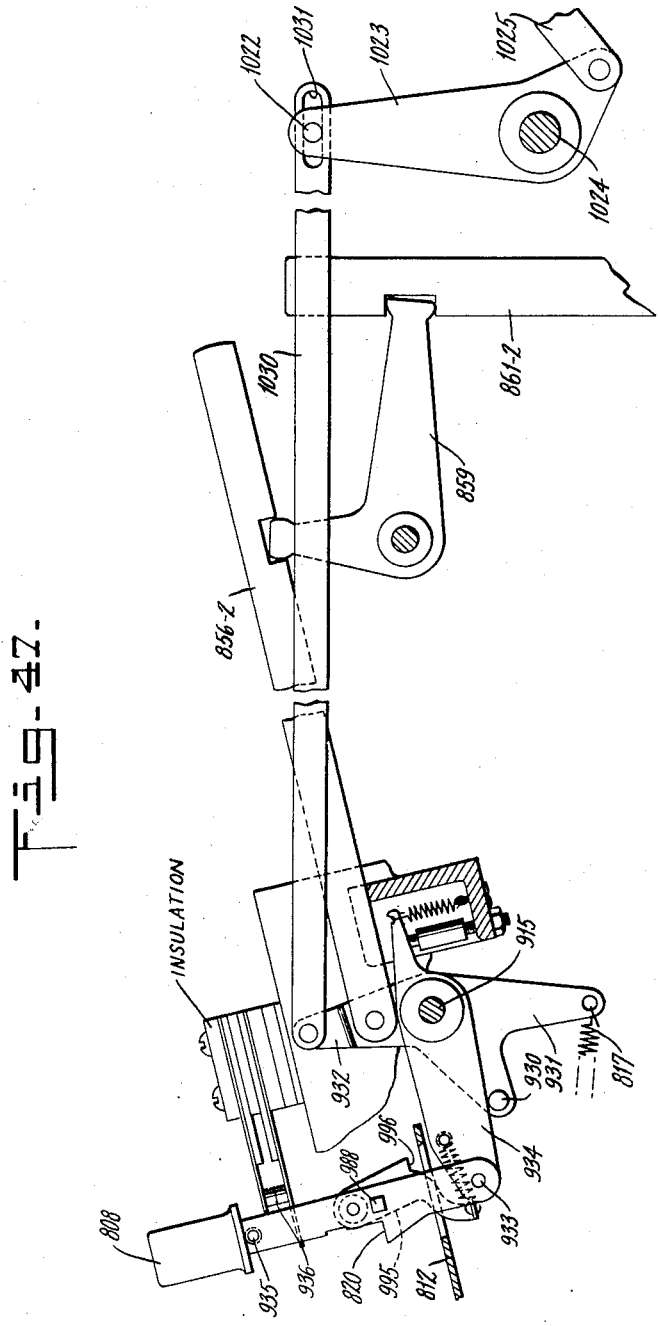
INVENTOR
HAROLD L. READ
BY
J. W. Lomnitzer
ATTORNEY Sept. 28, 1954  H. L. READ  2,690,297
COMBINED RECORD SORTING AND ACCOUNTING MACHINE
Filed May 7, 1951  45 Sheets-Sheet 31
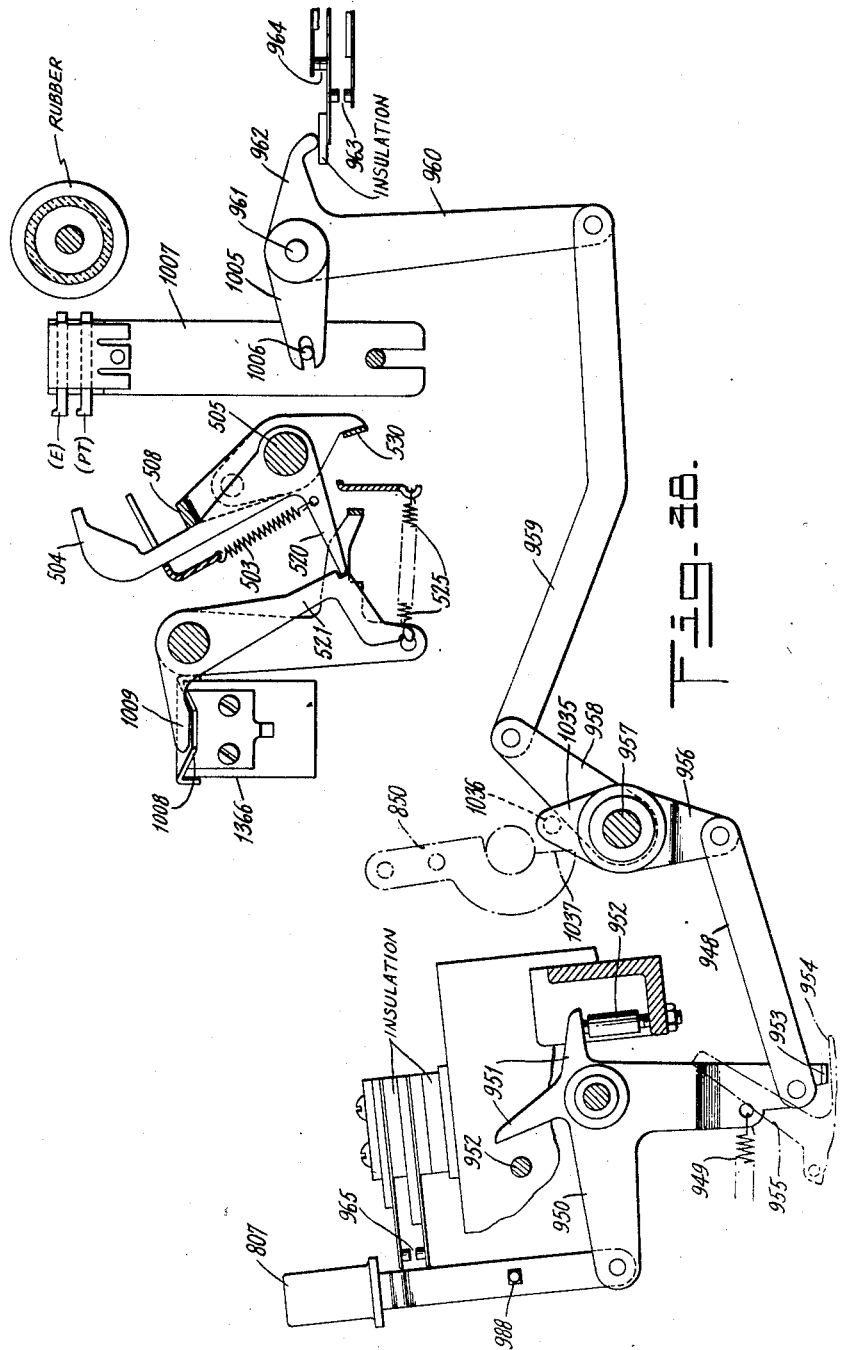
INVENTOR
HAROLD L. READ
BY
J. W. Lomnitzer
ATTORNEY Sept. 28, 1954          H. L. READ          2,690,297
COMBINED RECORD SORTING AND ACCOUNTING MACHINE
Filed May 7, 1951          45 Sheets-Sheet 32
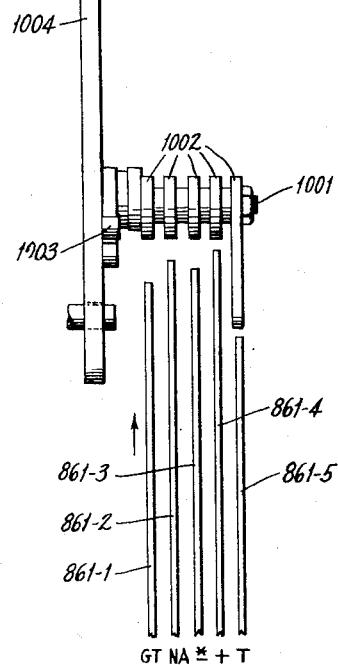
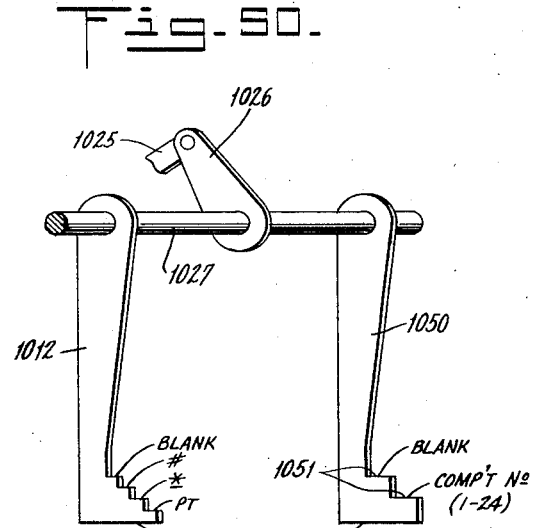
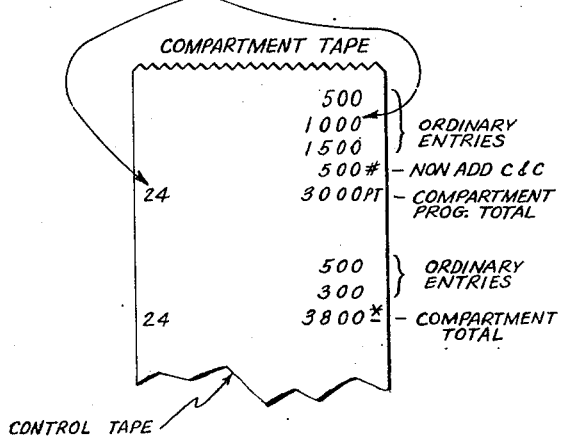
INVENTOR
HAROLD L. READ
BY
*J. W. Lomnitzer*
ATTORNEY Sept. 28, 1954  H. L. READ  2,690,297
COMBINED RECORD SORTING AND ACCOUNTING MACHINE
Filed May 7, 1951  45 Sheets-Sheet 33
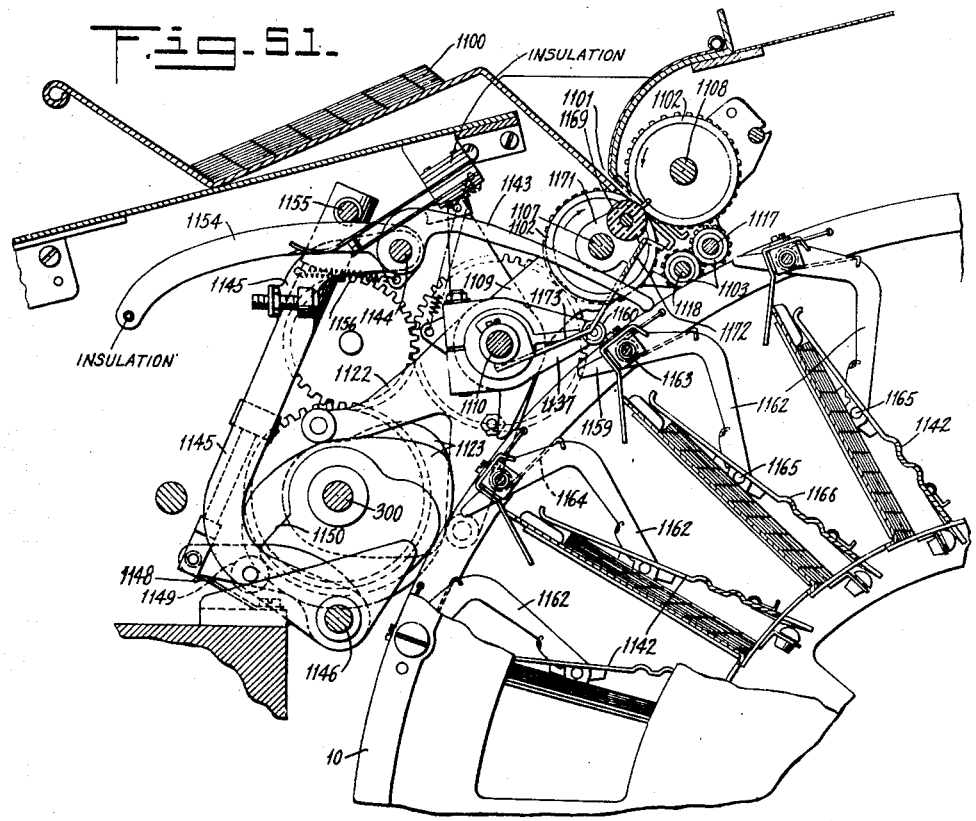
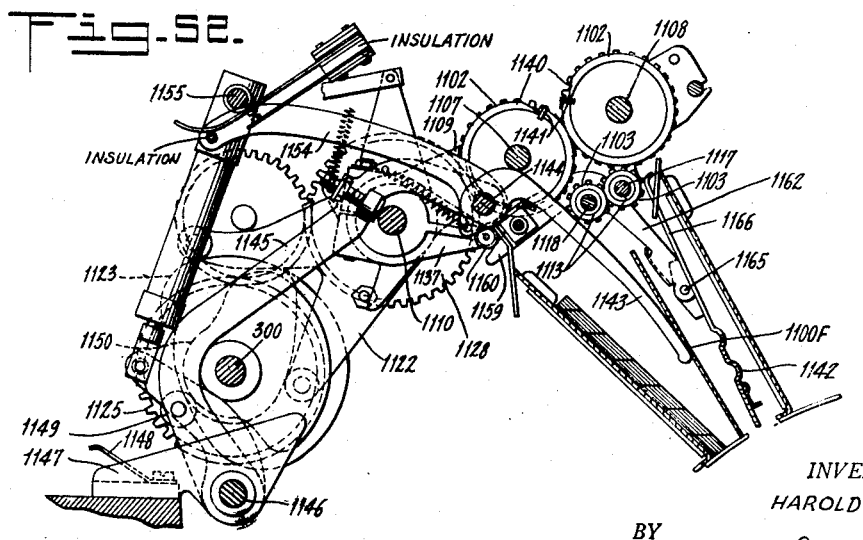
INVENTOR.
HAROLD L. READ
BY
*J. W. Lomnitzer*
ATTORNEY Sept. 28, 1954         H. L. READ         2,690,297
COMBINED RECORD SORTING AND ACCOUNTING MACHINE
Filed May 7, 1951         45 Sheets-Sheet 34
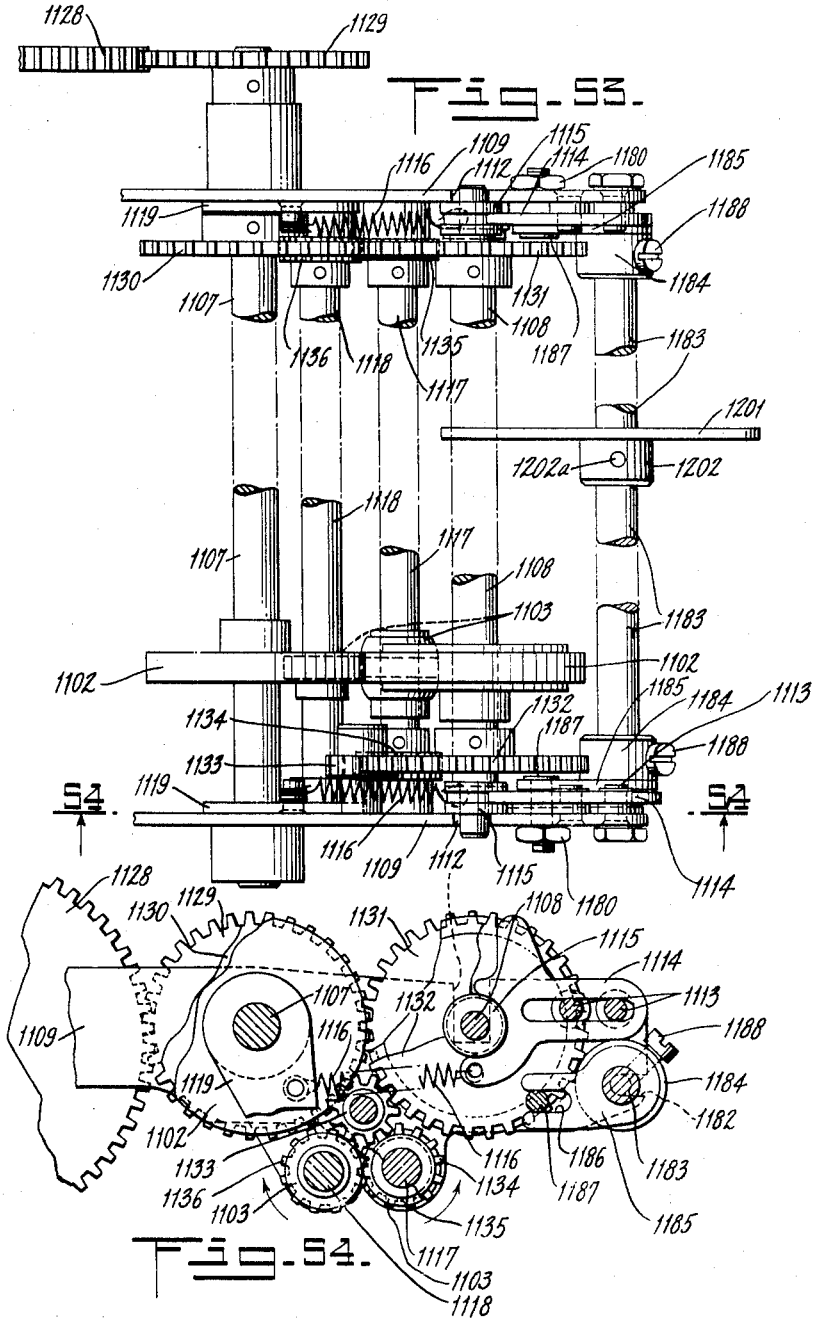
INVENTOR.
HAROLD L. READ
BY
ATTORNEY

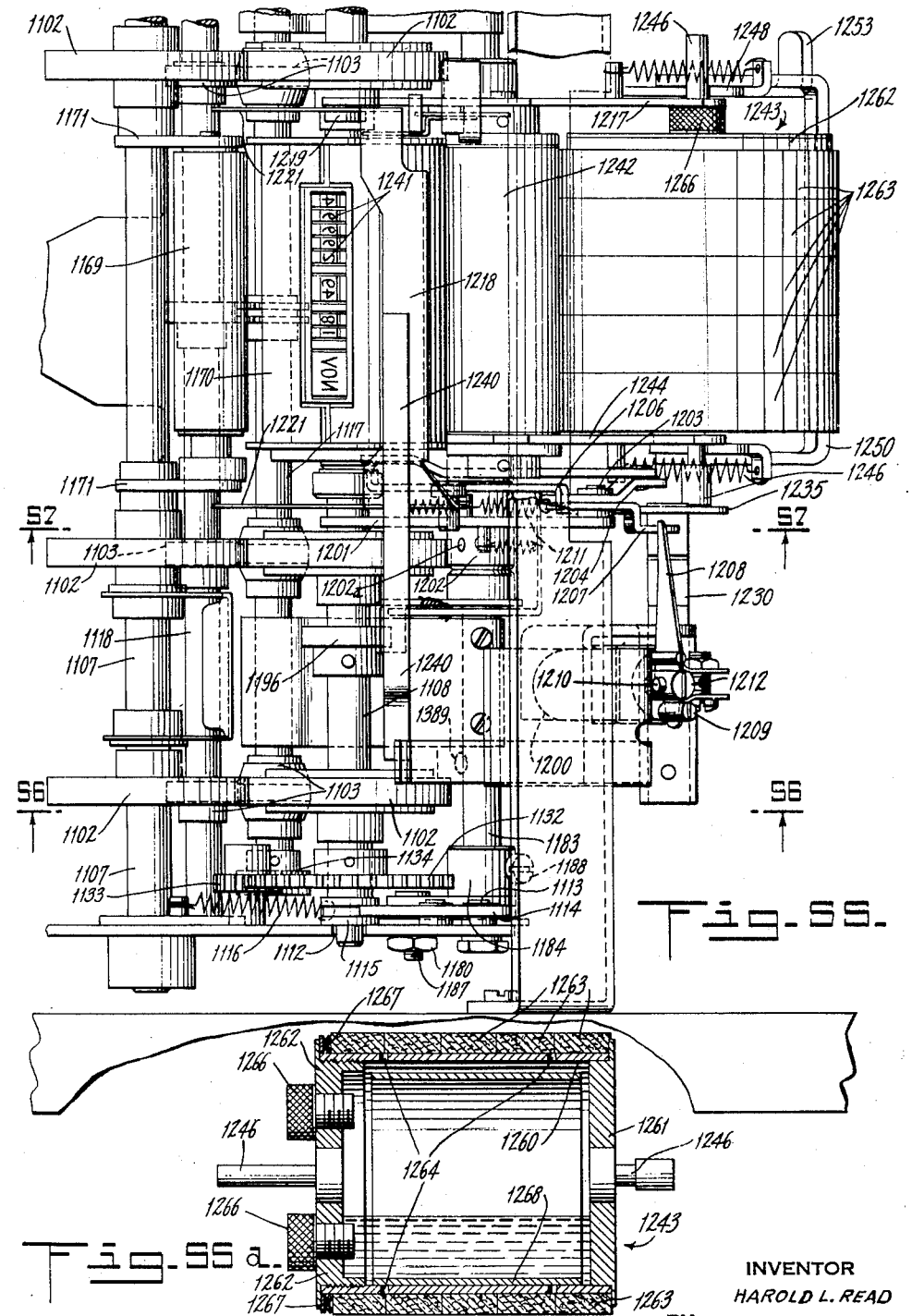

Sept. 28, 1954  H. L. READ  2,690,297
COMBINED RECORD SORTING AND ACCOUNTING MACHINE
Filed May 7, 1951  45 Sheets-Sheet 36

INVENTOR.
HAROLD L. READ
BY
J. W. Lomnitzer
ATTORNEY

Sept. 28, 1954 H. L. READ 2,690,297
COMBINED RECORD SORTING AND ACCOUNTING MACHINE
Filed May 7, 1951 45 Sheets-Sheet 37
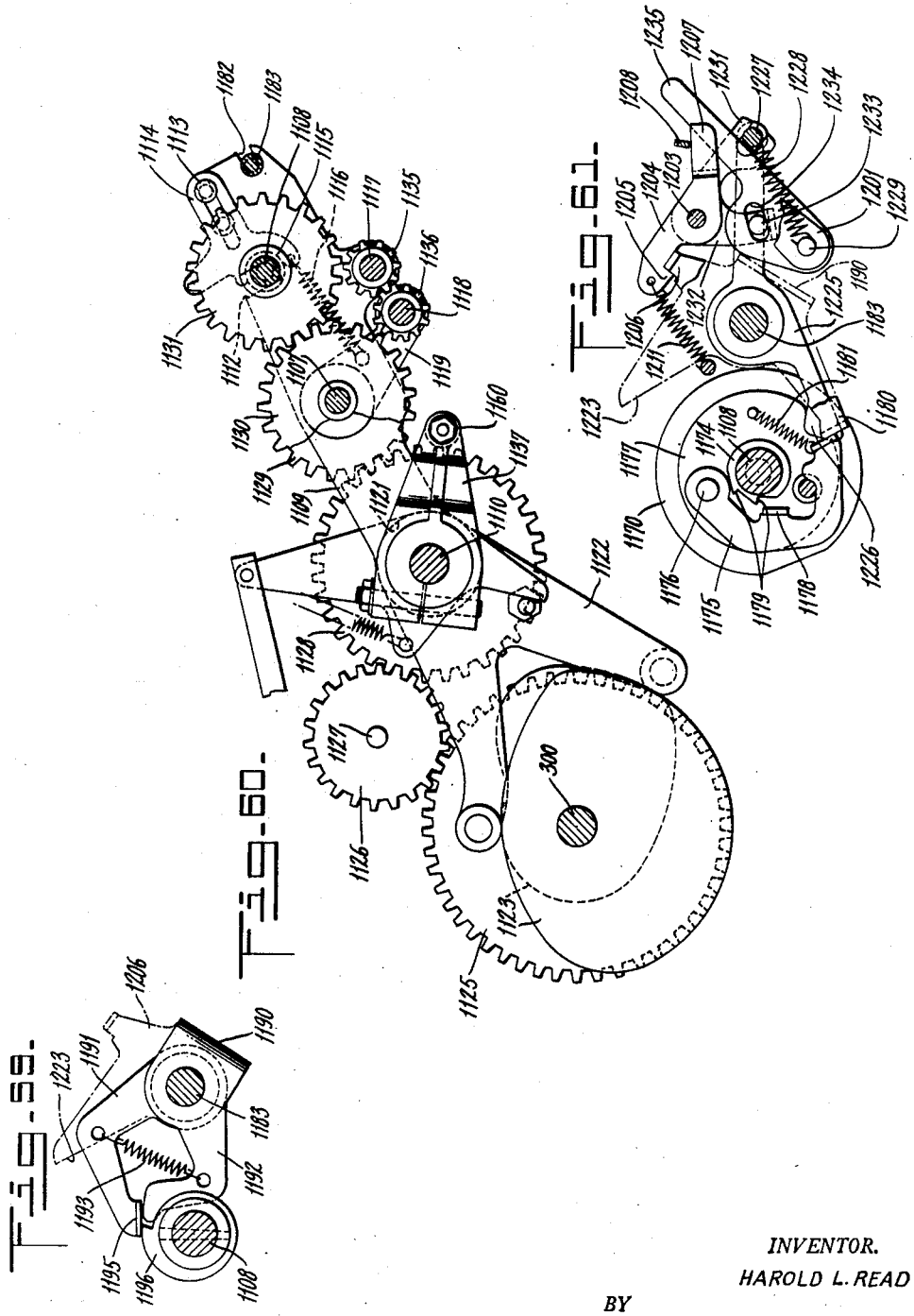
INVENTOR.
HAROLD L. READ
BY
J. W. Lomnitzer
ATTORNEY Sept. 28, 1954      H. L. READ      2,690,297
COMBINED RECORD SORTING AND ACCOUNTING MACHINE
Filed May 7, 1951      45 Sheets-Sheet 39
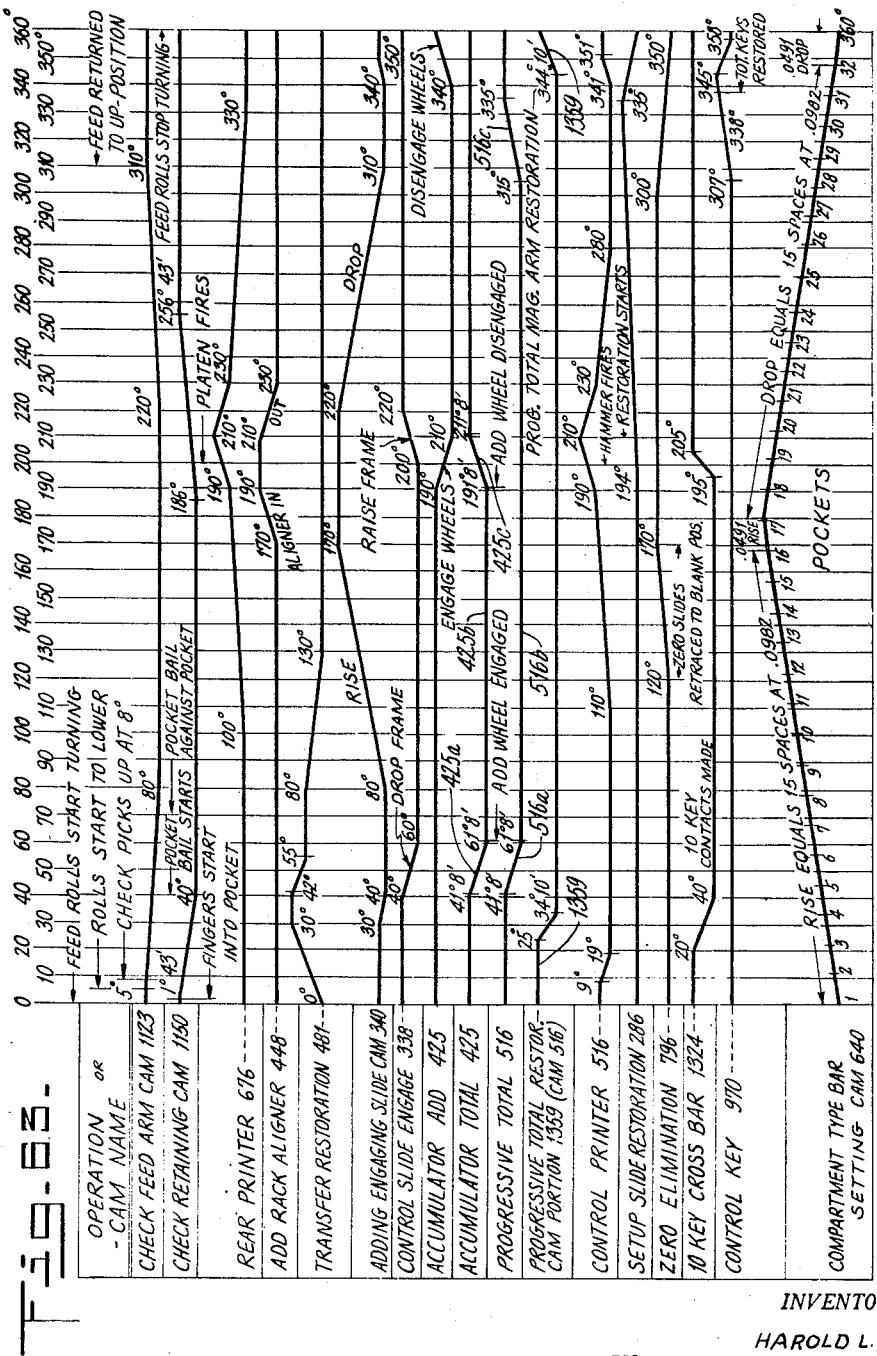
INVENTOR.
HAROLD L. READ
BY
*J. W. Lommitzer*
ATTORNEY Sept. 28, 1954   H. L. READ   2,690,297
COMBINED RECORD SORTING AND ACCOUNTING MACHINE
Filed May 7, 1951   45 Sheets-Sheet 40

INVENTOR
HAROLD L. READ
BY J. W. Lomnitzer
ATTORNEY

Sept. 28, 1954   H. L. READ   2,690,297
COMBINED RECORD SORTING AND ACCOUNTING MACHINE
Filed May 7, 1951   45 Sheets-Sheet 42

INVENTOR
HAROLD L. READ
BY
J. W. Lomnitzer
ATTORNEY

Sept. 28, 1954 H. L. READ 2,690,297
COMBINED RECORD SORTING AND ACCOUNTING MACHINE
Filed May 7, 1951 45 Sheets-Sheet 43

INVENTOR
HAROLD L. READ
BY
ATTORNEY

Sept. 28, 1954  H. L. READ  2,690,297
COMBINED RECORD SORTING AND ACCOUNTING MACHINE
Filed May 7, 1951  45 Sheets-Sheet 44

INVENTOR
HAROLD L. READ
BY J. W. Lorimitzer
ATTORNEY

Sept. 28, 1954           H. L. READ            2,690,297
COMBINED RECORD SORTING AND ACCOUNTING MACHINE
Filed May 7, 1951                          45 Sheets-Sheet 45

INVENTOR.
HAROLD L. READ
BY
J. W. Lounitzer
ATTORNEY

Patented Sept. 28, 1954

2,690,297

UNITED STATES PATENT OFFICE 2,690,297

COMBINED RECORD SORTING AND ACCOUNTING MACHINE

Harold L. Read, Vestal, N. Y., assignor to International Business Machines Corporation, New York, N. Y., a corporation of New York Application May 7, 1951, Serial No. 224,857

7 Claims. (Cl. 235—58)

This invention relates to combined check sorting and accounting machines of a type well known in the art and which are now used commercially in banks.

The improvements relate to the type of machine which is provided with mechanism for "proving" the checks which are deposited by effecting an automatic comparison of the deposit ticket total, which represents the total of the amounts on checks in each deposit, with a total of the amounts previously entered in the group totalizer and distributed among several classification totalizers.

The comparison is provided by setting up under control of the ten-key keyboard a storage means which is set up to represent the total of the checks on the deposit ticket. During a group total taking cyclic operation of the machine the storage means is compared with the group totalizer to determine whether the group total corresponds with the deposit ticket total represented by a setting of the storage means.

It is desirable to allocate a sorting compartment which usually receives checks to receive a deposit ticket, so that all of the deposit tickets are entered in the same compartment. It is further desirable to print upon the rear face of each deposit ticket and to insure that both a deposit ticket feed occurs and is printed in the same operation.

It is, therefore, a broad object of the present invention to provide means to effect the locking of the keyboard when it is detected upon a group balancing operation that there is the failure of a deposit ticket to feed, and if the deposit ticket has been fed, that it has not been printed upon.

The locking of the keyboard in the above type of machine effectively prevents the subsequent use of the keyboard to enter items in the machine pertaining to the next group of checks listed on another deposit ticket.

A further object of the machine is the provision of means to also lock the compartment selector keys whenever it has been detected that the deposit ticket has not been fed, or if it has been fed, it has not been printed upon.

The locking of such keys so conditions the machine that other compartments cannot be selected until the deposit ticket has been fed into the appropriate compartment, and thus release the locking means for both the keyboard and the compartment selector keys.

In the machine in which the present improvements are incorporated it is normally desirable to employ detecting devices to detect the failure to feed a check for each machine operation and to prevent the normally operating detecting means from being operative when a group total is taken, since for normal group totals a check is not fed. However, in group balancing operations a group total is taken, and it is, therefore, another object of the invention to render the detecting devices operative when a group total is taken in a group balancing operation.

In the machine in which the present improvement is incorporated complete flexibility is provided by having a series of plug sockets associated with the compartment selector keys from which desired plug connections may be made to plug sockets leading to instrumentalities for effecting group balancing operations. In this manner any compartment selector key may initiate group balancing operations and thus some compartment totalizers may receive amounts from checks while the other may receive deposit ticket totals from deposit tickets by a transfer operation.

It is a further object of the invention to provide control means rendered effective at the will of the operator to render such plug connection ineffective and thus prevent a group balancing operation from being carried out even though called for by the operation of a particular compartment selector key. This enables, for instance, entry operations to be performed in connection with the totalizer associated with the compartment key operated without disturbing the plug connection each time.

The normal operation of the machine requires a check feed for each operation or else the ten-key keyboard and compartment selector keys are locked against operation.

A further improvement is the incorporation of what has been designated as a "multiple entry feature" which suppresses the locking of the ten-key keyboard by the devices which detect the failure to feed a check but causes the compartment selector keys to be locked until the check is actually fed. Hence, the ten-key keyboard is not locked and is operative to enter one or more items in the same totalizer. The compartment selector keys are, however, inoperative until the check has been actually fed, preferably in the last entry operation. Feeding of the check renders compartment selector keys operative and they again can be operated to select other totalizers and compartments.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a view in side elevation of parts arranged at the bottom of the machine and shows particularly the stopping devices for the sorting drum.

Fig. 3 is a detail view of certain contact controlling devices.

Fig. 4 is a plan view of the parts shown in Fig. 2.

Fig. 5 is a detail view of certain parts comprising the drum stopping devices.

Fig. 6 is a plan view of the improved ten-key keyboard mechanism showing the relation with the control slides Fig. 7 is a view in front elevation of the ten-key keyboard mechanism.

Fig. 8 is a transverse sectional view taken on the irregular section line 8—8 of Fig. 6.

Fig. 9 is a detail view showing a contact operating mechanism.

Fig. 10 is a longitudinal sectional view taken on the line 10—10 of Fig. 6.

Fig. 11 is a detail view in side elevation, as viewed on the line 11—11 of Fig. 6.

Fig. 11a is a detail view of the electromagnetically controlled key locking mechanism.

Fig. 12 is a detail view of the escapement mechanism.

Fig. 13 is a view in side elevation of the right-hand side of the ten-key keyboard mechanism.

Fig. 14 is a transverse sectional view taken on the line 14—14 of Fig. 6.

Fig. 15 is a detail view of the credit key utilized for group balancing operations and associated control mechanism.

Fig. 16 is a sectional view taken on the line 16—16 of Fig. 6 and shows primarily the motor release bar and associated magnetic clutch release mechanism.

Fig. 17 is a detail view showing the operating mechanism for the differentially set control slides.

Fig. 17a is a detail view of the transfer restoring pawl and check pawl operating cam and its operating train.

Figs. 18a and 18b are sectional views and together with Fig. 18a on top show the operative relationship between the main printer, the compartment printers and the totalizer actuating mechanism.

Fig. 18c is a detail view showing the arrangement for controlling the operation of the hammer which effects printing of the number of the compartment or totalizer involved in an operation.

Fig. 19 is a detail view of the cam operated operating mechanism of the totalizer adding engaging slide.

Fig. 20 is a detail view of the cam operated operating mechanism for the slide aligner.

Figs. 21a, 21b are views in side elevation and taken together with Fig. 21a on the top show primarily the totalizer engaging and disengaging control mechanism.

Fig. 21c is a detail perspective view of the totalizer engaging mechanism.

Fig. 22 is an enlarged detail view of one of the compartment printers showing the hammer selecting and hammer operating mechanism.

Fig. 23 is a detail view showing some of the parts in Fig. 22 but in detached relationship.

Fig. 24 is an enlarged detail view showing the association of a printing hammer and the amount printing segments.

Fig. 25 is a detail view of the pawl and ratchet record tape feeding mechanism provided for each of the compartment printers.

Fig. 26 is an enlarged detail view of the type bar which provides for printing of numerals on the main control tape to indicate the sorting compartment, associated compartment printer and totalizer selected for operation.

Fig. 27 is a perspective view of the selecting mechanism controlled by the sorting drum for selecting the compartment printers for operation and also setting the compartment number printing bar and compartment indicator.

Fig. 28 is a view in side elevation showing the zero elimination mechanism associated with the control slides.

Fig. 29 is a detail view of a zero elimination pawl in a position to restore a control slide for zero elimination.

Fig. 30 is a transverse sectional view showing the position certain zero elimination pawls take for causing the printing of zeros in orders at the right of the significant digit order.

Fig. 33 is a view in side elevation showing the control key unit.

Fig. 34 is a plan view of the control key unit.

Figure 35B:
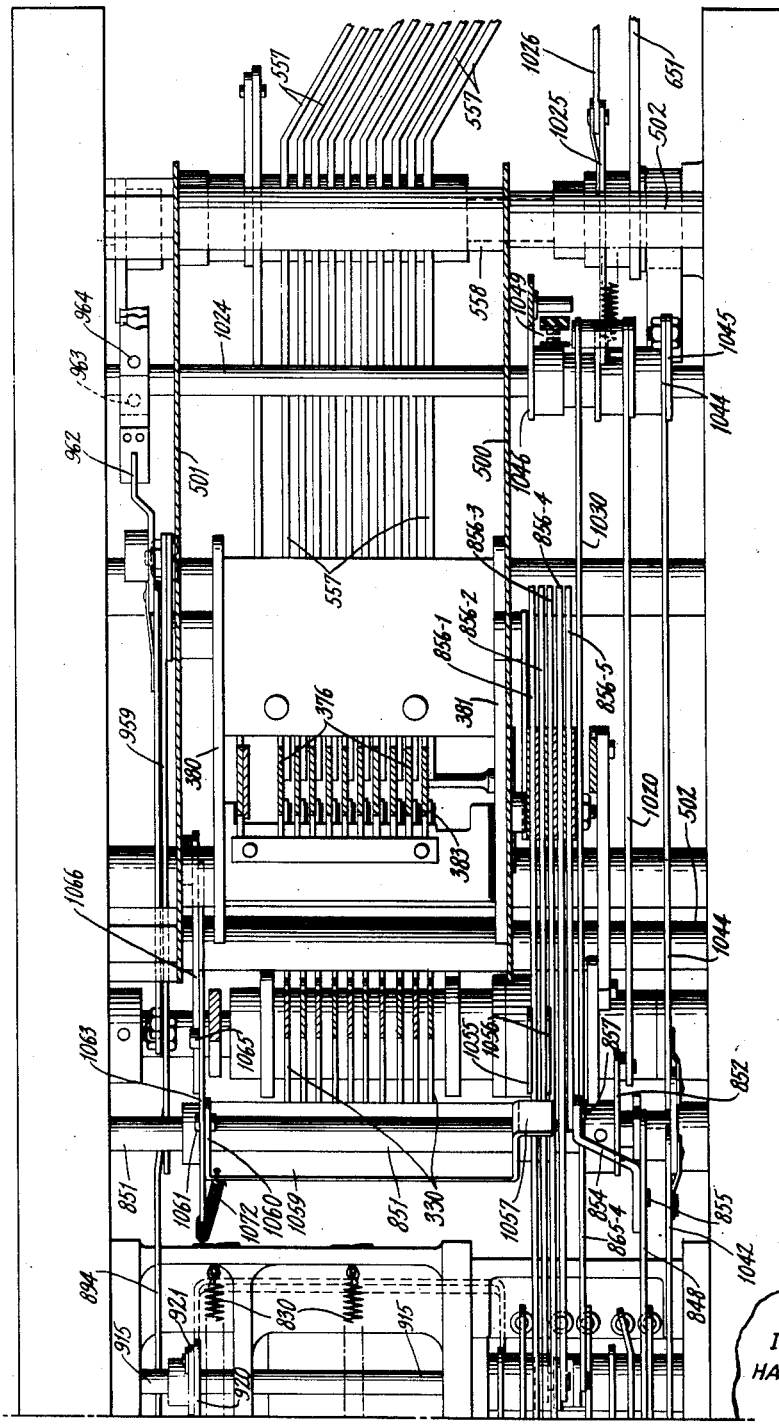

Figs. 35a and 35b taken together show a plan view showing the control key unit and the operating links operated thereby.

Fig. 36 is a detail view of the compartment total key and associated operating train and linkage.

Fig. 37 is a detail view in side elevation of the keys release key showing its associated operating means for releasing other keys of the control key keyboard when desired.

Fig. 38 is a detail view in side elevation showing an operating disconnecting control means and on an enlarged scale.

Fig. 39 is a view in side elevation of the grand total key and associated operating train.

Fig. 40 is a view in side elevation of the group total key and associated operating train.

Fig. 41 is a view in side elevation showing certain keys of the control key keyboard and associated operating trains.

Fig. 42 is a view in side elevation of the control member for adjusting a compartment number type carrier for the compartment tape printer to print a compartment number when a total is printed on the compartment tape.

Fig. 43 is a view in side elevation showing certain other keys of the control key keyboard and associated operating trains.

Fig. 43a is a detail view of the cam and associated follower arm which are operative in taking of totals.

Fig. 44 is a detail view showing the electromagnetically operated means for preventing the operation of the grand totalizer.

Fig. 45 is a detail view in side elevation of the operating train controlled by the non-add C key.

Fig. 46 is a detail view in side elevation of the operating train controlled by the adding machine key.

Fig. 47 is a detail view of the non-add C&C key and the links operated thereby.

Fig. 48 is a detail view of the progressive total key and its associated operating train.

Fig. 49 is a view showing schematically the manner of setting up a symbol type for the main control tape printer.

Fig. 50 is a view showing the manner in which control arms select symbol printing for a compartment printer.

Fig. 51 is a sectional view showing a part of the sorting drum and check feeding mechanism in their normal relationship.

Fig. 52 is a fragmentary view showing the check feeding mechanism in Fig. 51 in the lowered position it occupies when a check is to be fed into a selected compartment.

Fig. 53 is a plan view showing the arrangement of the side frames and driving gears for rotating the check feeding rollers.

Fig. 54 is a view in side elevation taken on the line 54—54 of Fig. 53.

Fig. 55 is a plan view of the check feeding, endorsing and inking mechanism showing their functional relationship.

Fig. 55a is a longitudinal sectional view of the ink supply roller.

Figure 56:
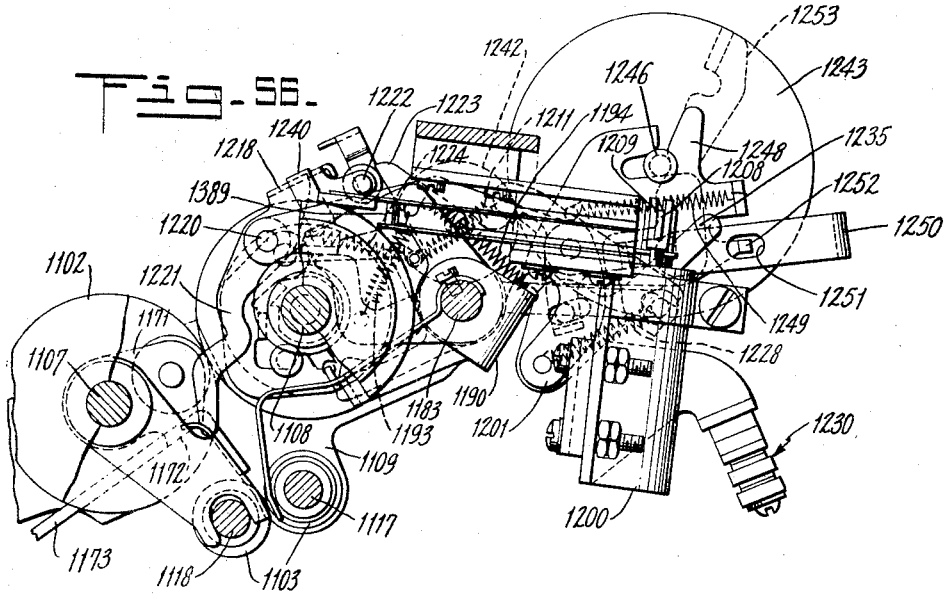

Fig. 56 is a transverse sectional view taken on the line 56—56 of Fig. 55.

Figure 57:
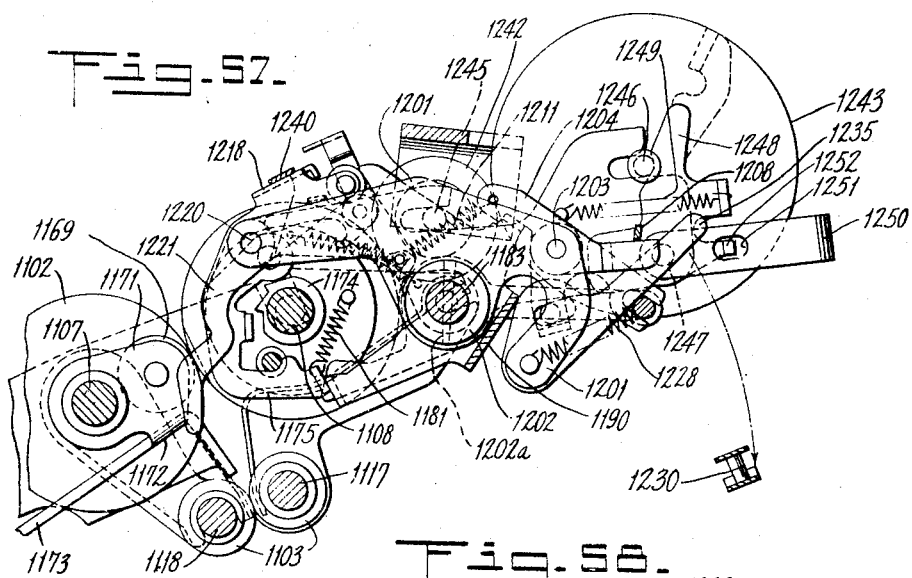

Fig. 57 is a transverse sectional view taken on the line 57—57 of Fig. 55.

Figure 58:
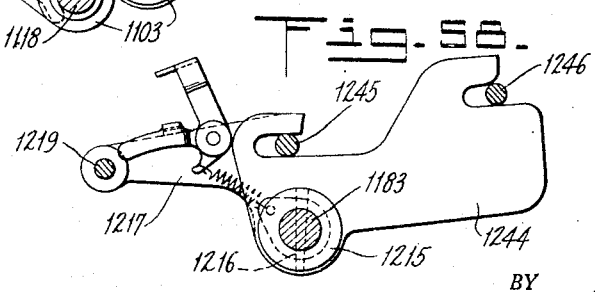

Fig. 58 is a detail view of some of the parts shown in Figs. 56 and 57 to more clearly show the arrangement and construction.

Fig. 59 is a detail view of certain parts shown in Fig. 56 to more clearly show the construction and arrangement of these parts.

Fig. 60 is a view of the operating means in Fig. 51 for rocking the frame carrying the check feeding rollers as well as the gears employed to rotate such check feeding rollers.

Fig. 61 is a detail view of the clutch employed to rotate the check endorsing mechanism.

Figure 62:
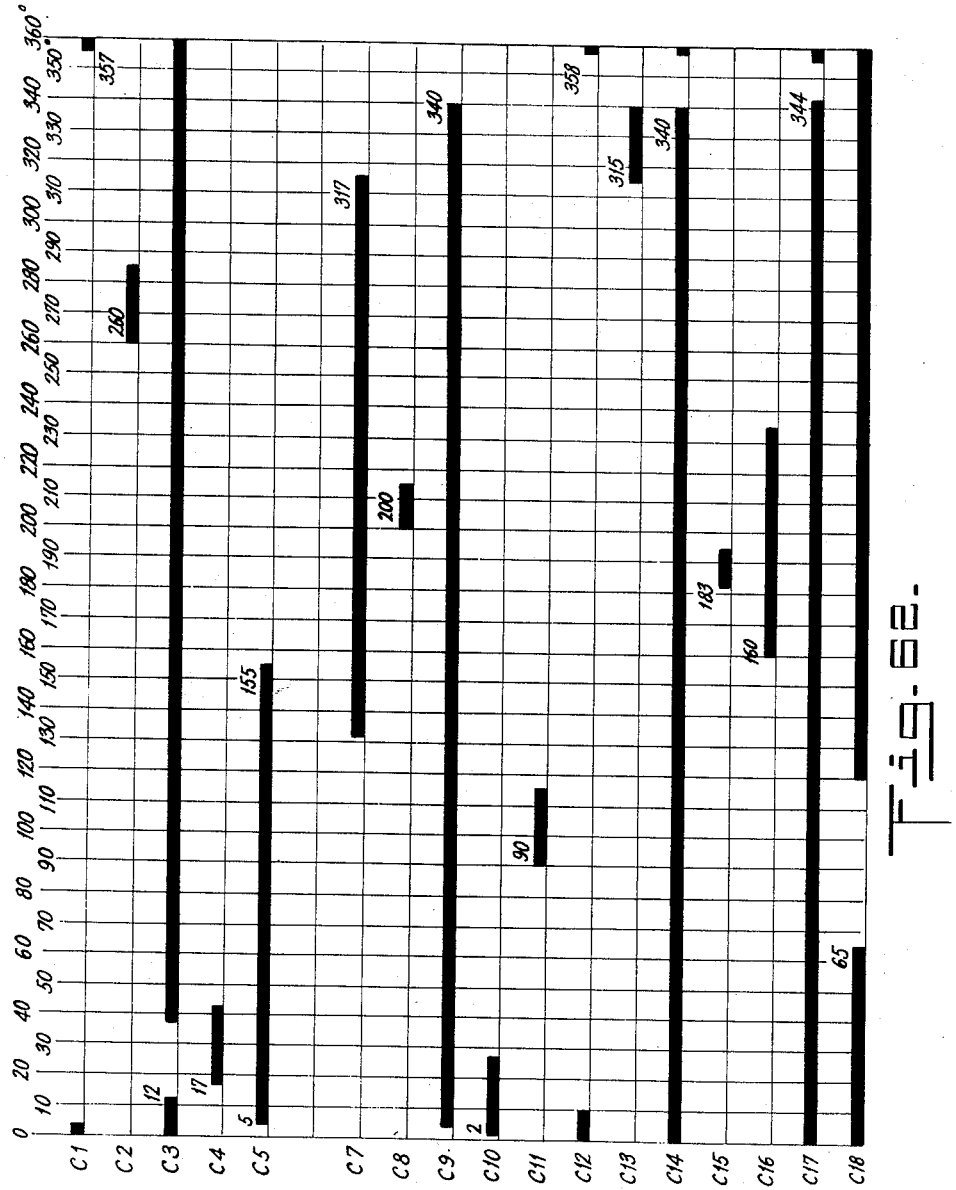

Fig. 62 is a diagram showing the timing of cams for closing and opening associated contacts.

Fig. 63 is a timing diagram of cams employed for effecting certain operations, as well as for showing the timing of certain operations.

Figs. 64a, 64b, 64c, 64d, 64e and 64f, when assembled in this sequence, constitute the electrical wiring diagram of the machine.

*General operation of machine*

The present improvements are preferably applied to the form of combined sorting and accounting machine shown in the U. S. patents, No. 1,966,623, issued to F. L. Fuller, dated July 17, 1934; No. 2,142,352, issued to F. L. Fuller and S. Brand, dated January 3, 1939; No. 2,146,695, issued to S. Brand and John N. Wheeler, dated February 7, 1939.

Figure 1:
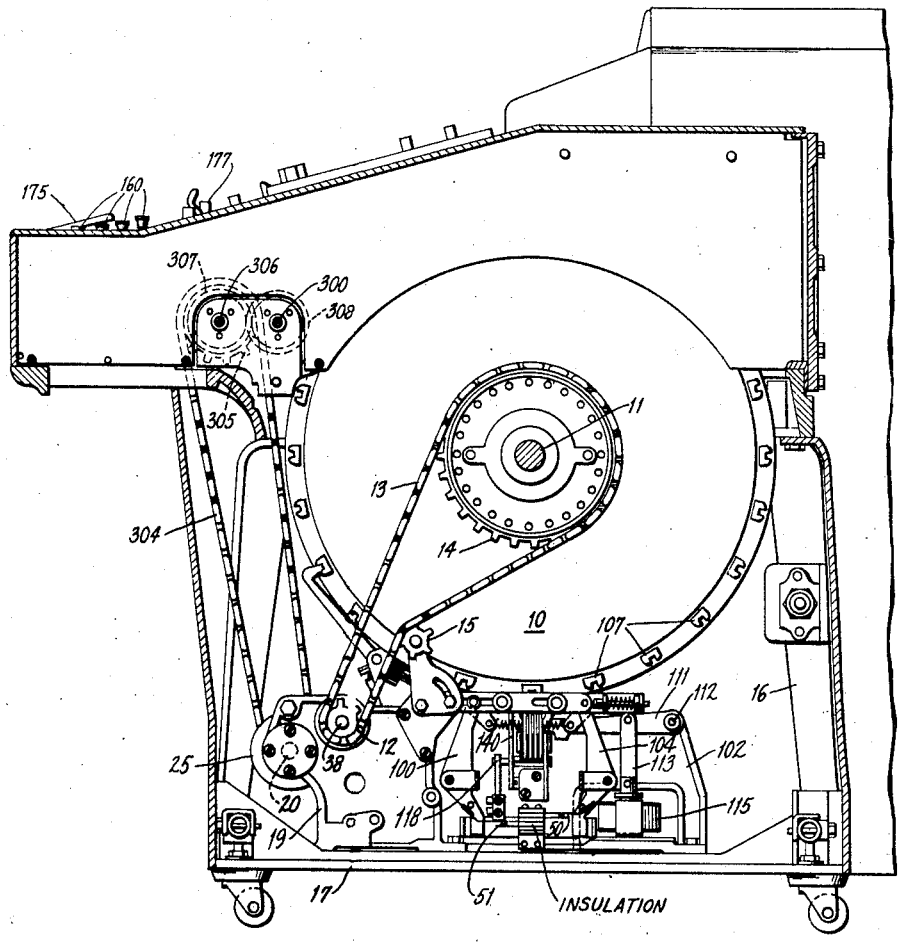
Fig. 1 is a view in side elevation of the right side of the combined check sorting and accounting machine in which the present improvements are preferably incorporated.

The combined sorting and accounting machine is shown as assembled in Fig. 1 and represents the form of machine which is now used commercially in banks to simultaneously list, totalize and sort a group of promiscuously arranged checks. The operator is provided with a group of checks which have different classifications and in accordance with the classification of a check one of the compartment selector keys on the keyboard is depressed to select an appropriate check receiving compartment.

As is shown in Fig. 1 the sorting drum 10 is secured to a shaft 11 and is rotated by a chain 13 from a reversible drive shaft 38. The shaft 38 may be rotated in either direction so as to correspondingly rotate drum 10 to select a desired sorting compartment carried by the drum 10 by the shorter of two directions of rotation. By means of the compartment selector keys, of which there is one for each compartment, the extent of rotation and the direction of rotation of drum 10 is predetermined, and said keys control an electromagnetically controlled stop mechanism shown in Fig. 2 which cooperates with the drum 10 to stop the drum at the desired position. All of the means for carrying out the above functions are well known and fully described in the above cited patents. The function of the machine shown in the aforementioned patents is to effect the entries of the amounts on the checks selectively in a plurality of totalizers and to cause the listing of amounts on the check upon a main control tape and also upon separate compartment tapes which are associated with the plurality of sorting compartments. To provide for the entry and listing of the amounts, the machine is provided with ten keys of a keyboard which are initially depressed so as to control the setting on a suitable setup mechanism of amounts equal in value to the keys struck. After the amount has been set up on the setup mechanism the operator then inserts the check in the check receiving aperture and depresses a motor release bar 175 to cycle the machine. A number of functions are then performed, among which is the feeding of the inserted check into the selected compartment and also the positioning of totalizer actuators and printing mechanisms in order that the amounts may be entered in the grand totalizer and selectively in one of a plurality of totalizers which are associated with the compartments and, furthermore, one of a plurality of compartment printing mechanisms associated with the compartments will be selected for operation so as to print the amount on the selected compartment tape. A printing mechanism is concomitantly adjusted so as to print the same amount on the main control tape.

Subsequently there will be disclosed details of the description of the construction and operation of the sorting machine with regard to the manner in which checks are sorted, and the manner in which the amounts are selectively accumulated, and printed upon the main control tape and a selected compartment tape.

*Check sorting mechanism*

Referring to Fig. 1, the drum 10 is securely mounted on the shaft 11, suitably and rotatably supported in the main framework of the machine. The drum 10 is adapted to be driven by a continuous running motor (not shown) through a two-way clutch which drives a sprocket gear 12 (Figs. 1 and 2) in either direction. A chain 13 passes around sprocket gear 14 secured to the shaft 11. An adjustable idler gear 15 insures the proper tension on the chain 13.

The machine is mounted in a framework indicated generally at 16, and is supported on a base 17. The two-way clutch mechanism is mounted between a pair of brackets 18 and 19 secured to the base 17. The motor (not shown) is mounted on the base 17 and drives the clutch mechanism through a shaft 20 mounted in the brackets 18 and 19 and directly connected to the armature shaft of the motor. Secured to shaft 20 midway between the brackets 18 and 19 is a driving clutch member 21, comprising a pair of clutch plates 22 and 23, which rotates continuously with the shaft 20 in the direction indicated by the arrow in Fig. 4. Rotatably mounted on the shaft 20 adjacent the driving clutch members 21 are driven clutch plates 24 and 25, each provided with suitable clutch facing material indicated at 26.

The clutch plate 24 is mounted on a sleeve 27, which sleeve is also integral with a gear 28. The clutch plate 25 is similarly connected by a sleeve 29 to a gear 30 on the shaft 20.

The gear 28 meshes with an intermediate gear 36 which meshes with a gear 37 fast on a shaft 38 mounted in the brackets 18 and 19 and on which is secured the sprocket gear 12. The gear 30 meshes with a gear 39 fast on shaft 38.

Obviously, if the clutch plate 24 is brought into operative contact with the driving plate 22, the clutch plate 24 and the gear 28 will be driven in a clockwise direction, and, through the gear 36, will drive the gear 37, shaft 38 and sprocket gear 12 also in a clockwise direction to rotate the drum 10 in the same direction. However, if clutch plate 25 is brought into contact with the driving plate 23, the plate 25 and the gear 30 are rotated clockwise. The gear 30 meshing directly with the gear 39 drives shaft 38 and sprocket gear 12 in a counterclockwise direction to rotate the drum 10 counterclockwise.

The selective movement of clutch plates 24 and 25 to contact with the driving plates 22 and 23 is controlled by the position in which the drum stands and by the particular selector key 40 (Fig. 64a) depressed. Fixed to the framework of the machine and surrounding the drum shaft 11 is a ring 41 (Fig. 64a) of insulating material upon which is mounted a series of brushes 42 arranged annularly about the ring 41, there being a brush 42 for each selector key 40. Referring to Fig. 64a these brushes 42 are connected by wires 43 to one side of pairs of contacts 44 adapted to be closed upon depression of a selector key 40. A commutator comprising conducting segments 45, 46 and 47, and a ring 48 shown diagrammatically in Fig. 64a mounted in a disk 49 of insulating material is fixed to the drum shaft 11 adjacent the ring 41. The brushes 42 are carried by the ring 41 and contact with the segments 45, 46, and 47. When the drum 10 is at rest, the segment 45 is in contact with the brush 42 connected to the contacts 44 associated with the last depressed selector key 40. The segment 46 is electrically connected to the ring 48 by a radial strap of conducting material.

Assuming that the main switch (not shown) is closed and the motor is running with the sorting drum standing at the last selected position, for example, the "1" position, we now depress the "13" compartment selector key 40. Depression of this key releases the "1" key which as is clearly explained in the aforementioned patent, No. 1,966,623 is immediately returned to undepressed position opening the corresponding contacts 44.

Depression of the "13" key 40 closes its contacts 44 (Fig. 64a) whereupon a circuit is set up from line side 202 connected to one side of the current supply, contacts 44 for the "13" compartment key, wire 43 to the corresponding brush 42, segment 46, ring 48, a brush 55, R27a interlock contacts now closed, R2b interlock contacts now closed, R8d interlock contacts now closed, PL coil of the R3 or reel reverse control relay, to line side 200 connected to the other side of the current supply. A holding circuit for R3H coil is through the R3a contacts, reel stop timing contacts 50, contacts 51, to line side 202. R3b contacts close to pick up the R2 reel reverse control relay by a circuit from line side 200, R2 relay, R3b contacts, contacts 50, contacts 51, to line side 202. Energization of R2 relay now transfers its R2a contacts, completing a circuit when contacts 76 to be described later are closed, from line side 200, clutch control magnet 75, R2a relay contacts now closed, R1a contacts now closed, contacts 76 now closed, contacts 50, contacts 51, to line side 202. This energizes clutch control magnet 75.

Referring now to Fig. 4, when the clutch control magnet 75 is energized it attracts its armature 78 which is carried on the end of a lever 79 pivoted at 80 on a bracket 81 mounted between the brackets 18 and 19. This rocks the lever 79 clockwise (Fig. 4).

Pivotally carried by the lever 79, at the end opposite the armature 78, is a pair of yokes 82 and 83. These yokes carry rollers 84 and 85 projecting into annular grooves 86 and 87 in the sleeves 29 and 27 respectively. At their opposite ends the yokes 82 and 83 carry adjusting studs 88 and 89 bearing against the bracket 81.

When the lever 79 is rocked clockwise under the influence of clutch control magnet 75, it rocks the yoke 82 also clockwise, bringing the clutch plate 25 into contact with the driving member 23, whereupon the gear 30 is driven clockwise (Fig. 2) rotating gear 39 and sprocket gear 12 counterclockwise to rotate the drum 10 in the same direction until the segment 45 contacts the brush 42 associated with the depressed key, in the instant example, the "13" key. The drum is stopped in this position by mechanism later to be described.

Assuming now that the "12" selector key 40 is depressed instead of the "13" key with the "1" key previously depressed. When the drum 10 is standing in the "1" position the drum will rotate in the opposite or clockwise direction to bring the "12" compartment into registry with the check feeding aperture.

Referring to Fig. 64a, it may be seen that the brush 42 connected to the "12" key contacts 44 is in contact with the segment 47. This segment 47, having no connection to the ring 48, is ineffective to energize the R3 relay, or the R2 relay. Therefore, upon closure of contacts 76 by means to be later described, a circuit is established from the line side 200, a second clutch control magnet 90, R2a contacts now normal, R1a contacts now closed, contacts 76 now closed, contacts 50, 51 to line 202.

Energization of magnet 90 rocks the arm 79 (Fig. 4) counterclockwise, engaging the clutch plate 24 with the driven plate 22, which, through the gears 28, 36 and 37 rotates the sprocket gear 12 and the drum 10 clockwise until the segment 45 contacts the brush 42 for the "12" key 40.

The drum 10 is normally held in position by a pair of stop arms 96 and 97 (Figs. 4 and 5) and is also accurately aligned in position by a lock arm 98 (Fig. 2). The stop arm 96 is pivotally supported at 99 (Fig. 4) by a pair of arms 100 pivoted on a stud 101 projecting from a frame 102 secured to the base 17. The stop arm 97 is similarly supported at 103 by a pair of arms 104 pivoted on a stud 105 in the frame 102. A spring 106 stretched between projections of the arms 96 and 97 normally holds these arms in their effective or raised positions.

The stop arms 96 and 97 cooperate with blocks 107 secured to the side of the drum 10, there being a block 107 for each compartment position on the drum. Before the drum can be rotated it is necessary to withdraw the arms 96 and 97 clear of the particular block 107 between said arms. To this end the stop arms 96 and 97 are provided with hooked projections 108 and 109, respectively. Extending immediately above these projections is an ear 110 bent over from the free end of a lever 111 pivoted on a stud 112 (Fig. 2) in the frame 102. A link 113 pivotally connected to the lever 111 has secured to its lower end the armature 114 of a solenoid 115.

Energization of the solenoid 115 attracts its armature 114, drawing the link 113 downwardly and rocking the lever 111 counterclockwise. This movement of the lever 111, through the ear 110, rocks the stop arm 96 clockwise and the stop arm 97 counterclockwise, thus moving said stop arms out of the path of the block 107 with which it is engaged.

The solenoid 115 is energized by the following circuit described with reference to Fig. 64a.

This circuit extends from the line side 200, magnet 115 (Fig. 64a), contacts 118, R1b relay contacts, R26c and R8b contacts now closed, release bar contacts 298, C1 cam contacts which are operated in a manner to be explained, to line side 202. This circuit is normally open at the relay contacts R1b which are opened by the R1 relay which is retained energized as long as a key 40 is depressed and the drum stands at a position corresponding to the depressed key. The circuit for retaining R1 relay energized extends as follows: assuming the "1" key to be depressed, from line side 202, contacts 44 for the "1" key, wire 43 to the "1" brush 42, segment 45, ring 120, brush 121, wire 122, R1 relay magnet to line side 200. Magnet 144, in shunt with the R1 relay coil is also energized and when energized opens its contacts 118, but when deenergized along with R1 relay its contacts 118 are closed.

When another key is depressed, the previously depressed key, in this example the "1" key is immediately released and restored to its undepressed position permitting its contacts 44 to open. This opens the circuit through the magnet 144 and relay magnet R1 which latter becoming deenergized permits its relay contacts R1b to close and the former to allow contacts 118 to close, establishing the above described circuit through the solenoid 115.

As the latch arms 96 and 97 approach the lower limit of their movement caused by the energization of solenoid 115, ears 124 formed on the free ends thereof, come below the bent end of a latch arm 125 (see Fig. 3), which arm is immediately rocked counterclockwise (Fig. 3) by a spring 126 to latch the stop arms 96 and 97 down in their ineffective positions.

The arm 125 is pivoted at 139 and has a vertically extending tail 140 to which the spring 126 is attached. The tail 140 carries an insulating roller 141 which cooperates with a blade of contacts 118. As the latch arm 125 rocks counterclockwise to latch the stop arms 96 and 97 down the tail 140 through the roller 141 opens contacts 118. When the contacts 118 are opened, the solenoid 115 (Figs. 2 and 5) is deenergized, allowing a spring 142 (Fig. 2) to raise the arm 111, link 113 and armature 114 to their upper positions.

Before the drum 10 is free to rotate the lock arm 98 must also be removed to ineffective position. The nose of this arm as shown in Fig. 2 normally rests in a notch formed in one of the blocks 107. The lock arm 98 is withdrawn by a magnet 127 (Figs. 2 and 4) which is energized, under control of contacts 128 and 129 closed by the stop arms 96 and 97 when they are withdrawn to free the drum for rotation. Mounted near the stop arms 96 and 97 are the pairs of contacts 128 and 129 connected in parallel and having their inner blades bent outwardly at an angle (see Fig. 2). These angular ends of the inner blades carry blocks 130 of insulating material (Fig. 4). Studs 136 and 137 (Fig. 4) projecting respectively from the stop arms 96 and 97 cooperate with the blocks 130 (see also Fig. 2) to hold the pairs of contacts 128 and 129 open when the stop arms are in their effective positions. When the stop arms 96 and 97 are pulled down to unlock the drum 10 the studs 136 and 137 are carried out of contact with the blocks 130, whereupon the contacts 128 and 129 are closed by the spring tension of the blades.

Closure of contacts 128 or 129 (see Fig. 64a) completes an obvious circuit to energize magnet 127, which attracts its armature 138 (Fig. 2) and rocks the lock arm 98 clear of the block 107.

Lock arm 98 has a tail which is rocked therewith to close contacts 76 and open contacts 143 when the lock arm 98 is rocked clear of the block 107. The drum is now free to rotate and the selected clutch magnet is energized by the following described circuit to drive the drum to its newly selected position.

From line side 202, contacts 50, 51 now closed, contacts 76 now closed, R1a contacts now closed, and either clutch magnet 75 or 90 depending upon the energization status of R2 relay, to line side 200, and by a circuit from contacts 76 to the R6 relay to also energize the latter. R6 relay and selected clutch magnet 75 or 90 are held energized through R6a contacts and contacts 50, 51 until the latter open when a selected compartment arrives at the proper position; R6 relay keeps the selected clutch magnet 75 or 90 energized after contacts 76 open and until the contacts 50, 51 are opened in a manner now to be explained.

Each of the arms 100 and 104 has a respective depending projection 100a and 104a. As will be explained when the block 107 strikes the stop arm 97 the latter is moved to the right and rocks the arms 104 clockwise and the arm 104a also clockwise to allow contacts 50 to open. When the block 107 strikes the stop arm 96 it rocks arms 100 counterclockwise and the arm 100a in the same direction to allow contacts 51 to open. Thus, in either direction of rotation of the drum 10 contacts 50, 51 are opened at the proper time to deenergize the R6 relay and the selected clutch magnet 75 or 90, even after contacts 76 have been opened. This insures a power drive of the drum to the newly selected position.

The drum continues to rotate until it arrives at the position wherein the compartment corresponding to the depressed key comes opposite the check aperture, whereupon the rotation of said drum is arrested and the drum is accurately aligned in position by mechanism now to be described.

It will be remembered that the commutator comprising the segments 45, 46, 47 and rings 49 and 120 (Fig. 64a) rotates with the drum 10, whereas the disk 41 together with the brushes 42, 55 and 121 remain stationary. As soon as the segment 45 contacts the brush 42 corresponding to the depressed key and just before the drum is at its newly selected position a circuit is established from line 202, contacts 44 of the depressed key, brush 121, wire 122, magnet 144, and R1 relay to line 200. Energization of magnet 144 (see Fig. 3) attracts its armature 145, which is secured to the latch arm 125, rocking the latter counterclockwise to free the stop arms 96 and 97, and also open contacts 118 to deenergize magnet 115. The spring 106 (Figs. 2 and 5) immediately throws the stop arms upwardly to effective drum locking position. When the stop arms move upwardly and the drum comes to a complete rest contacts 128 and 129 open to deenergize magnet 127 which allows stop arm 98 to engage a block 107 and at the same time open contacts 76. Although contacts 76 open the selected clutch magnet 75 or 90 is held energized until contacts 50, 51 open. If the drum 10 is rotating in a clockwise direction the block 107 wipes over stop arm 97 and strikes arm 96. If rotating counterclockwise the block 107 wipes over arm 96 and strikes stop arm 97. It will be recalled that this results in opening either contacts 50 or 51.

A slide 146 (Fig. 4) is pivoted at its left-hand end on the stud 99 on which the stop arm 96 is pivoted. The slide 146 is slotted to surround and slide over the stud 103 so that as the stud 99 moves to the left the slide 146 moves in the same direction. Similarly a slide 147 has one of its ends pivoted on the stud 103 on which is pivoted the stop arm 97. The slide 147 is slotted at 148 (Fig. 2) to slide over the stud 99 so that as the stud 103 moves to the right the slide 147 moves in the same direction. Between the slides 146 and 147 is fixedly mounted a friction plate 149 of suitable friction producing material. The slides 146 and 147 are pressed against friction plate 149 by springs 150 surrounding studs 151 carried by the slide 146 and projecting through slots 148 and 152 in slide 147. The studs 151 pass through holes in the friction plate 149 to hold it in position between plates 146 and 147.

Between the studs 99 and 103 is stretched a spring 153 (Fig. 4). Another spring 154 is compressed between the stud 103 and the bent end 155 of the slide 146. The spring 154 surrounds a pivot stud 156 secured to the stud 103 and which passes through the bent end 155 of the slide 146.

Assuming, for example, that the drum 10 is rotating counterclockwise the block 107 strikes the stop arm 97 (Fig. 2), and moves the slide 147 to the right. The shock of the blow is absorbed by the friction between the slide 147 and friction plate 149 and by the extension of spring 153 and compression of spring 154, which springs react to bring the block 107 and the drum to the position wherein the selected compartment is in registry with the check aperture 135. When the block 107 strikes the stop arm 97 it stretches spring 153 (Fig. 4) and compresses spring 154 (Figs. 2 and 4) and block 107 then rebounds against arm 96 and when block 107 strikes the stop arm 97 the action just described occurs but to a lesser degree. This rebound or "chatter" would be quite extensive if only the springs 153 and 154 were depended upon to bring the drum to rest. The friction member 149 is provided to dampen the rebound action effected by the springs 153 and 154.

When the inertia of the drum has been overcome by the brake friction plates and springs 153 and 154, both arms 96 and 97 will be up, allowing both contacts 128 and 129 to open to deenergize magnet 127 which allows stop arm 98 to engage a block 107.

It is necessary that the lock arm 98 (Fig. 2) be maintained in its ineffective position until the drum 10 has come to a complete rest. This is effected by maintaining one or the other of the contacts 128 and 129 closed until the drum is completely stopped. This maintains the magnet 127 (Fig. 2) energized to hold the arm 98 in its disengaged position. When the block 107 strikes the stop arm 97 this arm, as stated above, is moved to the right (Figs. 2 and 4) carrying the stud 137 therewith away from the insulating block 130. This permits contacts 129 to remain closed. When the springs 153 and 154 rebound, carrying the drum 10 and block 107 back past center, said block 107 strikes the stop arm 96 moving it slightly leftward, at which time the stud 136 is carried away from the insulating block 130. This permits contacts 128 to close. Thus, if the block 107 is off center in either direction one or the other of the contacts 128 and 129 is closed. As soon as the drum comes to a complete rest, both contacts 128 and 129 are opened, deenergizing the magnet 127, whereupon the lock arm 98 is rocked clockwise by a spring (not shown) accurately to align the drum.

*Ten-key controlled amount setup mechanism*

The ten-key keyboard mechanism is provided for setting up amounts represented on the checks to be sorted and also for storing up the total on a deposit ticket on an electrical readout device, and is shown in Figs. 6–14. In view of the fact that this mechanism is an improvement over that previously utilized, as shown in the patent to H. H. Woodruff, No. 2,307,177, issued January 5, 1943, its construction and operation will be explained in detail.

After a compartment selector 40 key corresponding to the compartment which is adapted to receive the check has been depressed and prior to the depression of the motor release bar 175, the amount of the check is set up by the ten-key keyboard, the purpose of the associated setup mechanism being to cause the entry of the amount in a totalizer related to the compartment selected, and the printing of the amount on a main control tape so that the main control tape will exhibit all of the amounts in the sequence that the checks are deposited in the associated compartments, and the entry in a grand totalizer which will represent the total of such amounts. For group balancing operations the keys of the ten-key keyboard are operated to set up and store on an electrical readout the amount known as the credit total, which is the deposit ticket total. The operation of the machine for group balancing will be explained more in detail as the specification progresses.

The ten-key keyboard unit has ten numeral keys 160 (Fig. 8) which are arranged in a conventional ten-key keyboard arrangement and upon the upper protruding ends of the slidable key stems 161 there are mounted the key caps which designate the digital value of each key. The key stems slide in a slotted guide plate 162 (Fig. 6) and at their lower ends they are each articulated by a pin 163 to a hook operating arm 164, all ten of which are pivoted on a rod 165, each arm 164 being urged by an associated spring 166 against a stop bar 167, said spring 166 also normally functioning to return each key after it has been depressed, as well as to return the associated arm 164 against the stop bar 167. Each arm 164 carries a stud 168 projecting against a finger 169 of an associated arm 170 having a hooked end 171. Each arm 170 is pivotally mounted by a stud 172 to the associated stop pin raising arm 173. Each arm 173 is urged by a spring 174 to normal position, shown in Fig. 8 and all of said arms 173, of which there are ten, one for each key 160, are pivoted on a rod 178. It will also be seen that a spring 179 connected between a hole in the pin raising arm 173 and related arm 170 retains the finger extension 169 against the stud 168, as it is shown in Fig. 8.

So far it is evident that when a key 160 is depressed by the finger of the operator it will rock hook operating arm 164 counterclockwise against the action of the spring 166, causing stud 168 to act against the finger 169 to rock the arm 170 slightly counterclockwise to bring the hook end 171 underneath a power-operated bail 180. It is evident, therefore, that the only load upon the operator in depressing a key is that required to rock the arm 170 so as to place the hook-shaped end 171 beneath the bail 180, the power required to do so being very slight due to the weak springs 179 and 166. After the hook-shaped end 171 is caught underneath the bail 180 there is a power operation of the bail 180 by electrical power means initiated in operation by the following described mechanism. Bail 180 is secured to a rock shaft 181 and secured to said shaft 181 there is an arm 182 which is articulated by a stud 183 to the core 184 of a power solenoid 185. The bail 180 is normally held in the position shown in Fig. 8 by means of a spring 186 connected to said arm 182.

Extending beneath each of the key stems 161, which are of such shape that they are in a single line at their lower extremities, is a bail 190 which is pivoted upon a rod 191. One arm of said bail 190 is connected by a stud 192 to a contact operating member 193 which is urged by a spring 194 so that its left-hand extension fits in slots 195 of the blades of contacts 196. The spring 194 also retains contact operating member 193 so that its shoulder 197 is immediately adjacent the left-hand contact blade.

When said bail 190 is rocked counterclockwise it will, through its pivot stud 192 move contact operating member 193 slightly to the right, as viewed in Fig. 8 so that shoulder 197 bearing against said left-hand contact blade will close contacts 196. It should be noted that closure of contacts 196 is timed to take place after the hook-shaped end 171 of the arm 170 associated with the depressed key is beneath the bail 180 and also that the additional load placed upon the finger of the operator to close such contacts 196 is not great because of the weak spring 194 and the slight power required to close the contacts 196.

Thereafter, a circuit is completed from line side 200 (Fig. 64b), through solenoid 185, contacts 196, line side 202 to energize said solenoid 185 which thereupon attracts its core 184, rocking the bail 180 clockwise and through the hooked arm 170 connecting it with the bail 180 rocking the associated pin setup or raising arm 173 counterclockwise against the action of spring 174 to set up, in a manner to be described, a pin in a pin setup carriage representing the digit of the key depressed. This operation takes place without effecting any further movement of the key since, at this time, the finger extension 169 will merely ride down against the stud 168 without effecting any movement of the rocked arm 164 or the interconnected key stem 161.

Near the end of the solenoid plunger power stroke a stud 205 on an arm of the bail 180 operates against the upper edge of the contact closing member 193, rocking the latter slightly counterclockwise and disengaging shoulder 197 from the left-hand contact blade of contacts 196 so that by their inherent resiliency said contacts 196 again open and deenergize the solenoid 185. The depressed key must be returned to nearly its normal position before spring 194 will rock member 193 so as to re-engage the contacts 196 for another closure thereof. Also the hooked arm 170 is not disengaged from the bail 180 until near the end of the return stroke of the solenoid core 184. Therefore, the depressed key must be returned nearly home before another key can be depressed, or a redepression of the same key can be effected. At this point the rocked arm 164 is released from the single key interlocking mechanism to be presently described so that another key can be depressed.

This single key interlocking mechanism is of a well known construction and comprises a series of disks 206 (see Fig. 11) which have a normal separation which allows the entrance of only one arm 164 between associated disks 206, thus crowding the remaining disks 206 so that no other key stem 164 can be interposed between and thus no other arm can be depressed. When a key is returned home the arm 164 moves away from adjacent disks 206, allowing this normal separation to enable the depression of another key and associated arm 164 between them. Because such form of interlocking mechanism is well known it is only briefly described herein.

In the differential mechanism the setup pins or stops 210 are arranged in a transverse series as shown in Fig. 8 in which all pins in each transverse series represents the same digid and in which the pins or stops are also arranged in longitudinal series (Fig. 10) in numerical order 0-8 and all the pins are capable of being selectively set to limit the movements of actuating devices.

The pin setup carriage which is designated generally by the reference character 211 (Fig. 10) includes a U-shaped plate 212 carrying rollers 213 which are slidably mounted in tracks 214 (Fig. 8) each formed by a shoulder in castings 215 (Fig. 10) and a cap plate 216 secured thereto. By this means the pin setup carriage is moved step by step as the longitudinal series of stop pins 210 are successively set up to represent the digits of the keys depressed. The carriage is urged to the left as shown in Fig. 8 by means of a spring 217 connected to the carriage, the step by step movement being under control of an escapement mechanism to be subsequently described. The several series of longitudinal stop pins 210, of which there are nine longitudinal series for setting up a number having nine denominational orders, are slidably mounted in a bottom guide plate 220 and upper guide plates 221, both of said guide plates 220 and 221 being carried by and mounted within the U-shaped plate 212. As best shown in Figs. 10 and 13 the pin raising levers 173 for keys 0-8 have nine fingers or extensions 218 which project through said pin setup carriage as shown in Fig. 8 so as to raise an associated stop pin 210 corresponding to the digit key 0-8 depressed of the effective longitudinal series. For each longitudinal series of pins 210 there is a spring-urged detent plate 222 carrying pins 223 which engage one or the other of a pair of notches in each stop pin 210 to hold the pins 210 down in normal position, or one in elevated position, as is well known in such detent mechanism.

Secured to the U-shaped frame plate 212 and carried thereby in any suitable manner are two upstanding side plates 225 and 226 (Fig. 8). To side plates 225 and 226 are attached the guide plates 220 and 221, as seen in Fig. 8. Thus, an extension of the pin carriage is provided and the upper portion of said carriage has cross connecting members, such as guide bars 227 and 228 on which certain members are slidably mounted, as well as supporting shafts 229 and 230 and cross bars 231 and 232 (see Figs. 6 and 10). These cross members provide a rigid frame which is an extension and part of the movable pin carriage.

Pivotally mounted on a rod 235 also carried by side frame members 225, 226 is a series of spring-urged latch members 236, each having a hook normally engaging a shoulder 237 of a series of setup slides or racks 238 slidably mounted in the pin setup carriage by the guide rods 227 and 228. A spring 239 attached to each rack 238 urges the latter to the right to cause the hook of the latch member 236 to normally engage the shoulder 237 of the associated slide 238. Each latch member 236 has an extension 240 adapted as the step of movement of the pin carriage moves the effective longitudinal series of stop pins out of engagement with the extensions 218 after a stop pin in said series has been set up, to engage the cam edge 241 of a stationary cam plate 242 (see also Fig. 7).

As is viewed in Fig. 7, if the first or left-hand longitudinal series of pins has been set up to represent the digit of the depressed key a step of movement of the pin carriage will cause the extension 240 of the latch 236 of the associated series to engage the cam edge 241 which cam edge will cause the rocking of the latch member 236 clockwise (Fig. 10) to disengage it from the setup slide 238. The spring 239 attached to said slide 238 will now move it to the right until a depending extension 243 thereof strikes the elevated pin stop 210, as is shown in Fig. 10 for the pin 210 elevated by the 3-digit key. It is, of course, understood that the release of the slide 238 occurs after the pin 210 has been raised and held elevated by the detent plate 222. Each slide 238 has rack teeth which mesh with a gear 244 having on the periphery numeral indicia which are visible through a slot in the cabinet so that the numerical value of the previously pressed key is exhibited. As the carriage moves step by step the indicia are brought into view, to represent a number which has been set up.

The escapement mechanism is provided for obtaining the step by step movement of the pin carriage to the left, as viewed in Figs. 7 and 12, as the several longitudinal series of pins 210 are set up by the successive depression of the keys. Underlying the ten pin raising arms 173 for keys 0–9 is a bail 250 secured to the rock shaft 178, said bail 250 having, as shown in Figs. 7 and 12, depending arms 251 and 252, said arm 252 having connected thereto a spring 253 which is adapted to return the bail to normal position after having been rocked by the arms 173. Arm 252 moves back and forth between a pair of adjustable stops 254 (Fig. 12) which limit the extent of rocking of the shaft 178 to which said bail 250 is secured and also an escapement operating arm 255. Secured to the shaft 178, as best shown in Fig. 12, is the escapement operating arm 255. Mounted on a fixed bracket 256 by a stud 257 on said bracket is an escapement dog 258 which is urged by its spring 259 so that a stud 260 carried thereby normally abuts a finger 261 of the escapement operating arm 255. The locking dog 262 is also pivoted on the stud 257 and rocked by a spring similar to spring 259 so that its tail 263 overlies a lug 264 offset from the escapement operating arm 255. An escapement rack 265 is carried by the side plates 225 and 226, said rack having escapement teeth 266 and the escapement rack 265 is of sufficient thickness so that the teeth 266 cooperate with both the locking dog 262 and the escapement dog 258.

When the pin setup carriage is at its normal position having previously been returned to such position, the locking dog 262 engages the extreme left-hand tooth of the escapement rack 265, as shown in Fig. 12, to hold the pin carriage at normal. When bail 250 is rocked downwardly through the first power operation of the selected pin raising arm 173 shaft 178 will be rocked counterclockwise and rock the escapement operating arm 255 in the same direction and by the offset lug 264 in cooperation with the tail extension 263 of the locking dog 262 the latter will be rocked clockwise against the action of its spring. In the meantime, however, spring 259 causes the stud 260 to follow the finger 261, allowing escapement dog 258 to be rocked upwardly as the locking dog 262 moves out of engagement with said first tooth, the pin carriage is now moved by its spring 217 (Fig. 8) a slight amount but not a full step of movement. When bail 250 is returned by its spring 253 escapement operating arm 255 will now be rocked clockwise and finger 261 acting on pin 260 will rock escapement dog 258 out of engagement with said first tooth. In the meantime, however, locking dog 262, is rocked upwardly to cause an ultimate engagement with the second tooth and when the escapement dog 258 fully clears said first tooth the spring 217 which moves the pin setup carriage will move it the remainder of the distance determined by engagement of locking dog 262 with the second tooth to thereby complete the first step of movement of the pin carriage. This form of an escapement mechanism is well known and its operation is only described herein, it being noted, however, that the escapement operation is not performed by the power applied to the keys but is operated by power derived from the solenoid 185 which, it will be recalled, is the instrumentality for rocking the selected pin raising arms 173 and bail 250. Hence, the customary power required by the keys in the previous pin mechanisms for operating the escapement is avoided, and by causing the power operation of the escapement mechanism the load upon the fingers of the operator is further lessened, which aids in a lightened key load and faster key operations.

It is also explained that the 9 key does not cause the setting up of any of the stop pins 210 because there is no pin raising extension 218 for the 9 key and no stop pin 210. Only the digit keys 0–8 inclusive raise stop pins 210. The arm 173 related to the 9 key, however, does operate the bail 250 to operate the escapement mechanism, allowing, as will be presently described, for a 9 digit setup a step of movement of the pin setup carriage.

Referring to Fig. 10 it will be recalled that upon setting up any of the stop pins 210 for the digits 0–8 setup slides 238 take a commensurate movement so as to cause square studs 270 carried at their rearward extremities to be displaced a differential extent rearwardly from hook portions 271 of now stationary actuating control slides 272. As the carriage moves step by step the setup slides 238 are also moved step by step so as to move one or more slides 238 to cause their studs 270 to move in the plane of the hook portions 271 of the control slides 272, said control slides 272 being, in the meantime during the keyboard operation, elevated as shown in Fig. 10 so as to allow this operative relationship to take place without interference.

It will be observed that whenever a 9 key is operated, although no stop pin 210 is set up, the latch member 236 associated with the longitudinal series of pins 210 now effective is, nevertheless, rocked to unlatch the associated setup slide 238 which will be moved by its spring 239 until its extension 243 strikes a rod 275. This rod is stationary during the operation of the keys and will allow the positioning of the stop stud 270 rearwardly so that a certain number of steps of movement may be given to the control slide 272 during the subsequent cycle of operation of the machine to enter the digit 9 and print the digit 9.

After the setup slides 238 have controlled the differential movement of control slides 272 during the cyclic operation of the machine in a manner to be presently explained, the latched pins 210 which have functioned as stops for setup slides 238 are depressed to normal position by the aforementioned rod 275. The pin carriage is being restored at the same time as will be described later.

The rod 275 passes through side frames 225 and 226 (see Fig. 8) and carries rollers at its extremities which roll in guide slots formed in castings 276. The rod 275 is connected by a pair of links 277 and 278 (Figs. 13 and 14) to respective rock arms 280 and 279 pivoted on a rod 281. The arm 279 has connected thereto a plate 282 having a bayonet slot 283, the vertical slot of which in the normal position of plate 282 engages a roller 284 of a follower arm 285 cooperating with a profile cam 286 connected to the main drive shaft 300. When said shaft is turned one revolution in a counterclockwise direction during the cyclic operation of the machine, effected by depression of a motor release bar 175, as will be presently described, the cam 286 will, through the linkage just described during the last portion of the cycle (see Fig. 63), cause rod 275 to be moved to the left to engage the upper bevel portions of the raised pins 210, thus depressing them to normal position and also thereafter engaging the shoulders 243 of each of the unlatched setup slides 238. The latter are moved back by the rod 275 to normal position where they are relatched by the latch members 236.

For returning the pin setup carriage to home position where it is held in such position by the escapement mechanism, the arm 280 (Figs. 6 and 14) carries a stud 290 which engages an upward extension 291 of a bell crank 292 pivoted on a stud 293. The arm 294 (Fig. 6) of said bell crank engages a pin 295 carried by the U-shaped plate 212 (see Figs. 10 and 13) and as the bell crank is rocked the pin carriage will be returned to normal at the end of the cycle and held at such normal position as shown in Fig. 12 by the locking dog 262, it being noted that during such return locking dog 262 merely ratchets over the teeth of the escapement rack 265. During the return of the carriage the carriage return spring 217 (Fig. 8) will also be retensioned as is evident.

Motor release bar

The cyclic operation of the machine for item printing, item entering, check feeding and other operations is initiated when a motor release bar 175 (Fig. 16) is depressed. As best shown in Fig. 1 the motor release bar 175 is positioned exteriorly of the cabinet of the machine for a manual depression.

The motor release bar 175 is mounted upon and carried by a slidably mounted key stem 296 carrying a contact roll 297 of insulation which, when the key stem is depressed, closes contacts 299 and opens contacts 298.

Opening of interlock contacts 298 opens the circuit to the solenoid 115 (see Fig. 64a) to prevent starting the rotation of the sorting drum while the machine is being cycled. Closure of contacts 299 completes a circuit from line feed 202, through contacts 299 (Fig. 64b), and through the following relay and mechanical interlock contacts which will be described later but which are all normally closed. R19c, R14d, R9a, R22c, R23c, R34b, R26a to R4b contacts now closed; other interlock contacts 143, R1b, R5b, 371, control key contacts 133, contacts 964, to clutch release magnets 301 to line side 200.

Referring to Fig. 16 there will be seen a ratchet clutch wheel 303 which rotates uninterruptedly by driving means now to be described. Secured to the constantly rotating motor driven shaft 20 of the machine is a sprocket gear 302 (Fig. 4) around which passes an endless chain 304 (Fig. 1) driving a sprocket gear 305 attached to a shaft 306. Attached to shaft 306 is a gear 307 meshing with a gear 308 loosely mounted on the shaft 300 and to which gear 308 the ratchet wheel 303 is fastened. Attached to the shaft 300 is a disk 309 pivotally carrying a spring-pressed clutch pawl 310 having a tail 311 normally engaged by a shoulder or a hook 312 of a clutch control arm 313. By means of a link 314 the clutch control arm 313 is connected to an arm 315 by a pin 316 carried by said arm 315 engaging a slot 317 in the end of the link 314, said arm 315 being secured to a rock shaft 319 and also having a slot receiving a pin 318 carried by the key stem 296. Attached to rock shaft 319 is a plate 345 (Fig. 14) carrying a pin 346 receiving a shoulder 347 of a spring-urged detent plate 348 when the motor release bar 175 is depressed to hold it depressed. At the end of the cycle a hook 350 of a link 277 will strike a finger 349 of detent plate 348 to unlatch the motor release bar 175.

From Fig. 16 it will be seen that the armature 330 of the magnets 301 is integral with the arm 313 so that the energization of magnets 301 will rock the clutch control arm 313 to remove the shoulder 312 from the tail 311, thereby permitting a spring 321 to rock the clutch pawl 310 into engagement with the ratchet wheel 303, thus rotating the drive shaft 300.

At about 260° of the rotation of shaft 300 a cam carried thereby will close cam contacts C2 (Figs. 64b and 62), thereby closing an obvious circuit through R23d interlock contacts now closed to the R4 relay. The latter will now open the relay contacts R4b, thereby opening the circuit to the clutch control magnets 301 and even if the motor release bar is held depressed it will be seen that a spring 322 will rock the armature 330 and clutch release arm 313 so that at the completion of one revolution of the disk 309 and therefore shaft 300 the shoulder 312 of arm 313 will engage the clutch pawl 311 and disengage it from the ratchet wheel 303. In this case the slot 317 in the link 314 will permit the movement of the link 314 to the left without effecting the movement of the motor release bar 175.

Figure 64D:
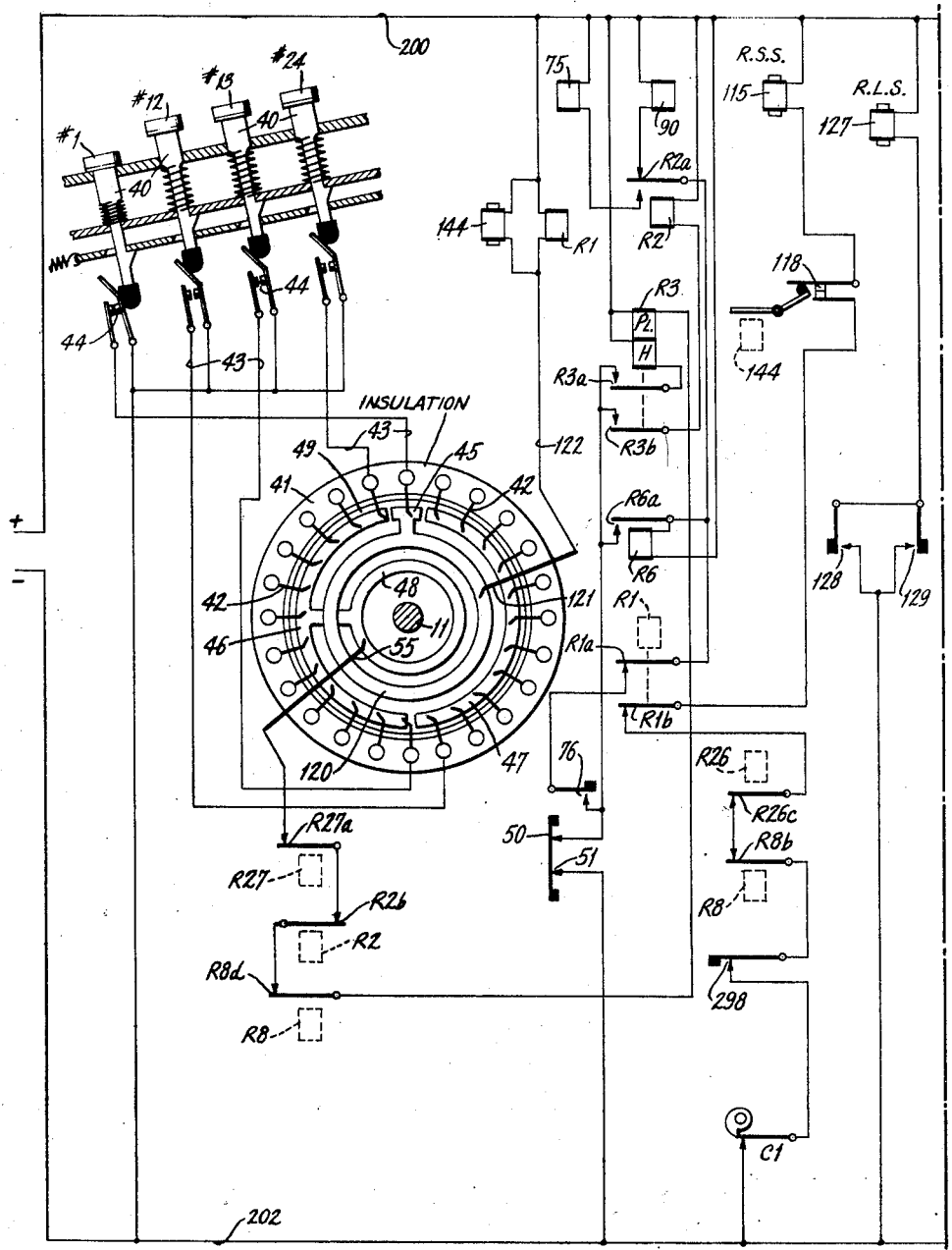
Figure 64B:
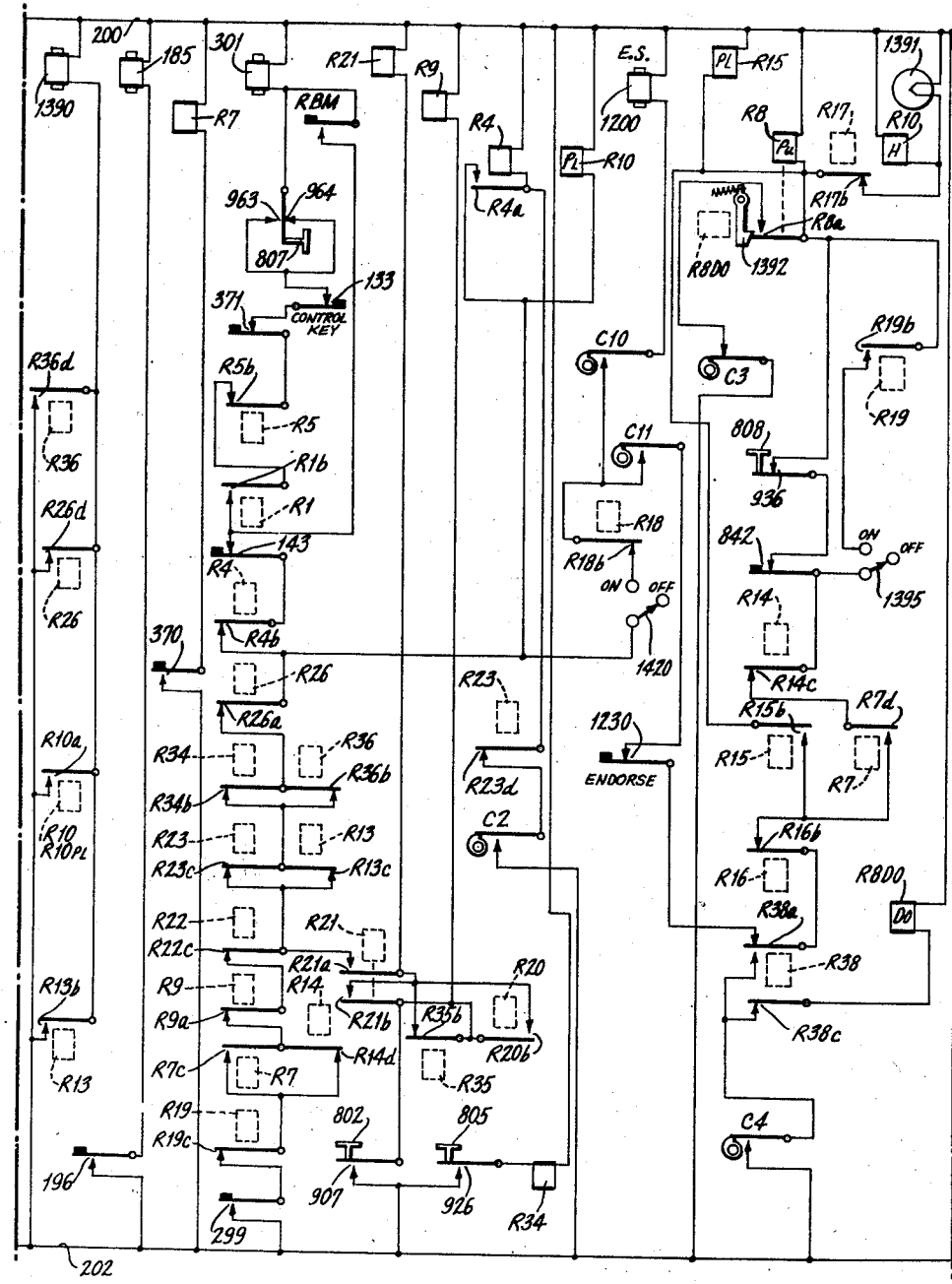

When the relay contacts R4a close it will be seen from Fig. 64b that the holding circuit for the R4 relay is closed to retain R4 relay energized, and its contacts R4b are opened as long as the motor release bar 175 is held depressed and contacts 299 are closed. When the release bar 175 is released after a cyclic operation spring 323 will raise the motor release bar 175 and key stem 296, opening contacts 299 to cause the de-energization of the R4 relay, the opening of the R4a relay contacts, and closing of the R4b relay contacts. Thus, only a single revolution of the drive shaft 300 can be effected for ordinary item entering and check feeding operations even if motor release bar 175 is held depressed. However, as will be subsequently described, if a group balancing operation is to take place and the first cycle indicates an agreement of a deposit ticket total with a group total, the R4 relay will not be energized because of opening of contacts R23d until a second cycle has been completed.

It should be further noted that when the motor release bar 175 is depressed the contact roll 297 carried by the stem 296 will permit contacts 298 to open, thus opening a circuit to the solenoid 115 and render the sorting drum selecting mechanism inoperative during the opening of these contacts.

Reference has been previously made to the C1 cam contacts and in this section to C2 cam contacts. These cam contacts as well as all other C cam contacts are controlled by cams rotated by shaft 300, to open and close their contacts with the timing shown in the timing diagram of Fig. 62.

As shown in Fig. 16, armature 330 causes, in an obvious manner, the closure of RBM contacts when clutch magnets 301 are energized. These contacts, as shown in Fig. 64b, shunt contacts R1b, R5b, 371, 133 and 964, some of which may open during the machine cycle, and thus RBM contacts provide for the proper energization of clutch control magnets 301 irrespective of their opening.

*Differentially operated operating mechanism controlled by the ten-key setup mechanism for effecting entries in accumulators, setting printing mechanisms, etc.*

The machine includes a differential mechanism which is controlled by the ten-key keyboard for effecting entries in a selected totalizer, setting up the different printing mechanisms, etc., and in order that the present improvements can be more clearly understood there will now be described how the ten-key keyboard mechanism controls the differential movement of control slides 272. It will be clear from Figs. 6 and 10 that as the setup slides 238 are released for differential positioning and also are moved laterally step by step to the left, the square studs 270 carried thereby come into the planes of the hooks 271 of the control slides 272. After the desired digits have been set up, one or more of the setup slides 238 will be positioned at the left by the carriage for securing this relationship. It often happens that the amount set up is less than the denominational capacity of the setup mechanism, which is nine digits herein, and for this reason it is necessary that when certain slides 238 are not set up that the associated control slides 272 be retained in their normal forward position or, otherwise, under the action of springs 334 (Fig. 17) connected to control slides 272 they will move rearwardly improperly. To this end by structural means to be more fully described later on, a square bar 325 (Figs. 8 and 10) is supported and carried by the pin carriage and is moved step by step as the digits are set up. The home or right-hand position of bar 325 is such that it will engage all the hooks 271 of all the control slides 272 when the latter are lowered if no digits were set up; but since the locking bar 325 moves step by step its right-hand end will pass out of locking cooperation with one or more of the right-hand control slides 272 depending upon the number of digits which are set up. For those setup slides 238 which are not moved the bar 325 will have a locking relationship with associated control slides 272 so that upon lowering of all the control slides 272 at the beginning of the first half of the cycle under control of cam 338 the hooks 271 of these control slides 272 will immediately engage said locking bar 325 and the latter will prevent them from moving rearwardly. Hence, in normal adding operations the locking bar 325 will lock the control slides 272 of those orders in which no digit or digits are to be entered. The remaining control slides 272 will move rearwardly during the first half of the cycle to commensurate digit positions, depending upon the particular digits set up in that order by the arrangement now to be described in detail.

Referring to Figs. 13, 17, 18a the control slides 272 are slidably mounted in a frame including side plates 326 having their right ends slotted to embrace a stud 327 pivotally supporting the frame. The left ends of the slides 272 are also slotted and are slidably mounted by studs on a rod 328 carried by the side plates 326 of the frame. Each of the control slides 272 carries a stud 329 at its right end which stud is embraced by the bifurcated end of one arm of a bell crank 330 loosely pivoted on a rock shaft 331.

The arms 330 are normally pressed against a bail rod 332 carried between a pair of arms 333 secured to the shaft 331 by springs 334 stretched between projections 335 at the lower sides of control slides 272 and rods 336 carried between the arms 333.

One of the frame plates 326 carries a roller 337 (Fig. 13) which, by the weight of the frame, engages the profile of a cam 338 secured to the main drive shaft 300. During the rotation of cam 338 beginning at 40° (Fig. 63) the left end of the frame drops to bring the hooks 271 into correlation with the square stop studs 270 so that by the movements of the control slides 272 to the right urged by springs 334 under control of the bail rod 332 the control slides 272 will move to the right until each hook 271 engages the correlated stop stud 270.

The rocking movement of the bail rod 332 is effected by the following described means illustrated in Fig. 17. It includes a pair of complementary cams 340 fast on the drive shaft 300 cooperating with rollers carried by a curved arm 341 pivotally supported on a rod 342. The link 343 connects the curved arm 341 with an arm 344 secured to the rock shaft 331. At each rotation of shaft 300 the cams 340 rock the arm 341 first clockwise and through the link 343 rock the arm 344 and rock shaft 331 counterclockwise until the control slides 272 are stopped in differential positions. The bail rod 332 continues its counterclockwise movement after the control slides 272 are arrested and thus merely stretching the springs 334 of these slides if they do not go to extreme positions.

The cams 340 then merely reverse this movement, rocking the arm 341 counterclockwise and through the link 343 and arm 344 rock the shaft 331, the arms 333 and rod 332 clockwise to restore the control racks 272 to their normal positions.

Subtraction key 177

In carrying out group balancing operations a subtraction entry is made when it has been found that the account does not balance, as will be described. Subtraction may be performed by any desired method but herein it is preferably carried out by the complemental method. For example, if the amount to be subtracted is $190.30 the tens complement of such amount is set up in the digit setup mechanism by depressing the proper keys of the ten-key keyboard. For the capacity of the present machine the amount which would be entered in the totalizer in which subtractions are to be effected would be, for the exemplary amount, 99999809.70. It should be noted that 9's complements are keyed for all columns to the last right-hand significant column (3, in the above example) and this last significant column is keyed as a 10's complement (or 7). The five 9's at the extreme left may be filled in by five successive 9 digit key operations, but to reduce the number of key operations the subtraction key 177 is provided which automatically fills in 9's to the left of the left-hand significant digit. The subtraction key 177 (Fig. 6) is positioned exteriorly of the cabinet. The function of this key is to rock the control slide stop bar 325 downwardly from its normal position so that even though the control slides 172 are rocked downwardly during the cyclic operation of the machine the hooks 271 of the control slides 272 associated with unkeyed columns will be out of the range of the depressed stop bar 325. These control slides 272 will then move the complete extent of their movement urged by springs 334 so as to enter 9's in the left-hand orders of the operated totalizer.

The stop bar 325 is attached by rivets 351 (Fig. 6) to a plate 352 attached to an arm 353 which is secured to the rock shaft 230 carried by the pin carriage. Thus, the stop bar 325 is carried by the pin setup carriage and moves step by step as the keys are successively operated. Attached to the shaft 230 at the other side (see Fig. 13) is a bell crank latch arm 354 to which is connected a spring 355 (Fig. 6) which normally retains the stop bar 325 in elevated position to prevent movement of the control slides 272 associated with unkeyed columns during normal adding operations as has been described. Referring to Fig. 14 the subtract key 177 is pivotally connected by a stud 356 to an irregular shaped plate 357 which is pivoted on a fixed rod 358, said plate having an arcuate guide slot 359 cooperating with a fixed guide stud 360. Said plate 357 has an extension 361 which normally rests over the bar 325 and in any position thereof. This arrangement enables subtraction key 177 to be depressed to fill in the 9's at the left preliminarily to the depression of any of the ten keys or after such keys have been operated to set up the tens complement of the digits. When the subtraction key 177 is depressed, extension 361 engaging the stop bar 325 will rock the frame carrying the bar 325 downwardly to such position that it is completely out of engagement with the hooks 271 even after the control slides 272 are moved downwardly during the cyclic operation of the machine. This relationship is maintained as shown in Fig. 13, by means of a shoulder 362 of a latch member 363 engaging one arm of the bell crank latch arm 354 which is secured to rock shaft 230. A spring 364 extended between the latch member 363 and an arm of the bell crank latch arm 354 maintains this latching relationship. Thus, during the cyclic operation of the machine the stop bar 325 will be latched out of the path of the control slide hooks 271. At the end of the cyclic operation of the machine a pin 365 (Fig. 13) carried by the arm 279 will engage a depending extension 366 of the latch member 363, rocking the latter to unlatching position and freeing the frame carrying the rod 325 which is then again rocked by spring 355 to normal position.

Referring to Fig. 14 the plate 357 has a curved finger 367 underlying the stop bar 325 which is engaged by the latched-down bar 325 so as to retain the subtraction key 177 in depressed position. When said bar is unlatched the subtraction key 177 is then returned upwardly to its normal position.

The left end of stop bar 325 overlies a blade of normally open contacts 368 (Fig. 16). When the subtraction key 177 is depressed contacts 368 will be latched closed. Referring to the wiring diagram closure of contacts 368 will close an obvious circuit to the R14 relay (Fig. 64c), the function of which relay R14 will be described later in connection with subtracting operations.

Ten-key escapement contacts 370

Referring to Fig. 7 there will be seen contacts 370 which are opened at the home position of the pin setup carriage having been moved to such opened position by the right end of the escapement rack 265 when the pin carriage was previously returned to home position. When the pin carriage escapes at least one step to the left, contacts 370 close to energize the R7 relay (Fig. 64b) by an obvious circuit. Its contacts R7c (Fig. 64b) are interlock contacts in the energizing circuit of the clutch magnets 301 and are normally open to prevent a cyclic operation by the motor release bar 175 unless at least one digit is set up. Otherwise the depression of the subtraction key 177 alone, and no digit key 160, would allow entering of improper 9's which would give the effect of subtracting 1¢. While the R14d interlock contacts (Fig. 64b) opens this energizing circuit when the subtraction key 177 is depressed, the R7c contacts in shunt therewith close it, insuring the setup of at least one digit.

Ten-key bail contact

These contacts 371 (Fig. 9) are normally closed but are opened by the operation of any of the ten keys 160 to open the energizing circuit for the clutch magnets 301 (see Fig. 64b); thus, preventing the possibility of cycling the machine while the keys 160 are being operated. From Fig. 9 it will be seen that one arm of bail 190 has a depending extension carrying an insulating disk bearing against one blade of the normally closed contacts 371. Movement of bail 190 by any of said keys 160 opens in an obvious manner the interlock contacts.

Rack operating mechanism

Referring to Figs. 17 and 18a the nearly horizontal arm of each bell crank 330 is also bifurcated and straddles a stud 375 carried by a vertically disposed slide 376. There is a bell crank 330 and vertical slide 376 for each control slide 272 but an additional slide 376 is provided for units carries.

The vertical slides 376 are guided near their upper end by combs 377, at the bottom center by combs 378, and at the extreme bottom by combs 379, all of which are secured to and extend between fixed side frame plates 380 (Figs. 18a, 18b) and 381 (Figs. 21a, 21b).

At the upper end, each vertical slide 376 carries type elements 382 slidably mounted therein, and spaced vertically along each slide 376 are totalizer actuating racks 383, 384 and 385. The purpose of the bell crank 330 is to transmit the differential movement of a control slide 272 to the associated vertical slide 376 for the purpose of positioning a selected type element 382 to a printing position and for positioning racks 383, 384, 385 in the first half of the cycle upwardly for actuating during a downward movement the several totalizers to be described later, in the second half of the cycle to enter the amount set up on the ten-key digit setup mechanism.

*Compartment totalizers*

By means to be presently described in detail, when the slides 376, and therefore racks 385, have been moved upwardly differential distances a totalizer associated with the selected check receiving compartment is moved into engagement with the differentially displaced racks 385. In the present machine there are 24 compartment totalizers 390 (Figs. 18b and 21b), each consisting of a series of pinions which are differentially rotated by the racks 385. The series of pinions comprising a totalizer 390 are carried by a shaft 391 the ends of which are slidably mounted in slots 392 of side plates 393 and 394 each carried at one side of the sorting drum 10. The guide slots 392 are radial with respect to the center of the supporting shaft 11 of the sorting drum. Each end of the totalizer supporting shaft 391 has fixed thereto a spring connector plate 395 between which and a stud carried by either of the side plates 393 or 394 there is extended a spring 396; a pair of springs 396 for each totalizer shaft 391 forcing the totalizer inwardly so that pinions thereof normally engage locking plates 397 fixedly mounted between the side plates 393 and 394.

When the sorting drum is moved to a position which positions a selected compartment for operation, rollers 398 carried at each end of a totalizer shaft 391 will have passed into and are now engaged by arcuate slots 399 (Fig. 21c) at the extremity of arms 400 fixed to a rock shaft 401. There are two of such arms 400, each positioned at one side of the side plates 393 and 394. Said slots 399 are concentric with respect to shaft 11, so that passage of rollers 398 therethrough as the drum 10 rotates will not rock arms 400 or move the totalizer. Each of said arms 400 carries a stud 402 engageable with a cam slot 403 of an associated arm 404 secured to a rock shaft 405. Said arms 404 are rocked so that cam slots 403 will rock arms 400 clockwise and by the engagement of slots 399 with the rollers 398 a selected compartment totalizer 390 will be engaged with the operating racks 385 after they have been raised with slides 376 to differential positions.

The means for rocking arms 404 on item entering operations will now be described with reference to Figs. 21a and 21b. An adding engaging slide 410 is mounted to slide vertically on studs 411 projecting from the frame 381. The slide 410 is provided with a lower recess 413 in its right-hand edge. A stud 412C carried on the left-hand end of a link 414 normally projects in the recess 413. The other end of the link 414 has a bayonet slot 415, the vertical slot of which normally engages a stud 416 carried by a bell crank 457C pivoted on a stud 418 projecting from the frame 381. The horizontal arm of the bell crank 457C carries a stud 420 for a purpose to be later described. A spring 423 normally holds the bell crank 457C in the position in which it appears in Fig. 21b, holding the stud 412C in the slot 413 of the adding engaging slide 410. A link 424 connects the stud 412C with one of the compartment totalizer engaging cam arms 404.

The mechanism for actuating the slide 410 is best shown in Fig. 19 and includes a cam 425 driven by the drive shaft 300. A groove 426 of cam 425 embraces a roller 427 on follower arm 428 pivoted on a rod 342 which is connected by a link 429 with an arm 431 pivoted on rock shaft 331. Secured to said rock shaft 331 is an arm 432 which projects into a recess in the left side of the totalizer engaging slide 410.

After the control slides 272 and the vertical slides 376, which carry the actuator racks 383, 384, 385 have been differentially moved and racks 385 are elevated, cam 425 at about 200° (Fig. 63) rocks follower arm 428 clockwise which in turn through link 429 rocks the arm 431 and arm 432 counterclockwise to raise the adding engaging slide 410.

Referring now to Figs. 21a and 21b, it is clear that the upward movement of slide 410 carries the stud 412C and link 424 upwardly and due to the connection with one of the cam arms 404 and the attachment of both arms 404 to shaft 405, these arms are rocked clockwise and through the previously described connection with the arms 400 the latter are rocked to move the totalizer shaft 391 of the selected totalizer 390 to engage its pinions with the now raised racks 385. Now when the slides 376 and racks 385 are restored downwardly, as the control slides 272 are restored to the left to a normal position, the amount previously set up in the ten-key setup mechanism will be added into the selected compartment totalizer 390.

Shortly after the slides 376 are fully restored and the amount has been entered, cam 425 at about 340° reverses the operation of the follower arm 428 and through the linkage described lowers the adding engaging slide 410. Thus, downward movement of slide 410 reversely rocks the cam arms 404 to disengage the selected compartment totalizer 390 from the racks 385.

*Group totalizer and grand totalizer*

In addition to the compartment totalizers 390 which are selected by the predetermined extent of rotation of the sorting drum 10, there is also provided a totalizer 450 (Fig. 18a) herein known as the "grand totalizer" and a totalizer 451 (Fig. 18b) as the "group totalizer." The pinions of the group totalizer 451 are carried by a rod 452, the ends of which are slidably mounted in slots 453 (Fig. 21b) formed in the side frame plates 380 and 381. The pinions of the grand totalizer 450 are mounted on a rod 454 and are similarly carried by the side frame plates 380, 381. Aligning plates 455 and 456 are provided to prevent accidental displacement of the respective totalizer pinions when respective totalizers 450, 451 are out of mesh with their respective actuating racks 383 or 384. The grand totalizer 450 and group totalizer 451, unless otherwise provided for, are engaged at the same time a selected compartment totalizer 390 is engaged during each item entering operation.

The means for engaging the grand totalizer 450 and the group totalizer 451 with their actuating racks is substantially the same as that described for engaging the selected compartment totalizer 390 with its actuating racks and is also effected by means of the adding engaging slide 410. It will be seen that the bell crank 457GD (which is similar to bell crank 457C) controls the position of the engaging stud 412GD (Fig. 21a) so that said stud may have an engagement with the adding engaging slide 410 to engage the grand totalizer 450 with racks 383. Said engaging stud 412GD has a link connection 424GD with the totalizer engaging cam arms 404GD which are provided with cam slots to engage and disengage the pinions of the grand totalizer with racks 383. Therefore, the upward movement of the adding engaging slide 410 elevates the link 424GD and through the cam arms 404GD rocks the grand totalizer wheels 450 into engagement with the respective actuating racks 383.

In view of the fact that the same engaging mechanism is provided for the group totalizer the description thereof need not be repeated, it being seen that the controlling bell crank 457GP has a similar function, that is, in its normal position the stud 412GP is in engagement with the related notch of the adding engaging slide 410 to engage the pinions of the group totalizer 451 with the racks 384.

Vertical slide aligner

Aligning means are provided to align the vertical slides 376 in their adjusted positions during the time that the type elements 382 are being operated to take the impression on the record material of the control tape printer. This means includes an aligning plate 435 (Figs. 18b and 20) slidably mounted on studs 436 projecting inwardly from the frames 381 and 380.

The aligning plate 435 is also pivotally mounted on a pair of arms 437 secured to a shaft 438 mounted in the frames 380 and 381. Secured to the shaft 438 outside of the frame 380 is an arm 439 connected by a spring 440 to an arm 441 loosely mounted on the shaft 438. The spring 440 normally retains an ear 442 of the arm 441 against the upper edge of the arm 439. A link 443 connects said arm 441 with an arm 444 secured to a rock shaft 445, and secured to and depending from said rock shaft 445 is a follower arm 446 cooperating with a cam groove 447 of a cam 448 secured to the main shaft 300. After the vertical slides 376 have been adjusted under control of the ten-key digit setup mechanism, the cam 448 rocks the follower arm 446 and shaft 445 counterclockwise and through the arm 444 and link 443 transmits this movement to arm 441, rocking this arm clockwise about the shaft 438 and stretching spring 440. The spring 440 transmits the movement of the arm 441 to the arm 439 and the shaft 438, rocking the arms 437 clockwise to draw the aligner plate 435 toward the left, as viewed in Figs. 18b and 20 to cause the aligning plate to enter one of a plurality of notches 449 formed in the right edges of the slides 376. The spring 440 is provided to prevent breaking or mutilation of parts in the event that the aligner plate 435 meets with resistance during this operation.

After the impression is taken from the type elements 382 the cam 448 reverses the movement of the mechanism, rocking the arm 441 counterclockwise and through the ear 442 rocks the arm 439, shaft 438 and arms 437 counterclockwise, withdrawing the aligning plate 435 from the slides 376. It is immediately after the withdrawal of the aligner plate 435 that the slides 376 are restored downwardly to their normal position to effect the item entering operation in the selected compartment totalizer 390, the group totalizer 451 and the grand totalizer 450.

Transfer mechanism

Associated with each of the various totalizers is a units carry or transfer mechanism which is provided to carry "one" to a higher order totalizer wheel whenever the wheel of the next lower order passes from 9 to 0. This transfer mechanism includes the racks 383, 384 and 385 which are permitted to make an additional step of movement downwardly when the slides 376 are moved downwardly to enter an amount into the totalizer. The racks 383, 384, 385 are normally prevented from making this additional step of movement by ears 460 on transfer pawls 461 pivoted on a rod 462. Arms 463 integral with the pawls 461 extend forwardly into the path of the usual transfer tooth provided on each totalizer wheel except the one of the highest denominational order. As is well known this transfer tooth (which is not shown) consists of a lateral projection adapted to cooperate with the arm 463 of the associated transfer pawl 461. As the racks 383, 384 and 385 are carried downwardly to effect the entry of the amount set up by the ten-key digit keyboard a totalizer pinion of lower denominational order may pass from 9 to 0 so that the transfer tooth strikes the arm 463, rocking the transfer pawl 461 counterclockwise to remove the ear 460 from the path of the downwardly moving rack of the next higher denominational order. This rack may then continue its downward movement one additional step to carry one to the totalizer wheel of the next higher denominational order.

When any transfer pawl 461 is rocked counterclockwise it is latched in retracted position by a spring-urged detent 465, a series of such detents for each totalizer being loosely pivoted on a rod 466. The left-hand hook portion of a detent 465 is adapted when a transfer pawl has been rocked to hook over a projection 467 of said transfer pawl 461. Those transfer pawls 461 which have been actuated and latched counterclockwise during an entry portion are retained in their operated positions until released in the next following adding operation when the detents 465 are rocked clockwise to free the transfer pawls 461 to the action of their springs 468. The mechanism for causing the transfer pawls 461 to be unlatched comprises for each totalizer a pair of arms 469 loosely pivoted on the rod 466 and carrying a bail rod 470 overlying each of the detents 465. Each rod 470 extends over the tails of all of said detents so that when it is rocked downwardly it will rock detents 465 to disengage them from the transfer pawls 461 which then are returned by springs 468 to normal position. It will be seen that this arrangement is substantially duplicated for the group totalizer 451, the grand totalizer 450, and the compartment totalizers 390. One of the arms 469 for each of the detent releasing mechanisms is connected by a pin 471 to a link 472 and thus all of the three detent releasing mechanisms are connected for simultaneous movement by the aforesaid link 472. The link 472 has a pin and slot connection 473 to an arm 474 secured to a rock shaft 475. To said shaft 475, as shown in Fig. 17a, there is attached an arm 476 connected by a link 477 to a follower arm 478 pivoted on the rod 342. The follower arm 478 carries a roller 479 in engagement with a cam slot 480 of a cam 481 secured to the main drive shaft 300. Early in the machine cycle of an adding operation the cam 481 rocks the follower arm 478 clockwise which movement is transmitted by the link 477 to rock the arm 476 and shaft 475. Rocking of said shaft through the arm 474 moves link 472 downwardly, thereby rocking the frames carrying the restoring rods 470 associated with the three detent releasing mechanisms. Said rods 470 will rock the detents 465 out of engagement with the transfer pawls 461 to permit springs 468 to restore transfer pawls 461 to their normal position in the path of the racks 383, 384 and 385.

Means is also provided to raise those racks 383, 384, and 385 which have been allowed to move one step downward for the purpose of transferring a units carry from a lower to a higher denominational order. Such means is substantially the same as in the aforementioned patent to F. L. Fuller et al., No. 2,142,352 to which reference may be had for a full description of the construction and operation of such rack elevating mechanism. Suffice it to say that it includes a frame 480 having three transversely extending cross members 482, 483 and 484 (Fig. 18b), each extending just beneath the associated racks 383, 384 and 385. This frame is slidably mounted in the frame plates 380 and 381 and to said rock shaft 475 there are secured arms 485 each having a pin and slot connection 486 to said frame. When said link 472 is rocked downwardly to rock the detent pawls 465 to release the transfer pawls 461, the frame 480 and its cross members 482, 483 and 484 are raised so that by engagement with the lower ends of the racks 383, 384 and 385 said racks are restored to their normal position. At this time, the transfer pawls 461 are released by said detents 465 and the ears 460 resume their position in the paths of the racks 383, 384 and 385 to maintain the racks in their normal position until transfer again occurs.

*Check pawls*

After an impression has been taken from the type elements 382 and the aligner plate 435 has been moved out of engagement with the aligning teeth 449 of the slides 376 said slides are moved downwardly to normal positions to enter the amounts in the totalizers. When the slides 376 have reached the limit of their upward travel under the influence of the bail 332 and springs 334 under control of the ten-key digit mechanism, the slides 376 would snap upwardly to their extreme position by their springs 334 when aligner plate 435 is moved to disengaging position, were it not for the provision of means to prevent this improper operation. The release of certain slides 376 is also due to the fact that cam 338 (Fig. 13) is now effective to elevate the control slide supporting frame 326, disengaging the hooks 271 of certain control slides 272 from the stop bar 270. The means provided to prevent this misoperation becomes effective before the aligning plate 435 is moved to a disaligning position and comprises a series of check pawls 490 (Fig. 18b) pivoted on a shaft 491 and urged to rock clockwise by springs 492. A bail rod 493 underlies the series of check pawls 490 and prevents such movement. The bail rod 493 is secured to the shaft 491 and to said shaft 491, as shown in Fig. 21b, there is secured an arm 494 engaging a recess 495 of the adding engaging slide 410. The positioning of the check pawls 490 coincides with the engagement of the totalizers in entering operations and advantage is taken of the movement of the adding engaging slide 410 to move the pawls 490 to position to lock slides 376 to prevent their improper upward movement. When said adding engaging slide 410 is elevated, rock shaft 491 is rocked clockwise, pawls 490 following the bail rod 493 under influence of springs 492 until the ends of the pawl rest either in notches 496 or the aligning teeth 449 of the control slides 376, depending upon the position of said slides.

As the slides 376 are moved downwardly by bail 332 to enter the amount into the totalizers the pawls 490 ratchet idly over the teeth 449. Of course, when the adding engaging slide is moved downwardly bail 493 will be rocked counterclockwise, thus rocking the check pawls 490 out of engagement with the slides 376 and thus to the normal position shown in Fig. 18b.

*Control tape printer*

It was stated above that means is provided to take an impression from the type elements 382 when the slides 376 are in their adjusted digit positions. The printing mechanism for effecting the impression is known herein as the "Control Tape Printer." This printing mechanism is supported by frame plates 500 (Fig. 21a) and 501 (Fig. 18a) mounted on rods 502 projecting between the main side frames of the machine. At the proper time, after the slides 376 are adjusted, hammers 504 loosely pivoted on a shaft 505 extending between the side frame plates 500 and 501 are released and springs 503, there being a spring 503 for each hammer 504, throw the hammers against the selected type elements 382, pressing each selected type element against the main control tape 507 to print thereon the amount set up by the type elements 382.

The springs 503 normally urge the hammers 504 clockwise but a bail 508 secured to the shaft 505 normally restrains the hammers 504 in their retracted latched positions. The operating mechanism for the bail 508 includes an arm 510 fast on the shaft 505 connected by a link 511 (Fig. 21a) to an arm 512 on the shaft 331. Said arm 512 has a depending arm 513 which is connected by a link 514 (Fig. 31) to a follower arm 515 loosely pivoted on the rod 342. A roller 517 on the arm 515 projects into a cam groove 518 in the side of a double faced cam 516 fast on the main drive shaft 300. At the proper time the cam groove 518 rocks the cam arm 515 clockwise, thrusting the link 514 to the right, rocking the arms 513 and 512 counterclockwise. This movement through the link 511 rocks the arm 510 and the shaft 505 clockwise to rock the bail 508 (Fig. 18a) also clockwise to free the hammers 504. At this time, springs 503 endeavor to rock the hammers 504 clockwise but tails 520 (Fig. 18a) integral with said hammers are at this time in contact with shoulders on individual tripping arms 521 pivoted on a shaft 522 and extending between the side frames 500 and 501 to prevent operation of the hammers 504 unless the slides 376 are adjusted to select the digit type elements 382 to digit positions 1–9, as will now be described.

Each of the tripping arms 521 is pivotally connected by a stud 523 to a bar 524 urged by a spring 525 against the underside of a stud 526 in the associated slide 376. The stud 526 normally holds a shoulder 527 on the bar 524 beneath the path of movement of a bail 530 integral with bail 508 and adapted to be operated therewith.

When the slide 376 is adjusted upwardly the stud 526 moving upwardly therewith permits the spring 525 to rock the bar 524 counterclockwise, bringing the shoulder 527 into the path of the tripping bail 530. Now, when the bail 530 rocks clockwise it picks up the bars 524, thrusting them towards the left to rock the tripping arms 521 clockwise, thus freeing the tails 520 of the hammers 504 to their springs 503, whereupon these springs 503 throw the hammers 504 clockwise to take the impression.

Immediately after the impression is taken the cam 516 acts to rock the shaft 505 and bail 508 counterclockwise, restoring the hammers 504 to their normal retracted position. As the tail 520 passes the shoulder of each tripping arm 521 the springs 525 draw these arms into position to be caught by the shoulders of the tails 520.

The stud 526 on the slide 376 normally holds the bar 525 two spaces below their respective tripping positions so that when the slide 376 moves to a blank or 0 position, this bar will be ineffective to trip the hammer 504, even though the 0 type element 382 is in printing position when a 0 is set up in the ten-key digit mechanism. The purpose of this arrangement is to prevent the printing of 0's in each denominational order to the left of the order where a significant digit 1–9 is printed, as "8" in the number 000863. Each of the tripping arms 521 is provided with the customary crossover lug 532 to the next lower order arm 521 so that if a 0 is set on the slide 376 to the right of a significant digit order the crossover 532 will rock the tripping arm 521 of the denominational order having the 0 set thereon to permit the hammer 504 associated therewith to print the 0, as in the number —000803.

The record tape 534 upon which the impressions are made by the control printer is unwound from a roll 535 and passes between the platen 536 and a guide plate 537.

Means is provided to rotate the platen the extent of one line space for each item printing operation and such means is fully shown and described in the aforementioned patent to F. L. Fuller et al., No. 2,142,352. Suffice it to say that this is effected by means of a reciprocating plate 540 (Fig. 21a) having a feed pawl extension 541 in engagement with a ratchet wheel 542 rotatable with said platen 536. The inking mechanism comprises an inked ribbon which is adapted to be unwound from one spool onto another in the customary manner, one of said inked ribbon spools 543 being seen in Fig. 21a. This inked ribbon is interposed between the type elements 382 and the main control tape 507. Conventional means is also provided to feed and reverse the direction of feed of the ribbon which is not shown herein.

Compartment printers

As each check is fed into a selected compartment and the amount of the check is entered into a corresponding compartment totalizer 390 (Fig. 18b) the amount of the check, in addition to being printed on the control tape as previously described, is also printed on one of 24 compartment tapes located at the rear of the machine. These 24 individual compartment tape printers correspond to the 24 compartments in the sorting drum and to the 24 compartment totalizers 390. Each time a compartment selector key is depressed to select a compartment the corresponding compartment totalizer 390 and the corresponding compartment printer are selected. These compartment printers are arranged in precisely the same manner as in the aforesaid patent to F. L. Fuller et al., No. 2,142,352, in three vertical rows across the back of the machine and each of the printers is provided with a group of type segments 550 (Figs. 18a, 18b, 24) comprising a plurality of denominational orders. These type segments 550 are mounted on a series of shafts 551 mounted in a pair of vertical frames 552 secured to the rear of the machine. The segments 550 are provided with arms 553, each of which arms for a vertical group is operatively connected to the same link 554 so that when one of said segments 550 is selectively adjusted all segments 550 of that particular order and in the particular vertical group are correspondingly adjusted.

The segments 550 of one group are provided with segmental gears 555 which mesh with segments 556 on one end of the double arms 557 pivoted on a shaft 558. These double arms 557 have pin and slot connections 559 to the associated slides 376. When these slides 376 are adjusted upwardly for setting the printing elements 382 the double arms 557 are rocked, segments 556 rock segments 555, thus correspondingly adjusting through links 554 the type segments 550, said links 554 being elevated against the action of return springs 560 connected to said links 554.

It may be noted here that the springs 560 (Fig. 18b) and the springs 334 (Fig. 17) previously described operate at different times and are tensioned at different times in order to distribute the work done by the machine and also to distribute the action by the springs. Suppose, for instance, that one denominational order is to be set to "5" under the control of its ten-key setup mechanism; as the bail 332 (Fig. 17) moves counterclockwise the particular control slide 272 moves therewith without placing additional tension on the spring 334 associated therewith until said control slide 272 is stopped by the "5" position of the control rack slide 238 (Fig. 10). Until this occurs the springs 560 (Fig. 18b) which were previously tensioned exert their tension downwardly on the links 554 thus assisting to adjust these links and through the double arm 557 assist in adjusting the vertical slides 376. After the control slide 272 is stopped the bail 332 continues its invariable excursion tensioning the spring 334.

At the restoring movement the springs 334 now being under greater tension than they were previously assist in restoring the bail 332 until said bail picks up the control slide 272. From there on to the home position the bail 332 positively restores the control slides 272, vertical slides 376 and the links 554 together with all of the type segments 550 of that particular denominational order, tensioning the springs 560 as the links 554 involved are raised.

In order to adjust the type segments 550 of the remaining two vertical groups of printers one segment of each denominational order for each group is secured to one of the shafts 551. For example, the units segment 550U in the lowermost group is fast on the shaft 551U (Fig. 18b) upon which it is mounted. Likewise the units segments 550U for the two other groups mounted on this particular shaft 551U are also fast on this latter shaft. Now movement of the units link 554 in the vertical group shown in Figs. 18a and 18b by the spring 560 and under control of the units slide 376 sets all of the units segments 550U for this vertical group of printers. This movement is transmitted by the lower shaft 551U to the units segments 550U for the lowermost printers of the two other vertical groups, and, these latter segments being operatively connected to their units link 554, set all of the units segments 550U in their respective vertical groups.

It can thus be seen that all of the 24 units type segments 550 are simultaneously and correspondingly adjusted under the control of the previously described ten-key setup mechanism.

This applies also to all of the denominational order segments 550. However, since there are ten denominational order segments 550 in each of the 24 groups and eight shafts 551, it is necessary to provide two additional or auxiliary shafts 561 (Fig. 18a) and 562 (Fig. 18b) to transmit the movement of these two denominational orders to the two other vertical groups of segments.

The printing mechanisms are all alike and the eight printers of each group are mounted in a removable common frame comprising side plates 565 (Figs. 21a and 21b) and 566 (Figs. 18a and 18b). Referring to Fig. 24 a platen 567 is mounted in an arm 569 secured to a rock shaft 570. This shaft is journaled in the plates 565 and 566 and has secured to one end thereof an arm 571 (Fig. 23). A stud 572 carried by the arm 571 extends across the plane of an arm 573 loosely mounted on the shaft 570, the arm 573 having a strong spring 574 attached thereto which normally holds the arm 573 against a stop block 575 secured to the plate 566.

An arm 579 (Fig. 22) is fast on the other end of the shaft 570 adjacent a lever 580 rotatably mounted on the shaft 570. One arm of the lever 580 pivotally carries a tripping pawl 581 having an ear 582 adapted to be held normally against a pin 583 on the lever 580 by a spring 584.

At the proper time during the operation of the machine after segments 550 have been set the lever 580 is rocked clockwise, and after having traveled a short distance a projection 585 on the tripping pawl 581 engages the arm 579 and rocks the arm, the shaft 570, arm 571 (Fig. 23), and through the stud 572, the arm 573 clockwise against the tension of the spring 574, until a tail 587 on the tripping pawl 581 (Fig. 22) strikes a stud 588. When this occurs the lever 580 continues its travel, rocking the pawl 581 counterclockwise past the arm 579.

As soon as the arm 579 is free of the projection 585 the spring 574 (Fig. 23) throws the arms 573, 571, shaft 570 and the platen 567 (Fig. 24) sharply counterclockwise. The arm 573 strikes and is arrested by the stop block 575 but the momentum of the hammer carries the platen 567 against the types on the segments 550 to take the impressions therefrom. A spring 590 (Fig. 23) restores and holds the stud 572 against the arm 573 in which position the platen is clear of the type segments.

On the return stroke of the lever 580 the projection 585 on the pawl 581 (Fig. 22) wipes by the end of the arm 579 whereupon the spring 584 restores the pawl 581 to normal position.

The impressions for each compartment printer are taken on an individual tape or web 591 (Fig. 22) which is unwound from a supply roll 592 supported between the plates 565 and 566. The tape passes around the shaft 570 and then between a feed roller 593 and a tension roller 594. After leaving these rollers the tape passes rearwardly over a roller 595 from which the tape may be torn off to accompany the group of checks taken from the corresponding compartment.

The feed roller 593 is mounted on a shaft 596 journaled in the plates 565 and 566, and has secured thereto a ratchet 597 (Fig. 25) which co-operates with a feed pawl 598 pivotally carried by an arm 599 pivoted on the shaft 570. A stud 600 on the arm 599 is embraced by a bifurcated arm 601 fast on a shaft 602 mounted in the plates 565 and 566. A link 603 (Fig. 22) connects an arm 604 fast on the shaft 602, to the other arm 605 of the lever 580.

Now when the lever 580 is rocked clockwise to retract and then to trip the hammer, through the link connection 603 it rocks the arm 604, shaft 602 and arm 601 (Fig. 25) also clockwise. This movement rocks the arm 599 counterclockwise to advance the feed roll 593 (Fig. 24) one step. A spring 606 (Fig. 25) maintains the feed pawl 598 in cooperative relationship with the ratchet wheel 597.

The restoring movement of the lever 580 under the influence of a spring 607 (Fig. 22) reverses the movement of the arm 599 to retract the pawl 598. A retaining pawl 608 (Fig. 25) under spring tension cooperates with the ratchet 597 to prevent retrograde movement thereof.

It was stated above that there are three printer frames each comprising plates 565 and 566. Each of these frames is joined near its upper end by a rod 610 (Fig. 18a) and near its lower end by a rod 611 (Fig. 18b) and each of these frames is removably supported in the machine in the following described manner:

A rod 612 (Fig. 18b) joins the lower ends of the frames 552 and open slots 613 in the frames 565 and 566 are adapted to be seated over the rod 612, thus supporting the printing frame. Pivotally mounted on a rod 614 joining the upper ends of the frames 552 is a latch comprising a pair of arms 615 joined by a rod 616 and urged clockwise into engagement with the rod 610 by a spring 617. When it is desired to remove one of the printer frames the operator first rocks the latch 615 free of the rod 610 and by grasping the latter may rock the entire printer frame clockwise about the rod 612 (Fig. 18b) whereupon the frame may be lifted from the machine.

An ink ribbon 620 (Figs. 18a and 18b) is provided for each group of eight compartment printers. This ribbon is adapted to be wound on and unwound from spools 621 and 622 (Figs. 18a and 18b, respectively). The ribbon 620 passes between the groups of type segments 550 and the paper strip of the corresponding compartment printing mechanisms. Suitable means has been devised to reversely feed the ink ribbon from one spool to the other for each printer frame, which is fully shown and described in the aforementioned patent, No. 2,142,352, to which reference may be had for details of construction and operation.

*Compartment printer selection*

Only one of the 24 compartment printers is operated during an operation of the machine. The particular compartment printer to be operated is selected under control of the compartment selecting and compartment totalizer selecting mechanism. This mechanism includes three print hammer selector bars 625, 626, and 627 (Fig. 27) slidable vertically and spaced apart to be in front of the related bank of compartment printers. Each of the selector bars has two elongated slots 628 and 629 (see also Figs. 21a and 21b), the upper slot 628 (Fig. 21a) receiving a stud 630 carried on the upper end of a lever 631 pivotally supported on one of the side frames 552. The lower slot 629 (Fig.

21b) embraces a stud 632 carried at the lower end of a lever 633 also pivotally mounted on the same side frame plate 552. A stud 634 carried by the upper arm of the lever 633 projects through a cam slot 635 in a cam arm 636 fast on a shaft 624 and also extends through a hole in the lower end of the lever 631.

In order to effect a selection of one of the compartment printers it is necessary that the selector bars 625, 626 and 627 be shifted vertically in a manner to be described to bring the proper one of a series of ears 637 (Figs. 21a, 21b and 27) bent at right angles to the bars into cooperative relation with a flattened stud 638 (see Fig. 22) connecting the link 603 to the arm 605 of the lever 580 of the associated printer.

The bars 625, 626 and 627 are indirectly adjusted under control of the compartment selector keys 40 which, it will be recalled, control the rotation of the sorting drum for selection of the sorting compartments and the compartment totalizers. The movement of the selector bars 625, 626 and 627 is such that in a rotation of the sorting drum from a certain position bars 625 and 627 move together but both complete their selecting movement before bar 626 commences its movement.

Referring to Figs. 18b and 27, rotatable with the sorting drum is a heart-shaped asymmetrical cam 640 which rotates to different positions according to the selected compartments. Since the sorting drum does not make a complete rotation at each selecting operation but is adjusted directly from the last selected position to the newly selected position by the shorter of two directions of rotation the cam 640 is correspondingly adjusted. The profile of the cam 640 is such that it will cause the selection of the 24 compartment printers for operation by the following described arrangement. Cooperating with the heart-shaped cam is a follower roll 641 of an arm 642 pivoted on a stationary stud 643 carried by a suitable machine frame plate. A spring 644 attached to the follower arm 642 maintains continued cooperation between the cam 640 and the follower roll 641. Slidably mounted by suitable guide plates in the frame plate 380 is a link 645 which is articulated to the follower arm 642 by a pin 646. At the upper end of the link 645 the latter is articulated by a pin 647 (see Fig. 27) to a bell crank arm 648 loosely mounted on the shaft 518 and having a bent-over lug attached by means of a screw 650 to a bail 649 which is loosely pivoted upon said shaft 518. Thus, the cam 640 through the linkage mechanism just described positions and rocks the bail 649 which correspondingly adjusts the selector bars 625, 626 and 627 by the following described mechanism.

Loosely pivoted on the shaft 518 is a finger 651 which fits in a slot of a block 652 secured to one side of the selector bar 625. A spring 653 connected to the selector bar 625 normally urges the latter downward so that the block 652 rests upon the finger 651. By the action of the spring 653 attached to the selector bar a depending extension 654 of finger 651 bears against the bail 649 to cause said finger 654 to follow the position of the bail 649. The bar 626 is also provided with a block 655 and loosely pivoted upon the shaft 518 is a finger 656 which is urged by a spring 657 so that the finger 656 is continually pressed against the block 655. Said finger 656 also has a depending extension 660 which, as shown in Fig. 18a, is disposed at the other side of bail 649 so that only in certain rotated positions of the bail 649 will it make contact with the depending extension 660 and move it in either direction with bail 649. Likewise, a finger 663 abuts the block 664 of the associated selector bar 627 by the action of a spring 665 attached to selector bar 627, said finger 663 also being loosely pivoted upon the shaft 518 and having a depending extension 666 bearing against the bail 649 so that said finger 663 and finger 651 may follow the movement of the bail 649 together.

Assuming now that the sorting drum is in a position for selecting compartment printer No. 1 the parts will be in the position shown in Figs. 18a, 18b, 21a, 21b and 27. As the drum 640 is rotated to select any of the compartments 2-8 and 17-24 the finger 651 and finger 663 will follow the movement of the bail 649, allowing the selector bar 625 to move downwardly by the spring 653 so that its ears 637 move into cooperation with the studs 638 of printer frame No. 1, and selector bar 627 is moved downwardly by the spring 665 so that its ears 637 move into cooperation with the studs 638 of printer frame No. 3. The ears 637 of selector bars 625 and 627 are so disposed that only one ear 637 will be in cooperation with a stud 638. In more detail, the ears 637 of selector bars 625 and 627 come into effective position in succession for two successive steps of movement of both selector bars. If the compartments 1-8 and 17-24 were selected in succession they would be selected by the selector bars 625 and 627 according to the following table:

| Step or Steps of Movement of Sorting Drum From Normal | Selector Bar Having an effective ear 637 | Sorting Compartment and compartment printer Selected |
| --- | --- | --- |
| 1 C. W. (clockwise) | 625 | 1 |
| 1 C. C. W. (counterclockwise) | 627 | 24 |
| 2 C. W. | 625 | 2 |
| 2 C. C. W. | 627 | 23 |
| 3 C. W. | 625 | 3 |
| 3 C. C. W. | 627 | 22 |
| 4 C. W. | 625 | 4 |
| 4 C. C. W. | 627 | 21 |
| 5 C. W. | 625 | 5 |
| 5 C. C. W. | 627 | 20 |
| 6 C. W. | 625 | 6 |
| 6 C. C. W. | 627 | 19 |
| 7 C. W. | 625 | 7 |
| 7 C. C. W. | 627 | 18 |
| 8 C. W. | 625 | 8 |
| 8 C. C. W. | 627 | 17 |

In the extreme downward position of both selector bars 625 and 627 for the selection of compartment printer No. 17 the slots 628 and 629 therein will nearly rest on the guide studs 630 and 632.

When compartments 9-16 are selected the bail 649 will allow selector bars 625 and 627 to rest directly upon studs 630, 632 and ears 637 thereof are in effective position. The position of the drum to select compartments 9-16 will position the bail 649 correspondingly, and said bail 649 will engage the extension 660 and rock the finger 656 downwardly against the action of the spring 657, allowing a spring 667 to move the selector bar 626 downwardly so that its ears 637 will select, according to the position of cam 640 and finger 656, the compartment printers of the No. 2 group of compartment printers. The ears 637 of selector bar 626 are so disposed that when bar 626 is at its highest position it will select the top printer. One step down will cause its lowest ear 639 to select the lowermost printer, then the second printer from the top, then the second printer from the bottom, etc. At the extreme lowermost position of the selector bar 626 the latter will come into such position that the top part of the slot 629 in said selector bar rests upon the stud 632 and the top part of slot 628 rests on the stud 630.

Obviously, if the sorting drum is rotated to any point or position away from the position in which the cam 640 appears in the drawings the bail 649 will receive a corresponding movement and position an ear 637 on any of the selector bars 625, 626 or 627, but on one of said bars only, opposite the stud 638 associated with the printer which corresponds to the selected compartment and the selected totalizer.

After the selector bars 625, 626 and 627 have been adjusted as set forth all said bars are simultaneously moved to the right for the purpose of operating the selected printer. This movement is effected by rocking the cam arm 636 (Fig. 21b) clockwise by which movement the cam slot 635 in said arm acting on a stud 634 rocks the lever 631 clockwise and the lever 633 for each bank of printers counterclockwise. Thus, the selector bars 625, 626, 627 are shifted in parallel movement towards the printers and the particular ear 637 which was positioned opposite a stud 638 moves this stud towards the right (Fig. 22), rocking the lever 580 clockwise to effect the printing and paper feeding operations in the manner previously described.

As soon as the printing is completed the cam arm 636 is restored counterclockwise to normal, retracting the selector bars 625, 626 and 627 and permitting the spring 607 (Fig. 22) to restore the hammer actuating mechanism to normal.

Figure 31:
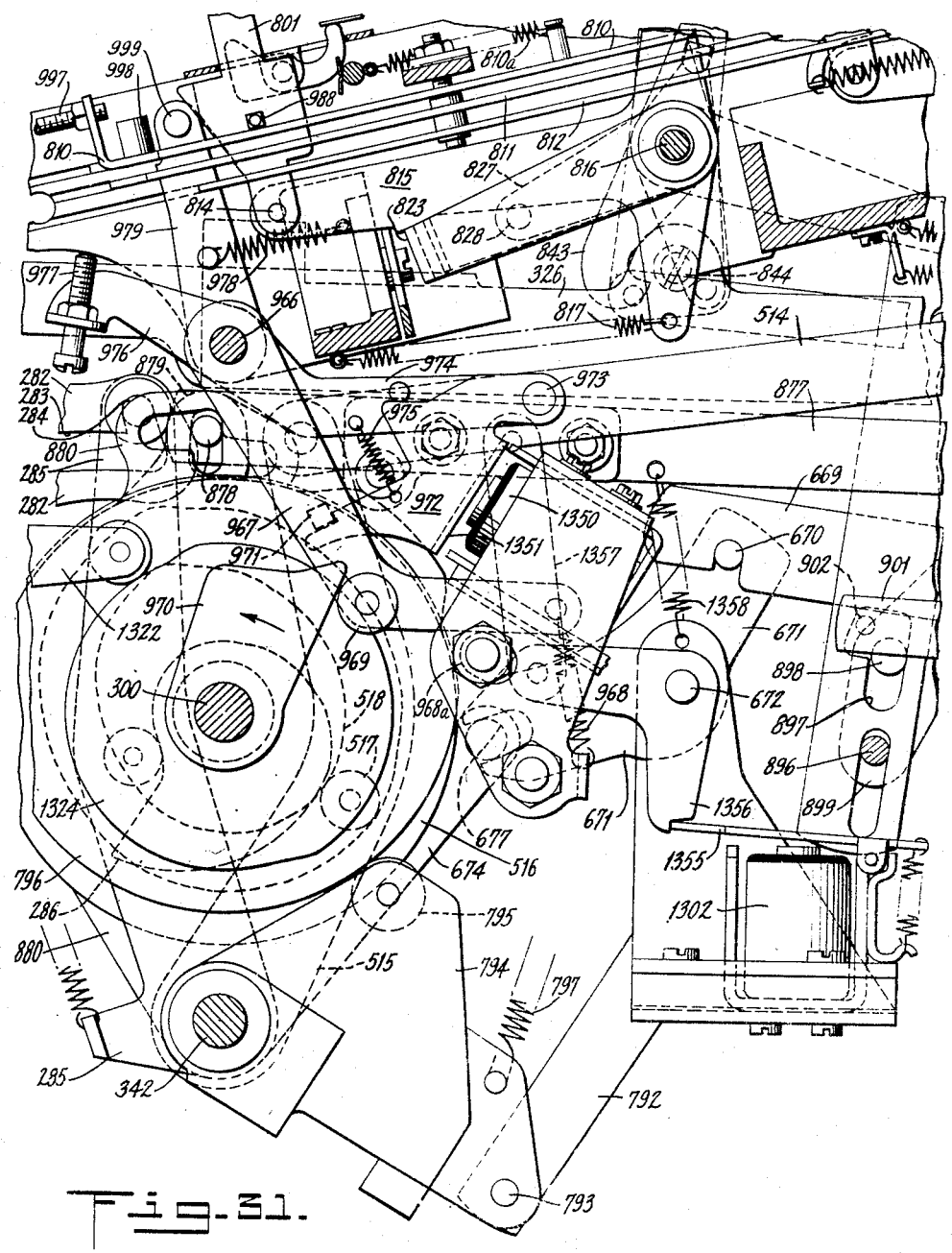
Fig. 31 is a side elevational view showing some of the operating cams and associated operating trains, together with a part of the keyboard associated with the control keys.

The mechanism for operating the cam arm 636 is best shown in Figs. 18b, 21b and 31.

Figure 32:
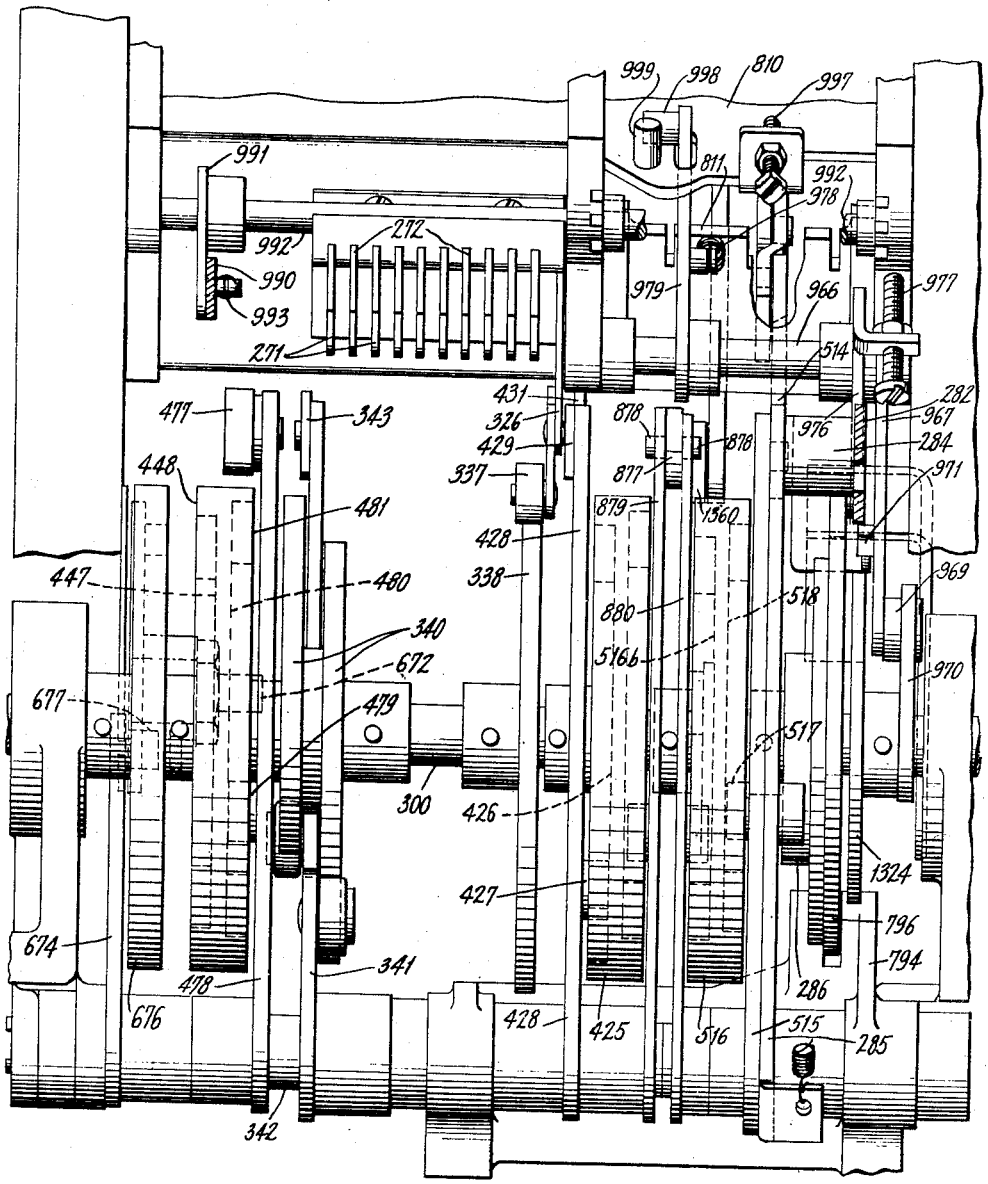
Fig. 32 is a front elevational view showing some of the operating cams and associated cam followers.

An arm 668 secured to the shaft 624, to which the cam arm 636 is secured, is pivotally connected to a link 669 having an open slot at its opposite end (Fig. 31) normally engaged by a stud 670 carried by an arm 671 pivoted on a stud 672 and which has an open slot in its free end embracing a stud 677 carried by a follower arm 674 pivotally mounted on the rod 342. An antifriction roll carried by said follower arm 674 projects into a cam groove 675 in a cam 676 (Figs. 32 and 41) fast on the cam shaft 300.

After the proper sorting compartment, compartment totalizer and compartment printer have been selected under control of the selector keys 40 and the amount has been set up in the ten-key mechanism under control of the ten-key keyboard 160, the release bar 175 is depressed whereupon shaft 300 makes one complete rotation during which rotation the cam 676 rocks the follower arm 674 first clockwise and then counterclockwise. This rocks the arm 671 first counterclockwise to draw the link 669 toward the left and then clockwise to return the link towards the right to normal position. The reciprocating movement of the link 669 rocks the shaft 624 (Figs. 18b and 21b) to effect the rocking of the printer operating cam arm 636 to shift all selector bars 625, 626 and 627 to operate the selected compartment printer hammer, feed the printed record tape and the ink ribbon of the selected compartment printer.

The cam 676 (Fig. 31) reverses, during the latter part of its rotation, the movement of the parts just described to restore said parts to their normal positions.

*Compartment number printer and compartment indicator*

Means is also provided to set a visible indicator which the operator may look at before he depresses the motor release bar to release the machine for a check feeding and amount entering operation, thus being able to determine whether the proper compartment, associated totalizer and compartment printer have been selected for operation before cycling the machine. In addition a printing bar is adjusted to print on the control tape a numeral indicating the particular compartment into which a check is fed. These elements are preferably adjusted under control of the compartment printer selecting mechanism previously described.

As shown in Fig. 27 loosely mounted upon the shaft 518 is a bell crank 680 having an integral lug 681 attached to the bail 649 by means of a fastening screw 682. One arm of said bell crank carries a stud 683 fitting in an elongated slot of a bracket 685 attached to a vertically mounted rack bar 686. The latter carries at its upper end type elements 687 adapted to print the numerals 1–24. Said type elements are positioned to one side of the amount printing elements 382 so that by a type hammer 504 shown in Fig. 18c a type element 687 will be struck to print a number which corresponds to the compartment selected.

It will be noted that bar 524 associated with the compartment number type bar 686 is drawn by its spring 525 against a lug 531 (Fig. 18c) so that said bar 524 is engaged by the bail 530 and moved to the left to rock tripping arm 521 so as to disengage it from the tail 520 to release hammer 504 for operation by its spring 503. The lug 531 is maintained in the position shown in Fig. 18c during normal amount printing operations, thus causing the printing of the compartment number adjacent each amount printed on the main control tape. As will be later described, this compartment number printing is selectively suppressed for certain operations.

There is also provided an indicator wheel 688 rotatably mounted on a stud projecting from a suitable frame. Numerals indicating the compartments are engraved or otherwise suitably marked on the periphery of the wheel 688 which is visible through a sight opening to enable the operator to read at the front of the machine the numeral brought to exposed position. Rotatable with the indicator wheel is a pinion 690 meshing with a gear 691 which, through an intermediate gear 692, is driven by a pinion 693 secured to a stub shaft 694. The stub shaft 694 has secured at one end a pinion 695 meshing with the teeth of the rack bar 686.

The vertical adjustment of the rack bar 686 is transmitted through the gear train 695, 693, 692, 691 and 690 to the indicator wheel 688, rotating the latter to a position showing a numeral corresponding to the selected compartment.

Because of the flexible keyboard construction for the compartment selector keys, fully shown and described in the patent to F. L. Fuller, No. 2,142,352, in the event that the operator has found that the proper and correct compartment has not been selected another selector key may be depressed and the correct compartment may be selected before the machine is cycled and the check is fed.

*Zero elimination mechanism for compartment printers*

When items are entered in the machine and the amounts thereof printed on the main control tape and on the selected compartment tape, the zeros to the left of the highest order where a significant digit 1–9 is printed are not printed because the associated control slides 272 are held back in their home or blank positions by the locking bar 325 (Fig. 10). The type elements 382 of the main control tape printer and the type segments 550 of the compartment tape printers are normally held below their respective printing lines and only those control slides 272 and type segments 550 of denominational orders in which digits 1–9 are set up under control of the ten keys 160 move out of their blank positions, and consequently zeros are not printed unless they are under control of the zero key.

However, on total taking operations the control slides 272 are latched up to permit the entire rack system to be set up under control of the selected totalizer, compartment group or grand. Obviously, if no means were provided to prevent the control slides 272 of higher denominational orders from moving, these slides would move to zero positions under control of the zero or transfer teeth on their respective totalizer wheels. To overcome this a zero elimination mechanism is adapted to become operative on taking totals from either of the aforesaid totalizers. This device functions only when printing totals on the compartment printers; since, in taking the group and grand totals these are only printed on the main control tape and the zero elimination mechanism functioning in connection with the main control tape printer functions for this printer.

In view of the fact that this zero elimination mechanism is different from that shown in the aforementioned patent to F. L. Fuller et al., No. 2,142,352, it will be described in detail with particular reference to Figs. 28, 29 and 30.

Mounted above the control slides 272 and over the rear ends thereof is a frame comprising spaced frame plates 775 which are interconnected by a plurality of cross rods 776 and a special cross rod 800. Each control slide has a notched portion forming an inclined shoulder 777 and in the plane of each control slide 272 there is pivoted on a common supporting rod 778 an associated zero elimination pawl 779. Each zero elimination pawl 779 is urged by a connected spring 780 to rock downwardly and has a hook 781 which is adapted to fall either on the top surface of the associated control slide 272 for digit positions 1–9, or to drop below said surface so that said hook 781 hooks rearwardly onto the shoulder 777 when any control slide is moved from the blank to the zero digit position. In the latter case a leftward movement of this zero elimination pawl, by means to be described, will move the control slide 272 back to normal position, thereby moving the zero type element of the associated printing segment 550 of the same order of the compartment printer down to such normal position that the zero character will not be printed.

Normally, all of the zero elimination pawls 779 are held up during item entering operations by a rod 782 which is carried by the side members 783 of a bail 784 which is pivoted on a rod 785 carried by said frame plates 775. Previous to taking a total bail 784 is rocked counterclockwise, lowering rod 782 and enabling the springs 780 of the zero elimination pawls to rock the latter so that they will rest upon the fixed rod 800, holding all of the zero elimination pawls so that they are slightly above the upper edges or surfaces of the control slides 272. Thereafter, during a cyclic operation of the machine, by means to be described, the pawls 779 are moved to the left, bringing them away from the rod 800 so that they may move further downwardly to rest either upon the top of the control slide 272 or to cause the hook 781 to catch over the shoulder 777, it being noted that the supporting rod 782 has previously been moved to such a position that this operation may take place.

The means for moving all of said pawls 779 so that they may rock downwardly a further amount and also to the left to restore certain control slides 272 to normal is accomplished by a cam driven by the main drive shaft 300.

Pivoted on said rod 785 which is carried by the side frame plates 775 is a casting 786, said casting having extending ears 787 carrying a pin 788 to which a link 789 is connected. The construction is that there is a pair of spaced links 789 and at their forward ends said links receive the rod 778. Rod 778 is slidably mounted in slots 790 in the frame plates 775. Pivotally connected by a stud 791 to one side of the casting 786 is a link 792 connected by a pin 793 to a follower casting 794 pivoted on the rod 342. Said casing carries a follower roller 795 to cooperate with a profile cam 796 secured to the shaft 300. A spring 797 attached to said follower casting 794 maintains the roller 795 against the cam 796 and holds the toggle system in the position shown in Fig. 28.

After the slides 272 have been set to differential positions an eccentric portion of cam 796 acting upon the roller 795 will draw link 792 downwardly, rocking the toggle system comprising the links 789 and the casting 786, forcing the rod 778 to the left. This will move the rearward ends of the zero elimination pawls 779 away from the rod 800, allowing them to rock further to rest either upon the top surface of the control slide or cause hook 781 to catch over shoulder 777.

Movement of the rod 778 further to the left will now cause certain of said slides to be retracted to their normal positions, moving the zero type of the associated compartment printing segments 550 out of printing position and maintaining them in such position at the time that the platen 567 is operated. Thus, zero printing for higher denominational orders will be eliminated.

During the rest of the operation of the cam 796 the parts will be operated in a reverse manner, zero elimination pawls 779 thus being rocked upwardly as they coact with the fixed rod 800. As soon as the total key is released the bail 784 is returned to normal and the supporting rod 782 will elevate the zero elimination pawls and hold them upwardly as shown in Fig. 28 in normal inoperative position.

Of course, such retraction forwardly of the control slides 272 and movement of the associated compartment printing segments 550 would take place in all orders where a 0 is to be recorded. However, this should not occur for the lower orders to the right of the highest significant digit order, for example, in the amount 2,500.00. Accordingly, the zero elimination mechanism also includes means to insert such 0's to the right and comprises a stud 798 which is carried by each zero elimination pawl 779 and which is underneath a lateral extending lug 799 of the zero elimination pawl 779 of the next lower order.

Fig. 30 shows the manner in which a stud 798X of the zero elimination pawl 779 associated with the highest significant digit order "2" holds up all zero elimination pawls 779 of lower orders. The control slides 272 of such lower orders are moved from blank to 0 and their associated zero elimination pawls 779 will be held up so that associated control slides 272 will not be retracted, and thus remaining at 0 position will allow the 0 digit printing from the compartment type segments 550 of the selected compartment printer.

The means whereby the bail 784 is rocked and the rod 782 is lowered to lower the zero elimination pawl 779 under control of the compartment, grand and group total keys will be later described in detail.

Control key unit

The control key unit consists of a plurality of keys which controls certain functions of the machine, such as the taking of totals from the compartment, group and grand totalizers; effecting entries in both the group and grand totalizers so the machine may be used as an adding machine, and to also effect the printing of numerical data on both the compartment or control tape printer or the control tape printer alone without entering these amounts in any totalizer, as well as to take a progressive total of a selected compartment group or grand totalizer. This unit consists of three rows of keys totaling eight in all. In the lower row there is provided a compartment total taking key 801, a group total taking key 802 and a grand total taking key 803 (see Fig. 35a). In the next row there is a key release key 804, an adding machine key 805, and a non-add C key 806 which permits printing of the entered amounts on the control tape printer only. The third row consists of two keys which are new over the control key unit in the aforementioned patent to F. L. Fuller et al., No. 2,142,352 and comprises a progressive total taking key 807 to take a progressive total from a selected compartment, group or grand totalizer, and a supplemental Non-Add C&C key 808 which functions differently from the aforementioned Non-Add C key 806 in that printing is effected on both the compartment and main control tapes, as will be explained.

In the control unit there are provided three slidably mounted plates 810, 811 and 812 (Fig. 33), the uppermost plate 810 comprising a locking plate which is adapted to keep any of the depressed keys in depressed position and prevent depression of any unoperated control key when the cyclic operation of the machine has been instituted. The intermediate plate 811 is a detent plate which is adapted to latch the grand total key 803, group total key 802 or Non-Add C key 806 until the detent plate 811 is reciprocated at the end of the cycle. The lowermost plate 812 is an interlock plate which is adapted, as will be explained, to prevent the simultaneous depression of certain of two keys, which if depressed together would cause the machine to function in an improper manner.

With particular reference to the compartment total taking key 801 (Fig. 36), group total key 802 and grand total key 803 (Figs. 39 and 40), each has a key portion slidably mounted in a guide plate 813 beneath the machine cabinet and pivoted by a stud 814 to a related bell crank arm 815 pivoted on a rod 816, one arm of said bell crank having a spring 817 connected thereto for restoration of the depressed key. Each of said keys 801, 802, 803 is provided with a cam edge 818 adapted to bear against one edge of the associated slot in the detent plate 811 so that when the key is depressed said detent plate 811 will be moved to the left against the action of the connected spring 819 (Fig. 33) whereupon a full depression of the key will cause a shoulder 820 of the key to be positioned underneath the detent plate 811 which is now shifted by its spring 819 to the right so as to cause the detent plate to move over the shoulder 820 and latch the key in depressed position. This is the customary form of key detent plate which is well known in the calculating machine art. The detent plate 811 is reciprocated to release keys 802 and 803 at the end of a machine cycle but the compartment total taking key 801 is released when desired by the depression of the key release key 804 which reciprocates detent plate 811 in a manner which will be subsequently explained.

Control of zero elimination mechanism by key 801

It will be recalled that the zero elimination mechanism previously described is conditioned for effecting its function when the compartment total taking key 801 is depressed. Underlying each of the key levers 815 for the compartment total taking key 801, group total key 802 and grand total key 803 is a bail 823 loose on said shaft 816 so that upon the depression of any of these keys the bail 823 will be rocked. Loosely mounted on shaft 816 is a sleeve 826 (Fig. 34) which has attached thereto a forwardly extending arm 827 (Figs. 34 and 36) which is connected to a side arm of bail 823 by means of a pin 828 so that movement of bail 823 is communicated to the sleeve 826. Also secured to said sleeve 826 is an upstanding arm 829 to which a spring 830 is secured, said spring 830 functioning to return the bail 823 and connected parts to normal upon the release of any of the keys which rock said bail 823. Also mounted on the shaft 816 adjacent the sleeve 826 is a supplemental sleeve 831 having secured thereto an upstanding arm 832, provided with a lug 833 fitting in a notch in the arm 829. This is a mechanical means of attaching sleeves 826 and 831 for simultaneous movement. Secured to said sleeve 831 is a double arm comprising the upstanding arm 835 and a depending arm 836, said latter arm being connected by a stud 837 to a link 838 which is fastened at its rearward end by a pin 839 (Fig. 33) to one side arm of the zero elimination conditioning bail 784. Through the aforesaid connection a depression of the compartment total key 801 will cause said sleeve 831 to be rocked counterclockwise, causing arm 836 to be rocked in the same direction, and rocking bail 784 counterclockwise so that the zero elimination pawls may be moved downwardly to effective position. Of course, such operation also occurs when the group total key 802 and the grand total key 803 are depressed but since the group and grand totals are not printed on the compartment tape, the zero elimination mechanism is inoperative for printing such totals.

Incidental functions of keys 801, 802, 803

Said upstanding arm 835 is adapted when rocked counterclockwise or forwardly to press against a plate 840 and through a button 841 of insulating material open disabling contacts 842 (Figs. 34 and 36). The purpose of these contacts which are opened by any of the control keys, except Non-Add C&C key 808, is to disable a circuit (Fig. 64b) which detects the failure of a check to feed. Ordinarily checks are not fed when such control keys are utilized and therefore the effectiveness of this circuit is nullified.

Another function of the three total taking control keys 801, 802 and 803 is to latch the frame which carries the control slides in uppermost position so that it will not drop downwardly as in item entering operations to allow the control slides 272 to move freely to differential positions. This is carried out by having the arm 829 provided with a depending hook portion 843 which is adapted to catch underneath a rod 844 (Figs. 28 and 31) carried by the frame plates 326 in which, it will be recalled, the control slides 272 are slidably mounted. Hence, in taking such totals the frame cannot drop under control of the rotation of cam 338 as it does during item entering operations.

*Total taking mechanism—compartment totals— key 801*

In order to take a total from a selected compartment totalizer the operator first depresses the compartment selector key 40 corresponding to the particular totalizer from which it is desired to print the compartment total, then depresses the compartment total key 801, if it is not already down, and then the motor release bar 175 for each compartment total taking operation to initiate cyclic operation of the machine to effect printing of the total from the selected compartment totalizer 390 on the associated compartment tape and the main control tape. While the compartment total key 801 is latched down by detent 811 it remains latched down at the end of each compartment total cycle until a key release key 804 is operated, as will be explained.

It will be recalled that operation of the compartment total key 801 latches up the frame in which the control slides 272 are slidably mounted. A further function of the compartment total key 801 is to condition the total taking mechanism so that the compartment tape printing segments 550 and the control tape printing type elements 382 (Fig. 18a) present to printing positions digit type which correspond to the total amount on the selected compartment totalizer 390. To this end, as best shown in Fig. 34, the horizontal arm of the bell crank arm 815 is attached to a spacing collar 845 to which an upstanding arm 846 is also attached (Fig. 36). A pin 847 connects said arm 846 to a link 848 and said link is pivoted at its other end by a pin 849 to a plate 850 partially encircling a shaft 851 to which shaft an arm 852 is connected and which is pivotally connected by a pin or rivet 853 to said plate 850. A bracket 854 (Fig. 35b) is connected to the rear end of link 848 by attaching pins 855 and said bracket 854 is bent or offset so as to have a pin connection 857 with the forward end of a thrust member 856–5. The member 856–5 extends rearwardly as shown in Fig. 43 and at its free end has a notch 858 adapted to receive the vertical arm of a bell crank 859 which is pivoted upon a rod 860. The horizontal arm of said bell crank is received by a notch of an associated control slide 861–5. Through the linkage just described the depression of the compartment total key 801 is adapted to rock the bell crank lever 859 counterclockwise so as to elevate and place in operative position a compartment totalizer control slide 861–5 provided for a purpose which will be presently described.

There are five of these control slides 861–1 to 861–5, one of each for the compartment total key 801, group total key 802, grand total key 803, add machine key 805 and Non-Add C key 806, and each differently conditions the machine. These five slides 861 are slidable vertically in the frame 381 (studs 863, Fig. 21b, being the guiding means at the bottom) and are provided with notches 864 cooperating with the studs 420 carried by bell cranks 457GP and 457GD and 457C (Fig. 41). Another total engaging slide 865 (Fig. 44) slidable vertically on studs 866 on the frame 381 and having three recesses 867 (Fig. 41) is provided to engage the selected totalizer with the racks on total taking operations. A bar 868 fixed on the studs 411 (Fig. 41) has notched ears 869 and provides recesses 870 (Fig. 44) in line with the recesses 413 in the slide 410 and the recesses 867 on the slide 865 to provide neutral positions for the engaging studs 412C, 412GD, 412GP.

It will be recalled that the stud 412C is carried by the link 414 associated with the compartment totalizer and similarly for the studs 412GD adn 412GP, associated with the grand and group totalizers, respectively. These studs are adapted to be shifted to one of three positions, that is, from the adding recesses 413 in slide 410 to the neutral recess 870 in the ears 869 in neutral bar 868 or to a total recess 867 of said total engaging slide 865. It is by the rocking of the bell cranks 457C, 457GD and 457GP that the studs 412C, 412GP, 412GD are placed selectively in either of the three positions. Referring now to Figs. 21a and 21b, it will be seen that the notches 864 of the slide 861–5 associated with the compartment total key 801 are of different lengths, relative to the studs 420 of the bell cranks 457C, 457GD and 457GP.

With particular reference to control slide 861–5 operated by the compartment total key 801, it is desired to engage the adding racks 385 (Fig. 18b) with the selected compartment totalizer 390 at total taking time, that is, before the slides 376 are moved upwardly. To accomplish this the flattened stud 412C is drawn all the way to the right into the associated notch 867 of the total engaging slide 865. At the same time it is necessary to prevent engagement of the grand totalizer 450 and the group totalizer 451 with their respective adding racks 383 and 384, for which reason the studs 412GD ad 412GP for these totalizers are shifted into the neutral recesses 870 in the ears 869 of the stationary plate or bar 868. To effect this movement the slots in the control slide 861–5 associated with the studs 420 of the bell cranks 457GP and 457GD are such that the latter bell cranks receive lesser movement with respect to bell crank 457C and just sufficient to shift the studs 412GP and 412GD from the adding engaging slide 410 to neutral positions. When the machine is subsequently operated the racks 385 will be engaged with the selected compartment totalizer 390, the total taken therefrom and printed on the corresponding compartment printer as well as the main control tape.

Attached to the total engaging slide 865 is a pin 875 (Fig. 43) receiving a bifurcation at the end of the horizontal arm of a bell crank arm 876 pivoted on the shaft 331, the vertical arm having a connection to a link 877. A stud 878 at the end of link 877 has a special selective connection to one of a pair of follower arms 879 and 880 (Fig. 32) according to whether a totalizer should be cleared or not cleared in taking a total. For the present it will be assumed that stud 878 is positioned for a movement by the follower arm 879 so that by the action of cam portions 425a, 425b and 425c in the side of cam 425 link 877 will be rocked to secure the desired enmeshing and demeshing of the selected compartment totalizer 390 and its racks 385 to take a total therefrom and clear the same.

The configuration of the cam groove 425a (Figs. 43a and 63) is such that approximately between 40–60° in the cyclic operation of the machine (Fig. 63) it rocks the follower arm 879 clockwise and through link 877 rocks the bell crank 876 to raise the total engaging slide 865. Since pin 412C is now in engagement with a recess 867 of control slide 865 link 424 (Fig. 21b) will be elevated to raise both cam arms 404 and thus rock arms 406 clockwise and by virtue of their engagement with the totalizer shaft 391 of the compartment totalizer which is in actuating position, the selected compartment totalizer 390 will be moved radially on the sorting drum so as to engage the totalizer pinions with the racks 385. Now, when the slides 376 are moved upwardly by the mechanism shown in Fig. 17 and previously described, the totalizer pinions of the selected compartment totalizer will be rotated backward to zero where they are arrested by the usual transfer teeth thereon, striking the arms 463 of the transfer pawls 461. When the slides 376 are arrested the bail 332 (Fig. 17) continues its invariable movement, stretching the springs 334. Of course, as the slides 376 are moved upwardly to differential positions, the control slides 272 are moved by springs 334 to the right through the interconnecting bell cranks 330 (see Fig. 17). Since the frame 326 has been latched in its upward position this will allow control slides 272 to move freely and the slides 376 to rise to the full limit of travel as determined by the mount standing in the selected compartment totalizer.

The upward movement of the slides 376 is transmitted by the segments 557 to set all of the printing segments 550 correspondingly. The differential setting of the slides 376 will also set the type elements 562 associated with the main control tape and said platen 567 and hammers 504 will be released to strike the type elements to effect the printing of the amount on the selected compartment totalizer on the main control tape 507. After the impression is taken by the selected platen 567 and hammers 504 the bail 332 (Fig. 17) is restored, lowering the vertical slides 376 to their normal position.

Before said slides 376 are lowered the cam portion 425C of cam 425 will be effective at about 191° of the machine cycle (Fig. 63) to depress total engaging slide 865 to rock arms 404 (Fig. 21b), thereby disengaging the totalizer pinions of the selected compartment totalizer 390 from the racks 385. Said racks are thereupon returned to their normal position shown in Fig. 18b. This operation leaves the totalizer pinions of the selected compartment totalizer 390 at zero for subsequent entry of another group of items therein.

It should be noted that when the vertical slides 376 have reached the limit of their upward travel under the influence of the bail 332 and springs 334 and under control of the selected compartment totalizer 390, the pinions thereof are disengaged from the racks 385 by provision of cam portion 425C (Figs. 43a and 63). At this time the slides 376 would be snapped upwardly to their extreme positions by their springs 334 after the aligning plate 435 is disengaged from the aligning teeth 449 (see Fig. 20) as in adding operation. However, at this time the check pawls 490 will engage aligning teeth 449 and hold said slides 376 in their differential position, after which said slides 376 will be restored to their normal lowered position.

*Total taking mechanism—group totals—key 802*

After a group or block of checks has been sorted into the sorting compartments, their amounts added into the corresponding compartment totalizers, the group totalizer, grand totalizer and the amounts printed on the main control tape and different compartment tapes, it is desired to print the total of the amounts on all checks of a group on the main control tape 507 and clear the group totalizer to receive the amounts of the next succeeding group. The machine is conditioned for this operation by depression of the group total key 802 which is released at the end of the group total taking cycle. This key like the compartment total taking key 801 is pivotally mounted on its associated lever 815 (see Fig. 40) and likewise operates the bail 823 which, as previously described, has the function of rocking the hook 843 to latch the frame plates 326 (Fig. 28) in upward position to allow the free movement of the slides 376 to differential positions.

With particular reference to Fig. 34, it will be seen that the lever 815 associated with the group total taking key 802 is connected to a spacing collar 885 to which is also attached an upstanding arm 886 (see Fig. 40) having a pin connection 887 to the associated thrust link 858-3. Through an interconnecting bell crank 859 the rearward movement of thrust link 858-3 will elevate the associated control slide 861-3 to determine that only the group totalizer 451 is to be engaged with the racks 384. This is accomplished in the manner similar to that described for the selection of the compartment totalizer engagement and is carried out by having the three notches 864 in control slide 861-3 so arranged with reference to the studs 420 that when the slide 861-3 is elevated by the depression of the group total key 802 the bell cranks 457C and 457GD for the compartment totalizer and grand totalizer will rock their associated pins 412C and 412GD to neutral positions in associated recesses 870, whereas the bell crank 457GP (see Fig. 21b) for the group totalizer is rocked clockwise a distance sufficient to carry its stud 412GP into the recess 867 of the total engaging bar 865. Consequently only the group totalizer 451 will be selected for a total taking operation effected in precisely the same manner as previously described for taking a compartment total.

It is desirable to print the group total on the control tape only, for which reason mechanism is operated by the group total key 802 to disable the compartment printing operating mechanism. Underlying both key levers 815 for the group total key 802 and the grand total taking key 803 is a bail 890 (Fig. 34) which is secured by pins 889 to the shaft 816.

Secured to the shaft 816 is a sleeve 824 to which is attached an arm 891 (Fig. 41) to which a return spring 892 is connected. Said arm 891 has a pin and slot connection 893 to a slidably mounted control plate 894. Said control plate is slidably mounted on fixed studs 895 and 896 and also has a bayonet-shaped slot 897 (see also Fig. 31) adapted to receive a pin 898 of a plate 899 which is fixed to a suitable side frame of a machine by the stud 896 and a supplementary stud 900. At the end of a link 901 there is fastened a pin 902 which projects in the bayonet slot 897 and in the normal position of the link 901 it cooperates with the horizontal portion of said bayonet slot 897. From this connection and arrangement it is obvious that rocking of the bail 890 will cause the control plate 894 to be lifted and the bottom edge of the horizontal slot portion of said bayonet slot 897 coacting with pin 902 will cause it to engage the coacting underside of the link 669 to disconnect its left-hand end from the pin 670.

In this elevated position of the control plate 894, which is maintained by virtue of the fact that the group total key 802 is latched down by the detent plate 811, said link 669 will remain in disconnected position. In the elevated position of link 669 a notch 903 therein will be received by the stud 900 for purposes of alignment. From this it is evident that operation of cam 676 will be ineffective to actuate the link 669 to operate the compartment printer mechanism. Thus, the group total will not be printed on any printing compartment tape.

The group total key 802 is latched down by detent plate 811 and is automatically released by means to be subsequently described, at the termination of the group total taking cycle.

The group total key 802 is further provided with a pin 905 (Fig. 40) which, when said key 802 is depressed and latched down, is adapted to rock a lever 906 to close contacts 907. These contacts, as will be described in connection with the wiring diagram (Fig. 64b) cause the energization of the clutch magnets 301 (Fig. 16) to automatically initiate a cyclic operation of the machine without requiring a depression of the motor release bar 175 in a group balancing operation.

Secured to the sleeve 924 (Fig. 34) which is pinned to rock shaft 818 is an upstanding arm 923 which is adapted to press against plate 840 and through insulating button 841 also open disabling contacts 842.

*Total taking mechanism—grand totals—key 803*

The machine is controlled to take a total from the grand totalizer in a manner similar to that for taking the group total. In the case of the grand total, however, it is necessary to depress the motor release bar 175 after the grand total key 803 is depressed in order to initiate an operation of the machine.

The grand total key 803 (see Fig. 39) is pivotally connected to an associated lever 815 and similarly rocks the bail 823 to latch the frame plates 326 and to disconnect the compartment printer to prevent printing of a grand total on any compartment tape. This key is likewise held latched down by the middle detent plate 811 and is automatically released at the end of the cyclic operation of the machine. The lever 815 has an integral upstanding arm 910 (Fig. 39) connected by a pin 911 to the rearwardly extending associated thrust link 856-1. Said link is connected through an associated bell crank 859 to the related totalizer engaging control slide 861-1 so that depression of the grand total key 803 will elevate the totalizer engaging control slide 861-1. The bottoms of the slots 864 in the slide 861-1 are so located with respect to the studs 420 of the bell cranks 457C, 457GD and 457GP that the upward movement of the slide 861-1 shifts only the pin 412GD into a recess 867 of the total engaging slide 865.

Operation of this slide by the mechanisms previously described rocks the grand totalizer pinions 450 into engagement with the associated racks 383 before said racks receive their upward travel. The vertical slides 376 are then shifted upwardly, by mechanism previously described, said slides being stopped under control of the pinions of the grand totalizer 450 to position the type elements 382 according to the amount standing on the totalizer pinions of corresponding denominational orders.

When the slides 376 are so positioned the main control printer is operated to print the grand total on the control tape. The grand totalizer 450 which now has been reset to zero is then disengaged from the differentially positioned racks 383 and the slides 376 are then lowered to their normal positions.

The grand total is to be printed on the control tape only, for which reason operation of the grand total key 803 also rocks bail 890 to elevate the plate 894 (Fig. 41) to disengage link 669 from its cam operating mechanism to disable the compartment printers in the manner set forth above in detail. Grand total key 803 rocks bail 890 so that contacts 842 are also opened by the grand total key 803, in the same manner as by the group total key 802.

*Adding machine key 805*

An adding machine key 805 (Fig. 46) is provided herein for the purpose of enabling the machine to be repeatedly used as a conventional adding machine so that amounts may be concurrently entered in both the group totalizer 451 and grand totalizer 450 and such items may be listed on the main control tape. Then by means of the group total key 802 a total of the group of items may be obtained from the group totalizer 451 and a grand total of all of the items from the grand totalizer 450, which totals are also listed on the main control tape. This key when depressed is latched down by rocking it rearwardly about its pivot when it is being depressed to cause its notch 912 to catch in a portion of a key guide plate 913 and when depressed disables the compartment printer and prevents engagement of the compartment totalizer 390 at operating position. The adding machine key 805 is similarly pivotally mounted upon its associated key lever 815 (Fig. 46) which is loosely mounted on a rock shaft 915. On said rock shaft 915 there is secured a bail 916 which also underlies the key lever 815 associated with the Non-Add C key 806 (see Fig. 45) so that rock shaft 915 is rocked by depression of either key, 805 or 806. Connected to the key lever 815 associated with the adding machine key 805 is an upstanding arm 917 (Fig. 46) to which the associated thrust link 856-4 is connected. Said thrust link through an associated bell crank 859 elevates the totalizer engaging control slide 861-4. Upon depression of the adding machine key 805 movement is transmitted to the link 856-4 to rock bell crank 859 counterclockwise, raising the slide 861-4. The openings 864 of this slide are so arranged with reference to the totalizer engaging studs 420 associated with bell cranks 457C, 457GD and 457GP for the compartment, grand and group totalizers, respectively so that pins 412GD and 412GP remain in operative association with the adding engaging slide 410, whereas the stud 412C associated with the compartment totalizers is shifted to neutral position. Thus, in the manner previously described the amounts entered in the machine under control of the ten-key mechanism will be entered in both the group and grand totalizers and printed on the main control tape.

In order to disable the compartment printer, secured to the rock shaft 915 is an upstanding arm 920 to which a link 921 is connected (see Figs. 34 and 40). Said link extends forwardly of the machine and is connected by a spring stud 922 (Fig. 34 only) to the arm 923 which, it will be remembered, is staked to the sleeve 924 which is pinned to the shaft 818. It will be recalled that the arm 891 is secured to a sleeve 924 which is secured to said shaft 910 and it will be evident that arm 891 will be rocked to elevate control slide 894 (Fig. 41) and thus disable the compartment printer. The arm 923 also opens contacts 842, as was explained.

It should also be observed with particular reference to Fig. 46 that when said adding machine key is depressed the underside of the button comprising the key top will rock a double arm 925 to close contacts 926, the function of which is to light a signal light 1387 (Fig. 64c) to inform the operator that the machine is in an entry condition determined by adding machine key 805.

Non-Add C key

The machine may also be conditioned to be utilized as a listing machine for listing amounts entered in the machine under control of the ten-key setup mechanism upon the main control tape. In order to condition the machine for this operation the Non-Add C key 806 (Fig. 45) is depressed, the C designation indicating to the operator that the function of this key is to cause listing of items entered in the machine only upon the main control tape. This key when depressed also opens contacts 842, disables the compartment printer and prevents engagement of the group totalizer 451, grand totalizer 450 and the compartment totalizer 398 which is in operating position.

The Non-Add C key 806, like the adding machine key 805, is pivoted upon an associated lever 815 (see Fig. 45) and when depressed is adapted to be latched down by means of the detent 811. Since bail 916 is also rocked by said key lever 815 it will rock shaft 915 and through the linkage previously described rock arm 891 (Fig. 41) to disable the compartment printer. Underlying the lever 815 of the Non-Add C key 806 is a short pin 930 (Fig. 45) which is carried by a horizontal arm 931 of a bell crank arm which is loosely pivoted on the rock shaft 915, the vertical arm 932 of said bell crank having connected thereto the rearwardly extending thrust link 856-2. Said thrust link through the interconnecting bell crank 859 is adapted to raise the totalizer engaging control slide 861-2. Thus, depression of the Non-Add C key 806 will elevate the totalizer engaging control slide 861-2. The three notches 864 therein are so positioned with relation to the studs 420 of the bell cranks 457C, 457GD, 457GP that all three of said bell cranks are rocked to shift the associated pins 412C, 412GD and 412GP into neutral positions so that none of the accumulators is moved into engagement with their respective actuating racks.

The slides 376 are given differential movement under control of the ten-key keyboard mechanism to adjust the printing elements 382 to positions to print digits corresponding to the items entered into the machine.

Since these listing operations are usually successive the Non-Add key is retained in latched-down position until subsequently released by depression of the keys release key 804, as will be explained.

Non-Add C&C key 808

This key (Fig. 47) is in the third or the rearmost row of control keys, and like the Non-Add key 806 is adapted to cause the prevention of entry of items in all of the totalizers but prevents the disabling of the compartment printer so that the entered items are not only printed on the main control tape but also on the compartment printer tape which has been selected in accordance with the position of the sorting drum and the last selector key 40 depressed.

Referring to Fig. 47 Non-Add C&C key 808 (the designation "C&C" indicating to the operator that printing is effected on both the main control tape and compartment printer tape) has a pivot connection 933 to a short key lever 934 loosely mounted upon said rock shaft 915. Said lever 934 also overlies the stud 930 in order to cause the rocking of the bell crank 931—932 to effect, as previously described for the Non-Add C key 806, the elevation of the control slide 861-2 to prevent entry of items into any of the totalizers. It will be seen from Fig. 34 that key lever 934 associated with Non-Add C&C key 808 does not operate bail 916 to disable the compartment tape printers as is effected for the Non-Add C key 807. Hence, items will also be printed on the compartment tape which is in printing position.

This key likewise, when depressed, is latched down until the subsequent depression of the keys release key 804, as will be explained.

In addition the Non-Add C&C key 808 carries button 935 of insulating material which when depressed makes contact with the lower resilient contact blade of contacts 936, thereby opening and maintaining such contacts open. The function of such disabling contacts 936 which will be subsequently explained in connection with the wiring diagram is for the purpose of disabling the circuit which detects the failure of a check to feed, which is not required for operation when the Non-Add C&C key is depressed.

Progressive total key 807

This key (Fig. 48) is operable in conjunction with the group total, grand total and compartment total keys to cause progressive totals to be obtained from the associated totalizers, that is, a total of each totalizer is printed but without clearing the totalizer.

The progressive total key is the right-hand key in the third or most rearward group and is pivoted to one arm of a bell crank lever 950 (Fig. 48) which has projecting stop extensions 951 working between studs 952 to limit the extent of movement of the key and the operated parts. The vertical arm of said bell crank 950 has a spring 949 connected thereto for returning the key to normal position when unlatched. The lower extremity of the vertical arm of bell crank 950 has a lug 953 adapted when said key is depressed to engage the extremity 954 of a latching crank 955 in order that the progressive total key 807 may be retained depressed. Connected to the vertical arm of bell crank 950 is a link 948 connected to an arm 956 secured to a rock shaft 957, the latter having connected thereto an arm 958 having a link connection 959 to an arm 960 secured to a rock shaft 961. Through this described linkage rocking of the progressive total key 807 will rock said arm 960 clockwise so that a projecting portion 962 will close contacts 963 and open contacts 964. Also, as will be best seen in Fig. 48, the key button of the PT key is adapted to engage the top resilient blade of contacts 965 to close such contacts, which are latched closed as long as the PT key is latched down. The function of contacts 963, 964, 965 will be described later in connection with the wiring diagram.

Also, as will be evident later, the unlatching of the progressive total key is effected whenever the keys release key 804 is depressed.

Automatic key release

Certain keys of the control keyboard are automatically released at the end of the cyclic operation of the machine, such keys being the grand total key 803, group total key 802, and Non-Add C key 806 by the following means. By reference to Figs. 39, 40 and 45, respectively it will be evident that each of these keys is locked down by having their shoulders 975 locked under the middle detent plate 811.

Loosely mounted on a rock shaft 966 is a follower bell crank arm 967 urged by a spring 968 against a fixed eccentric adjusting stud 968a so that its roller 969 may be engaged by a cam 970 fast on shaft 300. Said bell crank arm carries a square stud 971 normally engaging a shoulder of an interposer plate 972 pivoted on a stud 973 on an arm 974 secured to rock shaft 966. A spring 975 rocks said interposer plate 972 to normally maintain the shoulder in engaging relationship with stud 971. Attached to rock shaft 966 is an upstanding arm 979 passing through a slot in detent plate 811, said arm 979 being urged by a spring 978 so that an adjustment screw 977 carried by an arm 976 (Fig. 31) integral with arm 974 strikes a fixed member of the machine.

At the end of the cycle cam 970 will strike roller 969 to rock follower bell crank 967 counterclockwise, and since pin 971 abuts the shoulder of interposer 976 it will cause arm 974 to rock counterclockwise, thus rocking shaft 966 in the same direction. Arm 979 will engage the forward end of the slot in detent plate 811 and shift detent plate 811 to the left, releasing the shoulders 975 from detent plate to release any of the aforesaid locked-down keys.

Key release by keys release key 804

Certain of the keys of the control keyboard are preferably locked down until released by the keys release key 804 so that these keys are not released at the end of the first cyclic operation of the machine, thus allowing successive operations of the same kind to occur for successive machine operations. Such keys are the compartment total key 801 (Fig. 36), Non-Add C&C key 808 (Fig. 47) and progressive total key 807 (Fig. 48).

It will be seen from Figs. 36 and 47 that the compartment total key 801 and Non-Add C&C key 808 have their locking shoulders 820 of such dimensions that when beneath the middle detent plate 811 the normal key releasing movement of detent plate 811 at the end of the cyclic operation of the machine is insufficient to disengage detent plate 811 from shoulders 820 and these two keys will be kept locked down. However, the diagonal edge 980 of the keys release key 804 (Fig. 37) has a camming action on detent plate 811 sufficient to shift detent plate 811 to effect this disengagement and release such keys. Also this movement of the detent plate 811 by the keys release key 804 will also release the group total key 802, grand total key 803, or Non-Add C&C key 808 if they have been depressed in error. If the progressive total key had been latched down by the latch member 955 (see Figs. 37 and 48) a pin 981 carried by a depending extension 982 of the key lever 815 of the keys release key 804 will rock said member 955 to disengage it from lug 953, thus unlatching the progressive total key 807.

Summarizing, keys release key 804 may release any of the control keys in the control key keyboard.

Depression of the keys release key 804 causes the underside of the key head (Fig. 37) to rock a double arm 985 which will close contacts 987 and open contacts 986, the function of which will be described later.

Release of adding machine key 805

As for the adding machine key 805, it will be seen that when depressed it may be rocked slightly rearward as it is depressed about its pivotal connection with its associated key lever 815 to cause a portion of a key guide plate 913 to receive notch 912. A forward rocking of the adding machine key 805 after it has been in use will unlatch it to be restored to normal position.

Means for operating interlock contacts 133

Reference has previously been made to interlock contacts 133 which are open when any of the control keys, group, grand or compartment total, adding machine, Non-Add C&C key or Non-Add C key are operated so as to prevent the closure of the circuit to the clutch control magnets 301 during the depression of any of these six keys. Such contacts are shown in Figs. 34 and 35a and are normally closed. The left-hand resilient blade of such contacts carries a plate of insulating material which bears against a portion of the middle detent plate 811. When one of the aforesaid keys is being depressed the detent plate will be cammed to the left, as shown in Fig. 33, to allow contacts 133 to open. When the key is fully depressed it will be latched down by the detent plate 811 which then is returned to the right as viewed in Fig. 33 to again cause the closure of contacts 133. Hence, during the time that these contacts 133 (Fig. 64b) are opened the circuit to the clutch control magnets 301 cannot be completed.

Lock for keys when a machine cycle has been initiated

It is desirable to prevent an operation of any of the unoperated keys of the keyboard once a cyclic operation of the machine is instituted by depression of motor release bar 175. To this end each of the keys of the control key keyboard is provided with a pin 988 adapted to overlie an integral portion of the locking plate 810 when any key is undepressed and said plate 810 is shifted by the depression of the motor release bar 175. For example, the pin 988 of grand total key 803 overlies a portion 989 (Fig. 35a) of locking plate 810 when said plate is shifted and the same occurs for all the other keys of the control key keyboard.

The plate 345 (Fig. 14) which is rocked by the motor release bar has connected thereto at one end a link 990 which is articulated to an arm 991 secured to rock shaft 992 and to which arm a return spring 993 is connected. Attached to rock shaft 992 is an arm 994 bearing against an adjustable screw 997 carried by an upstanding portion of locking plate 810. Rocking of plate 345 by motor release bar 175 will move link 990 forwardly to rock shaft 992 clockwise causing arm 994 in engagement with screw 997 to shift locking plate 810 to locking position, and which is maintained during the depression of the motor release bar 175. A stud 998 carried at the end of arm 979 abuts a stud 999 carried by plate 810 to restore the latter when the keys are released, if the return spring 810a fails to do so, thus freeing all the unoperated keys for depression.

*Interlock between total keys 801, 802, 803 and Non-Add C key 806, Non-Add C&C key 808, or adding machine key 805*

This interlock is rendered effective by each of the total keys 801, 802, 803 and when depressed the diagonal edge 818 of its shoulder 820 cams interlocking plate 812 forwardly so as to bring an integral portion thereof beneath a shoulder 996 of a spring-pressed pawl 995 pivotally mounted on each of the Non-Add C key 806, Non-Add C&C key 808, and adding machine key 805 (see Figs. 45, 47 and 46, respectively). Thus, depression of of each of the total keys in the first row will prevent operation of the keys 805, 806 and 808 to prevent misoperations of the machine.

*Symbol printing for main control tape*

It is desirable to print a symbol or symbols on the main control tape designating the particular control key or keys used by the operator. In the present machine the following symbols are preferably printed:

1. Compartment total key 801_____ T
2. Group total key 802_____ *
3. Grand total key 803_____ GT
4. Adding machine key 805_____ +
5. Non-Add C key 806_____ NA
6. Non-Add C&C key 808_____ NA
7. Progressive total key 807_____ PT It will be recalled that associated with the first six keys and selectively operated thereby are the five totalizer control engaging slides 861–1 to 861–5, 861–2 being commonly adjusted by both keys 806 and 808. As is best shown in Fig. 21a there is pivotally mounted on a rod 1000 a bail having a cross rod 1001 on which are mounted adjustable cam elements 1002 (Fig. 49) contacted by the upper end of the related slide 861 to differentially adjust said bail. One arm of the bail has a pin and slot connection 1003 to a slidable type bar 1004 carrying the aforementioned first five characters. The hammer 504 for taking an impression from such type has been previously described. The type bar 1004 is adjacent the type bars which print the amounts and thus aside of the printed amount there will be printed the selected symbol. The NA symbol is commonly printed when either the Non-Add C key 806 or Non-Add C&C key 808 is depressed because of their common positioning of the control engaging slide 861–2.

A supplemental type bar which is like symbol type bar 1004 is provided to print the symbol PT when the progressive total key is depressed and is adjusted in the following manner:

Referring to Fig. 48 attached to rock shaft 961 which is rocked when the progressive total key 807 is depressed is an arm 1005 which has a pin and slot connection 1006 to a supplemental symbol type carrier 1007 which carries the symbol type E and PT. This symbol PT is printed alongside of the symbols T, * and GT since the keys 801, 802 and 803 are used in combination with the progressive total key 807, thus designating that a compartment, group or grand total printed is a progressive total.

The type characters E or PT are struck by the associated hammer 504 to effect the printing impression in the usual manner except that in either case a magnet 1366 (see Fig. 48) is energized to rock its armature and elevate an extension 1008 which cooperates with an extension 1009 of the latch arm 521 to rock it clockwise to disengage its shoulder from the tail 520 of the hammer 504. Now when hammer control bail 508 rocks clockwise in the cyclic operation of the machine, hammer 504 is urged by its spring 503 to effect the imprint from the type character PT when type carrier 1007 is shifted one step upwardly by depression of progressive total key 807, or from the normally positioned type character E when an error has been ascertained in a group balancing operation, as will be described.

*Symbol printing for compartment tape printer*

At each of the 24 compartment tape printers there is a symbol type member 1010 (Fig. 41) carrying three type characters #, * and PT which are adjusted to print when the Non-Add C&C key 808, compartment total key 801 and progressive total key 807 are used. Normally, each of such type members which is pivoted on a related shaft 551 is below the printing line, as shown in Fig. 41 for the next to the top of such type members 1010. In such position a pin 1011 carried thereby rests upon the top step of four steps in the lower part of a control arm 1012. Said control arms 1012 (see Fig. 50), there being one for each vertical row, are differentially rocked so that related pin 1011 may rest upon the other three steps to position the associated type member 1010 to selectively print the above three symbols. All symbol type members 1010 for each row are connected by pins 1011 to a link 1014 which is moved by a related spring 1016 to adjust all of the printing members 1010 in a related row.

Attached to the arm 852, which it will be recalled is rocked counterclockwise when the compartment total key 801 is depressed, is a link 1020 (Figs. 36 and 43) which has a slot 1021 receiving a stud 1022 of an arm 1023 secured to a rock shaft 1024. The lower end of arm 1023 is connected by a link 1025 to an arm 1026 secured to a shaft 1027 to which the three control arms 1012 are attached. Rearward movement of link 1020 will cause the forward end of the slot 1021 to engage the stud 1022 to rock arm 1023 clockwise and by link 1025 rock arm 1026 and shaft 1027 counterclockwise. This will position each arm 1012 so that when pin 1011 drops later it will engage the third step from the top to select the * symbol.

As a result of this operation spring 1016 would now attempt to move the associated link 1014 but is prevented from doing so due to a stud 1011a carried by the related link resting on an arm 1017 fast on the printer operating shaft 624. In the manner previously described a cross rod 551 connects the type members 1010 of all three rows for simultaneous movement. At the proper time the shaft 624 is rocked clockwise to operate the selected compartment printer and other mechanisms as set forth above, at which time the arm 1017 is removed from the path of the particular studs 1011a, permitting each link 1014 to drop down two steps. This rocks all symbol type members 1010 two steps to bring the * symbol to the printing line of their respective printers.

After the selected platen 567 is operated to take the printing impression the arm 1017 engaging the related stud 1011a raises the links 1014 to restore all the type members 1010 to normal. Upon release of the depressed compartment total key 801, in a manner previously described, the control arms 1012 are spring-restored to their positions to have their respective studs 1011 rest on the top step where they prevent setting of the symbol and numeral types until the compartment total key 801 or another key is again depressed.

Similarly, as best shown in Fig. 47, arm 932 which is rocked by the depression of the Non-Add C&C key 808 has connected thereto a link 1030 which also has a slot 1031 at its rearward end to also receive the pin 1022 of arm 1023. The length of said slot 1031 is such that arm 1023 and through the linkage described each control arm 1012 is rocked sufficiently to allow related pin 1011 to drop on the second step from the top in the same manner to select the # symbol to identify such items printed on a control tape. (See example of 5.00# in Fig. 50.)

With particular reference to Figs. 36 and 48, it will be seen that an arm 1035 secured to shaft 957, which is rocked when progressive total key 807 is depressed, carries a pin 1036 which is adapted to contact a portion 1037 of plate 850 and rock the latter clockwise about pivot pin 853 and thus rocking arm 852 counterclockwise a greater extent than was done by key 801. This additional forward movement of link 1020 will cause such clockwise rotation of each control arm 1012 that a related pin 1011 on the type carrying member 1010 will drop to the lowermost step and thus position and print the symbol PT at the printing line. (See example of 30.0PT in Fig. 50.)

*Double spacing operations upon printing certain totals on main control tape*

When either a compartment, group or a grand total is printed upon the main control tape 507 it is desirable to space the next impression an additional step below the total printed. For this reason the paper feed mechanism for the main control tape is adjusted to impart two steps of movement to the ratchet 542 (Fig. 21a). This is accomplished by rocking a bell crank 1040 (Fig. 43) clockwise to position a pin 1041 carried by one arm of the bell crank 1040 away from the feed slide 540 to permit a spring 1048 to raise the feed slide 540 a distance sufficient to engage the nose 541 with the ratchet 542 one tooth in advance, thus providing for two steps of rotation of the ratchet and the platen.

Attached to the upstanding side arm of bail 823 is a link 1042 (Figs. 35a and 41) connected to an upstanding arm 1043 loose on shaft 851. Attached to arm 1043 is a link 1044 having a pivot pin connection to an arm 1045 loose on rock shaft 1024. Said arm 1045 is attached to an arm 1046 by a sleeve loose on rock shaft 1024 which has a pin and slot connection 1047 at its upper end to the bell crank 1040. It will be recalled that said bail 823 is rocked by the depression of the compartment total key 801, the group total key 802 and the grand total key 803 and consequently the rocking of said bail 823 through the linkage just described rocks the bell crank 1040 clockwise for the purpose set forth. Upon release of either of the aforesaid total keys the bell crank 1040 is restored to normal position to adjust the paper feed mechanism to feed the main control tape one space.

Arm 1046 carries a button of insulating material adapted to close contacts 1049 (Fig. 21a). The function of said contacts 1049 which are closed when any one of the total keys 801, 802, 803 is depressed is to complete an obvious circuit to the R36 relay (Fig. 64d).

*Printing compartment number on selected compartment tape*

It is desirable to identify the compartment totalizer from which a total is derived and printed on a selected compartment tape. To this end there is secured to the rock shaft 1027 three control arms 1050 (Fig. 42), one for each row of printers, each of which is like the control arms 1012 of Fig. 41 except that it has only two steps 1051 (see also Fig. 50). Also mounted on a rod 551 at each compartment printer is a type carrying member 1052 carrying a pin 1053 normally adapted to engage the upper step 1051 of the control arm 1050. The type carrying members 1052 carry type characters representing the compartment number and through their pins 1053 all of the type members in a vertical row are connected together by a link 1054. The type members of the three rows are interconnected through one of the rods 551 in the same manner as explained for the amount printing segments 550 and the symbol printing members 1010. Rocking of the aforesaid control arm 1050 allows the pin 1053 of one type member 1052 in each row to drop upon the lower step 1051 when said link 1054 is released to be moved downwardly in the manner explained for link 1014 of Fig. 41. This will position the compartment number type members 1052 of all rows at the printing position so that when the selected compartment platen 567 is operated a number will be printed adjacent the total on the selected compartment tape. The restoration of the type members 1052 and control arms 1050 is precisely the same as explained for the symbol printing members 1010 and control arms 1012 of Fig. 41.

*Suppression of printing of compartment number on main control tape when printing group and grand totals thereon*

The previously described compartment number printing means shown in Fig. 18c is also operative when a compartment total is taken and printed on the main control tape, in the same manner as described for printing the compartment number when listing amounts on the main control tape. Thus, each compartment total is identified by a compartment number. However, the compartment number printing means is suppressed when either a group or grand total is printed on the main control tape.

As best shown in Fig. 39 the thrust member 856-1 carries a tappet 1055 and in Fig. 40 the thrust member 856-3 carries a tappet 1056, each of which when the thrust member 856-1 or 856-3 is moved forwardly as a result of the depression of the respective grand total key 803 or group total key 802 engages a lug 1057 which is an integral part of a side arm 1058 of a bail 1059 loosely mounted upon the shaft 851. The other side arm 1060 of the bail carries a pin 1061 normally occupying the vertical portion of a bayonet slot 1062 of a pitman 1063 (Fig. 38). Said pitman 1063 is urged downwardly by a spring 1064 so that a pin 1065 carried thereby rests upon an arm 1066 of a bell crank 1066—1067 The bell crank is pivoted on a stud 1068 and during printing of group and grand totals when no amount transfer is effected in group balancing operations is in the position shown in Fig. 38. The right-hand end of the pitman 1063 is pivotally connected at 1069 to a control plate 1070 which is shown in Fig. 18c and is loosely pivoted on the rod 522. Said control plate 1070 has a finger extension 1071 carrying the aforesaid lug 531.

It is evident, therefore, that upon a depression of either a group total or a grand total key the bail 1059 will be rocked counterclockwise against the action of a spring 1072 (Fig. 38) and through the pin 1061 occupying the vertical portion of the bayonet slot 1062 pitman 1063 will be moved to the left in Fig. 38, thus rocking the control plate 1070 clockwise. Lug 521 (Fig. 18c) being positioned over the bar 524 associated with the compartment number printer hammer will rock its free end downwardly against the action of spring 525, thereby bringing the shoulder 527 out of operative relationship with the bail 530. Therefore, in such group or grand total printing operations bail 530 will be ineffective to thrust bar 524 to the left to release the compartment number printing hammer 504 and thus no compartment number printing will be made on the main control tape.

Check and deposit ticket feeding mechanism

The check feeding mechanism is well known and is fully shown and described in the patent to S. Brand et al., No. 2,146,695 and therefore the description given herein of this mechanism is only as much as is necessary to understand the changes made in the present machine. The arrangement is shown in Figs. 51–61.

After the sorting drum 10 has been positioned according to the selector key 40 depressed the check 1100 is taken from a pile and is inserted into an aperture 1101 (Fig. 51) and the motor release bar 175 is then depressed to cause it to be fed into the selected compartment. If the paper to be fed is a deposit ticket employed in group balancing operations the deposit ticket is inserted and feeding is initiated by the group total key 802.

The checks are fed into the compartments by means of a plurality of pairs of large feed rollers 1102 and pairs of smaller rollers 1103 (Figs. 51 and 52). All of these feed rollers 1102 and 1103 normally occupy the position with relation to the sorting drum, in which they appear in Fig. 51. The rollers 1102 and 1103 are carried by a frame which is rocked downwardly during the rotation of these check feeding rollers to feed a check into a selected compartment to the position shown in Fig. 52. The pairs of rollers 1102 are secured to the respective drive shafts 1107 and 1108, the shaft 1107 being carried by a pair of spaced frame plates 1109 secured to a shaft 1110 journaled in suitable side frames of the machine. The shaft 1108 is reduced at its ends so that it will fit into larger slots 1112 (Figs. 53 and 54) in the side frame plates 1109. Slidably mounted on pins 1113 carried by the respective side plate 1109 is a slidable member 1114 which is curved at its forward end to partially envelop a collar 1115 carried by the end of the shaft 1108. Each member 1114 is urged by a respective spring 1116 so as to resiliently urge shaft 1108 forwardly to bring the pairs of feeding rollers 1102 together to seize the check fed.

Shaft 1117 which carries the rearward ones of the smaller feeding rollers 1103 is carried by the side frame plates 1109 whereas the shaft 1118 which carries the forward ones is carried by arms 1119 loosely pivoted on shaft 1107 and which are urged by the springs 1116 to bring the associated pairs of feeding rollers 1103 together to resiliently seize the check fed therebetween.

Secured to a side frame plate 1109 by a collar 1121 attached to shaft 1110 is a respective cam follower arm 1122 carrying rollers cooperating with a pair of complementary cams 1123 secured to the main drive shaft 300 (Figs. 51, 52 and 60) which, it will be remembered, receives one complete counterclockwise rotation at each operation of the machine. At the proper time the cams 1123 rock the shaft 1110 and the frame plates 1109 clockwise to bring the rollers 1103 into close proximity to the selected compartment. At the same time a gear 1125 fast on the shaft 300 rotates the rollers 1102 and 1103 oppositely in the directions indicated by the arrows (Figs. 53 and 54) through the following described train of gears: The gear 1125 drives an intermediate gear 1126 (Fig. 60) mounted on a stud 1127. The gear 1126 meshes with a gear 1128 loose on the shaft 1110, which gear 1128 meshes with a gear 1129 fast on the shaft 1107. A gear 1130 (Figs. 53 and 54) also fast to the shaft 1107 meshes with a gear 1131 fast on the shaft 1108. The counterclockwise rotation of the gear 1125 through the train of gears 1126 and 1128 rotates the gear 1129, the shaft 1107 and the respective feeding rollers 1102 fast thereon in a clockwise direction, and also rotates the gear 1131, shaft 1108 and the respective feeding rollers 1102 on this shaft in a counterclockwise direction. A gear 1132 (Figs. 53 and 54) secured to drive shaft 1108 meshes with an intermediate gear 1133 pivoted on a stud carried by one side from plate 1109 and which in turn meshes with a gear 1134 secured to the shaft 1117. A gear 1135 secured to shaft 1117 meshes with a gear 1136 fast on the shaft 1118. This causes the feed rollers 1103 on the shaft 1117 to rotate counterclockwise and the feed rollers 1103 on shaft 1118 to rotate in a clockwise direction.

The rollers 1102 are cut lengthwise as shown at 1140 (Fig. 52) for receiving ledges 1141 so that when the check is dropped into the aperture in the chute 1101 (Fig. 51) the lower edge thereof rests on the ledges 1141 between the set of rollers 1102 permitting an initial rotation of the rollers 1102 before the check is fed thereby. The rotation of rollers 1102 and 1103 in the direction of the arrow feeds the check into the selected compartment.

As the checks 1100 are fed into the compartment by rollers 1103 they are held between a check retainer plate 1142 and a series of fingers 1143 (Figs. 51 and 52) which are secured to a rod 1144 carried by a pair of arms 1145. The arms 1145 are secured to a rock shaft 1146 pivotally supported on brackets 1147 (only one of which is shown) secured to a subbase. Suitable springs (not shown) are provided to normally urge the arms 1145 clockwise pressing rollers 1149, carried by the arms 1145 against cams 1150 fast on the shaft 300.

The fingers 1143 are normally in the Fig. 51 position, and when the shaft 300 and consequently the cams 1150 are rotated counterclockwise the contour of the cams 1150 permits the springs to rock the arms 1145 quickly clockwise from the Fig. 51 position to the position in which they appear in Fig. 52 to position the fingers 1143 in the compartment. Arms 1154 are secured to the shaft 1144 and are urged by springs 1156 attached to the extensions of fingers 1143 to cause the arms 1154 to be urged against a guide rod 1155 so that as the fingers 1143 are moved into the compartment they are guided by the arms 1154 cooperating with grooves in said guide rod 1155.

When the selected compartment comes into a record receiving position an arm 1159 comes to rest adjacent a roller 1160 (Figs. 51 and 52) carried by an arm 1137 which is clamped to rock shaft 1110, to which rock shaft 1110 the side frame plates 1109 are secured. After the fingers 1143 are moved into the compartment as shown in Fig. 52 the frame plates 1109 are rocked by the cams 1123 as previously stated and roller 1160 rocks arm 1159. The arm 1159 is connected to an arm 1162 by a sleeve 1163 so as to rock arm 1162 counterclockwise against the action of a spring 1164. The check retainer plate 1142 is pivoted at 1165 to said arm 1162 and thus shifts the check retainer plate 1142 from the position in which it appears in Fig. 51 to the position in which it is shown in Fig. 52. By means of slots 1166 in the retainer plate 1142 the latter is moved past the fingers 1143 which are now in the compartment so that the incoming check 1100 may be fed between the check retainer plate 1142 and fingers 1143 by the rollers 1103 which are now rotating. Reference character 1109F in Fig. 52 indicates a check fed in a compartment to show how it is fed between the plate 1142 and fingers 1143.

After the check is fed in the compartment between the fingers 1143 and the retainer plate 1142, the cams 1150 restore the arms 1145 to their original position withdrawing the fingers 1143 from the compartment. The cams 1123 then rock the side frames 1109 counterclockwise, carrying the feed rollers 1102 and 1103 outwardly to their normal positions and this allows the spring 1164 to carry the check retainer plate 1142 against the stack of checks to firmly hold the check fed into the compartment against the checks already in the compartment, if they are there.

*Check endorser mechanism*

The present machine has an endorsing mechanism similar to that shown in the patent to S. Brand, No. 2,237,269.

The checks are also fed by an endorsing printing cylinder 1170 (Fig. 55) loose on shaft 1108 and adapted to be clutched to this shaft. Cooperating with printing cylinder 1170 is a platen roll 1169 loose on a journal shaft carried by a pair of arms 1171 (Figs. 51 and 55) loose on shaft 1107. Said arms 1171 are side arms of a bail 1172 which has forwardly extending arms 1173 (Fig. 51) encircling shaft 1110. Thus, platen roll 1169 is freely rotatable in its journal shaft but partakes of the movement of the side frame plates 1109. As printing cylinder 1170 roates its inked printing elements 1241 cooperate with the platen 1169 to cause its inked characters to print on the rear face of the check.

Secured to shaft 1108 is a clutch disk 1174 (Fig. 61) which is in the plane of a clutch pawl 1175 pivoted at 1176 to a side disk 1177 secured to and rotatable with the printing cylinder 1170. The clutch pawl 1175 is provided with a lug 1178 adapted to engage one of the two clutch teeth 1179 of clutch disk 1174. The lug 1178 is prevented from normally engaging one of the teeth 1179 by a clutch control arm 1180 which normally engages an extremity of the clutch pawl 1175 but when arm 1180 is rocked counterclockwise it will be disengaged from the extremity of the clutch pawl 1175 to cause a spring 1181 connected to the clutch pawl 1175 to rock the latter so that the lug 1178 engages one of the teeth of disk 1174. For safety sake, two teeth 1179 are provided so that if lug 1178 fails to catch the first tooth in the initial rotation of shaft 1108 it will catch the second tooth.

In the present machine the ratio of the driving gears 1125, 1126, 1128, 1129, 1130 and 1131 (Fig. 60) is such as to rotate the shaft 1108 two revolutions for each machine cycle but it is evident that the printing cylinder 1170 should be given only a single revolution so that only one endorsement will be effected on the check or document sorted.

The means for rocking the clutch control arm 1180 will now be described. As best shown in Figs. 53, 54 and 60 each of the side frame plates 1109 has at its extremity an open slot 1182 receiving a rod 1183. Each of a pair of collars 1184 on rod 1183 is staked to a respective plate 1185 which has a slot 1186 (Fig. 54) receiving a bolt 1187 carried by the respective side frame 1109. Each collar 1184 is firmly attached to the rod 1183 by means of a set screw 1188. Thus, rod 1183 is fitted at the extremity of the side frame plates 1109 and is locked in position by means of tightening nuts 1180 (Fig. 53) which draw up the bolts 1187 to clamp the plates 1185 to the side frames 1109. In this manner rod 1183 is securely carried by the side frame plates 1109 and is secured so as to prevent its rotation.

Referring now to Fig. 61 the arm 1180 is one extension or side arm of a bail 1190 which is loosely mounted on the rod 1183. As best shown in Fig. 59 an arm 1191 is loosely mounted on the rod 1183 and between the arm 1191 and a second extension or side arm 1192 of bail 1190 there is interconnected a spring 1193. As best shown in Fig. 56 a spring 1194 is connected between the bail 1190 and a fixed stud so as to tend to rock the bail 1190 counterclockwise to disengage the arm 1180 from pawl 1175. However, the arm 1191 has a lug 1195 (Fig. 59) which bears against the arm 1192 and since the interconnected spring 1193 causes arms 1191 and 1192 to function as a unit, it will be seen that the spring 1194 causes the lug 1195 to bear against a profile cam 1196 secured to the roller drive shaft 1108. It will be recalled that upon depression of the motor release bar 175 the machine is cycled and shaft 300 will be rotated and by the train of gears rotate shaft 1108 two revolutions. The complementary cams 1123 (Fig. 60) have an initial dwell so that the frame plates 1109 carrying the rollers 1102 and 1103 will be held in normal upward position during the initial rotation of shaft 300. Spring 1194 will cause the lug 1195 to drop to the lower part of the cam 1196 during this dwell, rocking clutch control arm 1180 counterclockwise and free of the clutch pawl 1175, thus causing the engagement of the clutch and thus the rotation of the endorsing roller 1170 before the frame carrying the rollers 1102 and 1103 is lowered. As the cam 1196 rotates, the arm 1191 will be gradually rocked by being raised and through the interconnected spring 1193 the arm 1192 will also be rocked, causing bail 1190 to be rocked clockwise to bring the clutch control pawl 1180 in such position as to intercept and engage the pawl 1175 when one revolution of the clutch has been effected.

Selective endorsement is effected herein under control of a solenoid 1200 (Figs. 55 and 56) which is energized by circuits to be described later in connection with the wiring diagram. Energization of solenoid 1200 is required for each cycle that a check is to be endorsed.

A frame plate 1201 (Fig. 53) has a collar 1202 attached thereto and said collar is pinned by a pin 1202a to the rod 1183. Thus, plate 1201 also partakes of the movement given to side frame plates 1109. The frame plate 1201 carries a pivot stud 1203 (Fig. 57) for a spring urged latch arm 1204 having a shoulder 1205 engaging a lug of a side frame 1206 of the bail 1190. The latch arm 1204 has a tail 1207 which underlies the end of a rock arm 1208 (see Fig. 55) which is rocked by the energization of the endorsing control solenoid 1200. Said arm 1208 is pivoted at 1209 and is connected by a pin 1210 to the core of the solenoid 1200. When the solenoid is energized the free end of the arm 1208 will be rocked downwardly as viewed in Fig. 61 to rock latch arm 1204 and remove the shoulder 1205 from the lug of the side arm 1206. It will be evident that while cam 1196 (Fig. 59) will, in each rotation, tend to effect the clutch engagement this engagement can only be effected if the arm 1208 has been rocked. Assuming now that the solenoid 1200 has been energized and the clutch engaged, it will be recalled that during the check feeding operation the frame carrying the feeding rollers 1102 and 1103 will be lowered. It will also be clear that even though the latch arm 1204 has been rocked the tail 1206 will leave the arm 1208 as the frame is moved to its lower position, permitting a spring 1211 secured to the latch arm 1204 to rock the latter counterclockwise. When the frame is in its lowered position and a one-revolution of the clutch has been effected, arm 1180 will be restored and arm 1206 will now be relatched by the latch arm 1204; thus latching the bail 1190 in position to cause the arm 1180 to cause its engagement with clutch pawl 1175 so that another revolution of the endorsing printing cylinder 1170 cannot be effected. When the frame is restored to its upward normal position the tail 1207 will not engage the extremity of the arm 1208 due to the previous deenergization of the solenoid 1200 and therefore the bail 1190 will be maintained latched.

Usually the checks to be sorted and endorsed are wider than can be fed by the endorser printing cylinder and associated platen 1169. In this case the sets of feeding rollers 1102 completely feed the check to the sorting compartment. It is evident, therefore, that although only a single revolution is given to the printing cylinder 1170 the feeding rollers 1102 and 1103 will continue to feed the check. For non-endorsing operations only the feeding rollers 1102 and 1103 will effect the check feeding operation since the printing cylinder 1170 will not be rotated.

It is also desirable to prevent the engagement of the clutch if a check has not been inserted properly to thus prevent the inked type 1241 (Fig. 55) of the printing cylinder 1170 from contacting with the platen roller 1169 and thus smearing the next check. This is provided for by the following described means:

Attached to the rod 1183 by a pin 1216 (Fig. 58) is a collar 1215 which is also secured or staked to a side frame plate 1217 (Figs. 55 and 58). A bail 1218 (Fig. 57) is pivoted on the side frame plate 1217 at one side by a pin 1219 and at the other side by a pin 1220 (Figs. 56 and 57) carried by the frame plate 1201. Said bail has a pair of depending fingers 1221 which are rocked by the check when it is inserted in the chute between the rollers 1102. The bail 1218 also carries a roller 1222 (Fig. 56) normally engaging an extension 1223 of the side arm 1206 of bail 1190. Obviously, when a check is properly inserted in the chute 1101 and on the ledge 1141 (Fig. 51) the check engaging fingers 1221 will rock the bail 1218 against the action of a light spring 1224 (Figs. 56 and 57), thus removing the roller 1222 from the extension 1223. This will unlock bail 1190 at this point and it is evident, therefore, that the clutch will be engaged only when a check is properly inserted.

As best shown in Fig. 61, a detent arm 1225 loosely mounted on the shaft 1183 is provided with a wedge-shaped end 1226 adapted to engage with a complementary-shaped recess of the disk 1177 when the clutch has terminated its full revolution, thus locating the printing cylinder 1170 at home position. The arm 1225 has an extension carrying a stud 1227 and between the stud 1227 and a stud 1229 carried by the frame plate 1201 is a spring 1228 which will urge the detent arm 1225 to resiliently coact with the notch in the periphery of the disk 1177 when the clutch has been engaged a full revolution.

*Misoperation warning device comprising endorser contacts 1230*

As will later be described in connection with the wiring diagram, contacts 1230 (Fig. 57) are associated with a test circuit to indicate whether the endorser clutch was engaged when it should have been. Contacts 1230 are normally closed, but if the clutch is engaged such contacts will be opened. However, if the clutch has not been engaged said contacts will remain closed and this will indicate the failure in operation.

Pivoted upon the stud 1203 is an arm 1231 (Fig. 61) having an open slot receiving the aforesaid stud 1227. Said arm has a depending extension 1232 carrying a pin 1233 engaging a slot 1234 of a contact operating arm 1235, which is also pivoted by the stud 1229 on the side frame plate 1201.

When the clutch is engaged the arm 1225 will be rocked counterclockwise, causing the stud 1227 in engagement with the slot in the arm 1231 to rock the arm 1231 counterclockwise. Its pin 1233 will now engage the end of the slot 1234 and rock the arm 1235 clockwise downwardly. This rocking of the arm 1235 in conjunction with the lowering of the check feeding frame will cause said arm 1235 to engage the lowermost blade of the contacts 1230 and open them. However, if the clutch is not engaged arm 1235 will not be in such position that during the lowering of the check feed frame it will open contacts 1230 and they will remain closed.

*Check sensing contacts 1389*

As will be subsequently described in connection with the wiring diagram, check sensing contacts 1389 (Figs. 55 and 56) are associated with a sensing circuit which detects, by the position of the contacts 1389, whether a check has been completely and properly fed through the check feeding mechanism into the selected compartment. The operation of such contacts is placed under control of the bail 1218 and is effected by an extending finger 1240 (Figs. 55 and 56) riveted to the bail 1218. Said finger is bent, as shown in Fig. 55, so as to underlie a block of insulating material attached to the upper resilient blade of contacts 1389. Obviously, rocking said bail 1218 by the insertion of a check in the feeding rollers will open the contacts 1389. If the check is still in cooperation with the check feeding rollers 1102 after a check feeding operation, due to an abnormal width of the check, said contacts 1389 will still be open and this fact will be indicated to the operator, as will be subsequently explained.

*Inking rollers*

The type 1241 (Fig. 55) carried by the printing cylinder 1170 are inked by means of ink absorbed felt rollers 1242 and 1243, the roller 1243 being arranged to be saturated by a supply of ink therein. The inked periphery of roller 1243 being in contact with the felt roller 1242 saturates the latter to ink type 1241 in contact therewith when the printing cylinder 1170 rotates.

The inking rollers are carried by the side frame plate 1217 and a supplemental side plate 1244 (see Figs. 55 and 58) which latter is attached to the rod 1183 in precisely the same manner as the side frame plate 1217. Each of the side frame plates 1217 and 1244 is provided with open slots which receive the journal shafts or studs 1245 and 1246 of the respective inking rollers 1242 and 1243. Pivotally mounted by a stud 1247 (Figs. 55, 56 and 57) carried by the respective side frame 1217 and 1244 are arms 1248 urged by respective springs 1249 so as to bear against the journal rods 1246 and thus urge ink supply roller 1243 in peripheral contact with the inking roller 1242 and the latter to make peripheral contact with the type 1241 during the rotation of the printing cylinder.

As a convenient means for operating the pair of arms 1248 to rock them in such position that the ink rollers 1242 and 1243 may be withdrawn from the machine, there is provided a bail 1250 pivoted on the aforesaid studs 1247 and having slots 1251 in the side arm of the bail 1250 receiving lugs 1252 of the associated arms 1248. Obviously, rocking of one arm 1248 by means of an integral finger piece 1253 will rock the bail 1250 to rock the other arm 1248 so that both are disengaged from the journal rods 1246.

The preferred construction of the ink supply roller 1243 is shown in Fig. 55a. It comprises a hollow cylindrical tube 1260 capped at one end by the end cap 1261 and threaded end cap 1262 at the other end. The caps 1261 and 1262 carry the integral journal studs 1246.

Surrounding the cylinder 1260 are a plurality of felt rings or washers 1263. The cylinder 1260 is provided with perforations 1264 through which the ink supply within the cylinder 1260 passes so as to be absorbed by capillary attraction by the felt washers 1263. The cap 1262 is provided with headed screws 1266 which may be removed so that the supply of ink is placed within the cylinder 1260.

The felt washer 1263 at the right end bears against the end cap 1261 and similarly the felt washer 1263 at the left-hand end may also bear against the end cap 1262 to hold them in position. It is preferable, however, to interpose a ring or spring washer or plate 1267 which is so designed that it will press against the left-hand washer 1263 uniformly around to thereby compress the series of felt washers 1263. The spring plate 1267 is preferable because it adjusts and compensates for the variations in the thickness and density of the felt rings to provide a uniform ink distribution. To this end the inking roll 1243 is also treated by grinding the surface of the felt washers 1263 after assembly.

It has been found in practice that there is an undesirable leakage of ink from the ink supply reservoir within the cylinder 1260 to the felt washers 1263 during the time that the machine is idle. Accordingly, to prevent this undesirable action and possible smearing during the next endorsing operations there is inserted within the cylinder 1260 an inner cylinder 1268 which is of less diameter than the cylinder 1260. The inner cylinder 1268 closes the perforations 1264 for a substantial portion of the inner periphery at the rest position of the cylinder 1260 to prevent the ink in the reservoir from passing through such perforations. However, during the rotation of the inking roller 1243 during the printing operation, the cylinder 1268 rolls around but does not interfere with the passage of the ink through the perforations 1264.

Group balancing operations

The group balancing operations now to be described are desirable because they enable an operator to store up under control of the ten-key keyboard, by means to be described, the total of checks appearing on the deposit ticket and compare it with the total of the check amounts which were previously distributed in several compartment totalizers 390 and totaled in the group totalizer 451. The comparison is made between the stored up deposit total and the total readout controlled by the group totalizer 450.

To recapitulate the operation before a group balancing operation, the operator reads the amount of each check listed on the deposit ticket and the classification of the check according to the bank on which the checks are drawn. For each check the compartment selector key 40 is depressed which causes the sorting drum 10 to rotate to a position to select a compartment which is to receive the check, the associated compartment totalizer 390, and the associated compartment tape printer. The ten-key keyboard is then operated to enter the amount of the check. The check is then inserted in the check receiving chute and the machine is cycled by depression of the motor release bar 175 to enter the amount in the selected compartment totalizer 390, the group totalizer 451, the grand totalizer 450, print the amount on the main control tape 507, the selected compartment tape 591, and feed the check in the selected compartment. This operation occurs for each check on the deposit ticket, thus entering amounts in various totalizers 390 according to the classifications on the checks. The following illustrative example is assumed:

|  | Check Amount | Check Classification |
| --- | --- | --- |
| 1st Operation | $15.00 | 12 |
| 2nd Operation | $10.00 | 13 |
| 3rd Operation | $20.00 | 15 |

The total is, of course, $45.00 which after three operations is totaled in the group totalizer 451 and grand totalizer 450.

The next operation is to compare $45.00 with the deposit ticket total, which, it will be assumed, is $45.00 which indicates accuracy in the entering of the three check amounts by the operator.

To condition the machine for group balancing operations the credit key 405 shown in Fig. 15 is first depressed. The key stem 406 is slidably mounted on studs 407 and when depressed a pin 408 closes contacts 409 and a shoulder is caught by an armature plate 372 of a latch control magnet 373. Thus, when the key is depressed contacts 409 are latched closed until magnet 373 is energized which releases the depressed key for return to normal by its spring 374.

In connection with the electrical wiring the machine has a number of cams mounted on cam shaft 300 which close and open the associated "C" contacts, as is well known and has been previously described. The timing of such contacts is shown in the cam contact timing diagram. Upon depression of the credit key 405 the following circuit is now completed; from line side 200, R22H relay coil (Fig. 64d) contacts 409, C14 cam contacts now closed, R30b relay contacts now closed, a plug connection 1300 which is made for group balancing, to line side 202. R22a contacts now complete a circuit from line side 20, R20, R23 and R24 relays in shunt, R25b contacts, R22a contacts now closed, C14 cam contacts now closed, R30b contacts, plug connection 1300, to line side 202.

When the machine is cycled, as will be explained, C14 cam contacts hold R20, R22H, R23, R24H relay coils energized until 340° of the group total checking cycle (see Fig. 62). R22c contacts (Fig. 64b) open the energizing circuit to the release bar clutch magnets 301 preventing initiation of the machine by the motor release bar 175 and requiring the operation of a group total key 802 (Fig. 40) for initiating a group total comparing cycle R23d contacts (Fig. 64b) open to prevent an energization of the R4 relay during the first cycle of a group balancing operation, since two cycles are necessary for a group balancing operation if no error is detected, as will be described. R22d contacts (Fig. 64c) open the circuit to the compartment totalizer control magnet 1301 which suppresses an entry in a selected compartment totalizer so that the total from the deposit ticket is not entered in any compartment totalizer 390, as will be explained. In addition R23a (Fig. 64c) contacts transfer to open the impulse circuit to the compartment totalizer control magnet 1301 and prepare an impulse circuit to the progressive total control magnet 1302 (Fig. 31) which is energized to prevent the group totalizer 450 from being cleared out or reset during the first cycle of a group balancing operation, which is a comparing or checking cycle, and to effect other operations.

*Storing up total on deposit ticket by ten-key keyboard*

Thereafter the operator depresses the digit keys 160 (Fig. 7) of the ten-key keyboard corresponding to the total written on the deposit ticket which is the total of the checks previously sorted and listed on the deposit ticket. It will be assumed that the total written on the deposit ticket is $45.00, which is entered by depressing the digit keys 4, 5 and 0 twice. The rack slides 238 will go to corresponding digit positions under control of the setup pins 210 (Fig. 10). The contact fingers of a readout now to be described will go to the corresponding digit positions, thus setting up 4500 in the left-hand or keyed columns of the pin carriage, and will read out that amount in the four right-hand columns of the left-hand group of nine columns in the RO1 electrical readout (Fig. 64e) which will leave five unset columns at the left. These five unset columns will be read from the five left-hand unset columns of the right-hand group of nine columns. As will be presently explained, 4500 is compared with the group total amount 4500 assumed to be now in the group totalizer 451.

*Keyboard controlled electrical digit readout RO1*

In addition to the digit setup by wheels 244 (Fig. 10) which afford the operator the opportunity to visually determine the digits which have been set up by the ten-key keyboard, there is provided a digit readout RO1 which is electrical in arrangement. While this electrical digit readout RO1 is set up in ordinary adding and subtracting operations it is effective, however, only in group balancing operations for comparing the total written on a deposit ticket with the total amount accumulated on and derived from the group totalizer 451, and set up on a supplemental readout RO2 (Figs. 18a and 64f).

The electrical readout unit RO1 (Figs. 6, 10 and 13) consists of a support plate 1305 of insulating materials having embedded therein for each of the 18 columns a column contact strip 1306 and for nine keyed columns digital contact points 1307. There is a digital contact point 1307 for each of the digits 1–9 in these nine columns and also a common one for the B (blank) and 0 positions for all 18 columns which correspond to the blank and zero digit positions of each of the setup slides 238. Each setup slide 238, as best shown in Fig. 10, carries an extension 1308 carrying a plate of insulating material 1309 supporting a metal plate 1310 having the integral column strip contact finger 1311 and digit contact finger 1312. Obviously, according to the digital position 1–9 of each setup slide 238, the associated finger plate 1310 will be in such position that finger 1312 will make contact with one of the 1–9 digital contact points 1307 and its other finger 1311 will be in position to always make contact with the column strip 1306. If a setup slide 238 is not moved plate 1310 is not moved and its finger 1312 will remain in contact with the B or blank contact point and finger 1311 on the associated column strip 1306, which is also the condition for a 0 setup. From Fig. 6 it will be seen that the readout unit RO1 has 18 column positions and since there are only nine digit positions set up in the ten-key mechanism the nine left-hand column positions (as shown in Fig. 6) are used to fill in the unkeyed columns to the left of the significant figure. Since setup slides 238 and plates 1310 with the contact fingers 1311 and 1312 carried thereby move step by step to the left as the successive key strokes are made, each key stroke reduces the number of unkeyed columns set at B or blank and increases the number of columns representing some digital value 0–9. In amount entering operations all unkeyed columns remain at blank positions "B" and complete checking requires these for blank fill-in checking circuits.

The support plate 1305 and contact strips 1306 and 1307 carried thereby are normally positioned above the contact fingers 1311 and 1312, as shown in Fig. 10, in order that the setup slides 238 may be freely moved to differential positions and laterally step by step without adding resistance thereto which would happen if the contact fingers 1311 and 1312 directly wiped under the contact elements 1306 and 1307. To this end the contact plate 1305 is supported at the right side (Fig. 13) by bell cranks 1314 and 1315 which are pivoted on studs 1316 carried by an upstanding frame plate 1317. Said bell cranks 1314, 1315 also have holes receiving pins 1318 carried by brackets attached to the right side of the support plate 1305. The vertical arms of the bell cranks 1314 and 1315 are interconnected by a link 1319. The left side of the plate is supported by similar supporting means, as shown in Fig. 6, the associated bell cranks having pivotal connections to the left-side of plate 1305. The bell crank 1314 has an extension 1320 to which a link 1321 is secured, said link being connected to a follower arm 1322 pivoted on a rod 1323. Said follower arm 1322 cooperates with a cam 1324 attached to the drive shaft 300. Said cam 1324 rocks the follower arm 1322 and through link 1321 rocks the four bell cranks supporting the plate 1305 to lower said plate 1305 enabling contact fingers 1311 and 1312 to make contact with the column strip 1306 and digital points 1307. As will be presently described in connection with the wiring diagram a test impulse is transmitted at this time to this readout so that the setting of RO1 readout is compared with the setting of another similar readout RO2 to determine identity in position of the two readouts, or whether the deposit ticket total set up by the ten-key keyboard agrees with the group total in the group totalizer 451. After the test impulse cam 1324 allows the plate 1305 to be restored to normal (see timing diagram of Fig. 63).

*Initiation of first cycle of a group balancing operation*

Initiation of the first cycle is effected by the group total key 802 which when depressed closes its contacts 907 to complete a circuit from line side 200, R21 relay magnet (Fig. 64b), credit key relay controlled R20b relay contacts now closed, contacts 907, to line side 202. A hold circuit is completed by the R21b contacts and since the group total key 802 remains latched down until the end of the second cycle (if the totals agree) R21 relay will be held energized for this length of time. When R21a contacts close the circuit from contacts 907 and relay contacts R20b is extended through R21a contacts and serially through the normally closed contacts shown in Fig. 64b from thereon to the clutch magnets 301 to energize the clutch magnets 301, thus initiating a cycle of operation by depression of group total key 802, just as if the motor release bar 175 was depressed. The R22b contacts (Fig. 64d) establish a holding circuit for R22P relay coil, the R24a contacts for R24P, the R25a contacts for R25H, which hold circuit is completed through R21c relay contacts, the R30b relay contacts, ON plug connection 1300, to line 202. Thus, R22, R24 and R25 relays are maintained energized after C14 cam contacts open at 340° in the first or comparing cycle.

A circuit also extends from contacts 907 to R9 relay (Fig. 64b), to line side 200. Thus, R9 is held energized by the latched contacts 907. Also, as has been described, for group balancing said ON plug connection 1300 is also made which completes a circuit through R30b contacts to the R35 relay (Fig. 64d). R35 relay is energized as long as plug connection 1300 is made.

A cyclic operation of the machine now takes place. At the initial operation of the machine the control slide cam 338 (Fig. 13) would allow the frame plates 326 carrying the control slides 272 to lower but since the hook 843 has been rocked by the group total key 802, as previously described, to catch under the stud 844 (Fig. 31) the frame plates 326 will not be lowered and by supporting the control slides 272 in their uppermost position so that they are clear of the stop studs 270 the control slides 272 along with the slides 376 take positions which are determined by the total amount in the group accumulator 451, as described in the sections "Group totalizer and grand totalizer" and "Total taking mechanism—group totals—key 802." The control slides 376, as was previously described, set up the printing elements 382 to print the group total on the main control tape 507 and as will be described the contact members of the electrical readout RO2, and which will have been fully accomplished at 183° when C15 transmits a test impulse to ascertain an agreement between both electrical readouts RO1—RO2.

*RO2 readout construction*

The RO2 readout is constructed similarly to the RO1 readout except as to its shape which, as shown in Fig. 18a, is curved in form. The RO2 readout consists of a circular insulating support plate 1325 in which is embedded ten columns of digital contact points 1326, there being one contact point for each of the 1-9 digit positions and a common one for the blank and 0 positions for each column, as provided similarly for the RO1 readout (see also Fig. 64f for a diagrammatic showing).

There is also provided in addition to the digit strips, ten column strips 1327. For each denominational order there is carried by an upstanding integral arm 1330 (Fig. 18a) which is a part of each bell crank 330 a plate of insulating material carrying a metal plate 1340 having for each column a digital contact finger 1328 and a column contact finger 1329 (Fig. 64f). It will be obvious therefore that except for the different shape of the parts, that the RO2 readout is similar to the RO1 readout in construction and operation.

It will be remembered that the slides 376 are elevated to differential positions in accordance with the total digit representation on the group totalizer 451 and accordingly through the bell cranks 330 the arms 1330 will go to the same digital positions so that the fingers 1328 will make contact each with one of the digital points 1326 0-9 of the associated column and the finger 1329 will make contact with the associated column strip 1327. The RO2 readout has ten duplicate readout sections which are set by the corresponding ten slides 376.

*Comparing by RO1 and RO2 readouts*

Due to the novel construction of the two comparing readouts RO1, RO2 and interconnected wiring disagreement or agreement is ascertained by a single impulse transmitted by C15 cam contacts at 183°. The comparing is done by detecting the continuity or discontinuity of the interconnected wiring when both readouts have similar or non-similar settings. The readouts consist of a plurality of comparing columns and due to the long electrical path the resistance at the pressure contacts might prevent by the available potential for a test impulse the full energization of a single agreement indicating relay if a single longer electrical path was used. For this reason it is preferred to subdivide the comparing into two comparing circuits to cause a concurrent energization of two agreement indicating relays R28 and R29 (Fig. 64f) when an agreement has been ascertained. The checking or testing impulse is directed from line side 202, plug wire 1300 (Fig. 64d), R30b contacts, through C15 cam contacts (Fig. 64e) closed at 183° in the first cycle of a group balancing operation R20a credit relay controlled contacts; from there on there being two paths; one through R14a normally closed contacts and wire 1335, and another by wire 1336, which former wire 1335 transmits the checking impulse to check the overflow column 0 of RO2 and compares four left-hand columns 1-4 of the RO2 readout and the corresponding left-hand columns 1-4 of the RO1 readout, the checking impulse having an exit by wire 1337 to R28 relay to line side 200, if agreement is ascertained. The same impulse from C15 cam contacts is directed by wire 1336 for comparing the five right-hand columns 5-9 of RO1 with the five right-hand columns 5-9 of RO2, the impulse having an exit by wire 1338 if agreement is ascertained, to R29 relay, to line side 200. It is explained that since there are ten slides 376 and RO2 readout has actually ten readout columns, the impulse by wire 1335 also goes through the 0 readout column or tenth column of RO2 readout to make certain that it is at normal, or B blank position, which it should be since it relates to an order not used for entry but carry only. If it is not at the B position R28 relay will not be energized.

The RO1 and RO2 readouts are shown, by way of example, with four of their respective contact plates 1310-1-4 and 1340-1-4 positioned as shown by dotted lines to represent 4500, the strips $1340_{1-4}$ for RO2 readout having been positioned at 4500 in a group total taking operation by the control slides 376. Contact plates $1310_1$, $1310_2$, $1310_3$ and $1310_4$ are shown in dotted position set at 4500 as a result of the operation of the ten-key keyboard to set up and store the deposit ticket total and due to the step-by-step movement of the pin carriage to the left are now in association with columns 6–9 of RO1 readout. Therefore, contact plates $1310_5$–$1310_9$ are now in the positions occupied by $1310_1$–$1310_5$. Plates $1310_5$–$1310_9$ represent unkeyed columns, and $1310_1$–$1310_4$ represent keyed columns, all of which are checked. For enabling the checking impulse from wire 1335 to go serially from 0 column to column 1 of RO2, column 2 to column 3, 5–6 and 7–8 of RO2 readout, connecting wires 1341 (Fig. 64f) are provided. There are similar wires 1342 (Fig. 64e) for the same purpose in RO1 readout. In addition, the contact points 0 and B and 1–9 of RO2 readout each have a wire connection 1343 to a corresponding contact point 0 and B and 1–9 of RO1 readout, and is provided for each pair of contact points, although for simplicity only a few of such wires are shown in Figs. 64e and 64f. This enables a direct comparison of the digit setting of corresponding columns of RO1 and RO2 readouts, the continuity then being effected by wires 1341 and 1342, as will be explained.

Of course, if RO1 and RO2 readouts were always set up to represent a number having nine digits the described arrangement would suffice, but in practice a number having less digits is usually set up, in which case each zero representing column of RO2 readout at the left higher order must be compared with the related unkeyed column of RO1 of higher order for complete checking. Since the blank or 0 digit representing columns of RO2 are indicated on RO2 readout by the B or blank position of contact plates 1340, there can be no direct comparison with the left-hand unkeyed columns of RO1 because no contact plates 1310 are associated with these columns. Thus, the continuity of the checking circuit must be transferred to the right-hand columns 1–9 of RO1 where the corresponding contact plates 1310 will have been retained at B or 0 position.

Assuming now the comparison of 4500 on RO2 with 4500 on RO1 has been initiated; the impulse from wire 1335 (Fig. 64f) passes to B contact point 1323 of the 0 column of RO2 now at B position, contact plate $1340_0$, column strip $1327_0$, wire 1341 of this column, thence in the reverse manner through column 1 of RO2, thence by a wire 1343 to column 1 of RO1 which is also at B position, thence by a wire 1344 (Fig. 64e) through $1310_5$ contact plate (having taken the place of $1310_1$) wire 1345, column contact strip 1306 of RO1, column 1, wire 1342 connecting columns 1 and 2 of RO1, column strip 1306 of column 2 of RO1, wire 1346, through $1310_6$ contact plate (having taken the place of $1310_2$), a wire 1347 to column 2 at B position, a wire 1343, through column 2 of RO2, a wire 1343 connecting columns 2 and 3 of RO2. Hence, columns 1 and 2 or RO1 and RO2 are compared. In a similar manner columns 3 and 4 of RO1 and RO2 are compared, the exit impulse by wire 1337 being directed to R28P relay coil. In a similar manner the impulse by wire 1336 compares unkeyed column 5 of RO1 with column 5 of RO2 and since 4500 appears in columns 6, 7, 8 and 9 of both RO1 and RO2 the comparing circuit is similarly through the settable contact plates and fingers of these columns. The exit impulse upon agreement is by wire 1338 to the R29P relay coil. Upon an agreement both R28 and R29 are energized between 183°–195° of the comparing or first cycle of a balancing operation. RR28 and R29 close their associated "b" contacts (Fig. 64c) to pick up their associated H coils, which are maintained energized through the C9 cam contacts back to line side 202, said contacts holding R28 and R29 energized until 340° of the first cycle.

*Credit key released but group total key held latched down upon agreement*

At 315° of this comparing cycle cam contacts C13 (Fig. 64d) transmit an impulse to the credit key release magnet 373, energizing the latter to release the credit key (see Fig. 15). Since an agreement has been ascertained, both R28a and R29a contacts are closed and a circuit is extended by wire through R28a, R29a and the R9b contacts now closed, as was previously described, to suppression release magnet 1350 to line side 200. The group total key cannot be released at the end of the cycle in the normal way, and as will now be described is held down for a second cycle.

Referring now to Fig. 31 said magnet 1350 attracts an armature 1351 which is a part of interposer plate 972 and said magnet is timed to attract and rock said plate 972 to disengage its shoulder from square stud 971 at the time follower bell crank 967 is rocked by the cam 970. Thus, arm 979 is not rocked and detent plate 811 is not shifted to release the group total key 802, and the latter remains latched down to initiate the next cycle. Since contacts 907 are maintained closed the previously described circuit to energize release bar clutch magnets 301 is held closed. The next cycle is a group total cycle with clearing and is initiated automatically when a credit total and the group totalizer 451 are in agreement.

*Means to derive total from group totalizer 451 in a group comparing cycle No. 1 without clearing and controlled by progressive total magnet 1302*

During the first, or comparing cycle, cam contacts C5 (Fig. 64c) close at 5° to complete a circuit from line side 202, cam contacts C5, R23a contacts now transferred, progressive total magnet 1302, to line side 200. When magnet 1302 is energized between 5°–155° by C5 cam contacts it attracts its armature 1355 (Figs. 31 and 43) to unlatch a bell crank 1356 pivoted on the fixed stud 672. Said bell crank has a link connection 1357 to the link 877, causing a spring 1358 connected to said link 877 to rock said link when a roller 1360 drops off the high cam portion 1359. It will be recalled that pin 878 engages a vertical slot of a follower arm 879 (Figs. 32 and 43) when taking a group total with clearing. When the forward end of link 877 drops pin 878 engages the lower end of vertical slot in follower arm 880 (Figs. 32 and 43) which is operated by a cam slot in the side of cam 516. The cam slot is the same as cam portions 425a and 425b, but instead of the rise cam portion 425c (Fig. 43a) the corresponding part in cam 516 is concentric. This will permit the pinions of the group totalizer 451 to remain in mesh with related racks 384 until cam portion 516C effects the disengagement at the end of the cycle and the group total will be re-entered in the group totalizer 450, i. e. the latter will not be cleared out. (See timing in Fig. 63 for "Progressive total.") It is explained that the slot in cam follower arm 880 is shaped ˥ and the slot in cam follower 879 (see Figs. 43, 43a) as L, so that with common vertical slots the horizontal portions of the slots provide a clearance slot for stud 878 in the follower arm which is not to be effective although it is operated. The cam portion 1359 on cam 516 enables the dropping of the free end of link 877 at the beginning of the cycle and said cam portion 1359 at the end of the cycle (see Fig. 63) strikes the roller 1360 at the end of the cycle to elevate the free end of link 877 so that bell crank 1356 can be relatched by the armature 1355 of the now deenergized progressive total magnet 1302.

*Group balancing operation—cycle No. 2*

This total taking operation of the machine is nearly a normal one (with exceptions to be described) which occur just as if the group total key 802 was depressed. In this group total taking cycle the group total 45.00 is derived from the group totalizer 451, printed by the control tape printer, the group total amount is cleared out of the group totalizer 451 because, as will be explained, R23a contacts come back to normal and magnet 1302 (Fig. 64c) is not energized. During this cycle other circuits come into operation to prevent a repeat of the operation of the first cycle as follows:

At 315° C-13 cam contacts (Fig. 64d) pick up the R25P relay coil which closes R25a contacts to pick up R25H which is held through R21c contacts which are closed at this time. R25b contacts open to prevent a second pickup of R23, R24, R20, even though the R23 and R20 and R24 are held through most of the second cycle. The depressed group total key 802 is unlatched at the end of this second cycle by normal movement of the detent plate 811, as has been described because magnet 1350 will not be picked up in this second cycle.

It is explained that the group total amount is again printed on the main control tape 507 in this second cycle of a group balancing operation.

*Group balancing—error indication*

It will be assumed that an error has been made in reading one of the three checks and $55.00 has been entered in the group totalizer. The RO2 readout now disagrees with RO1 in column 4 because the associated contact plate 1340-4 is set at 5. This breaks at this point in an obvious way the circuit to the R29 relay and according to the circuits previously described will not be operative to cause the second group total taking with clearing cycle, and the operation of the machine will stop after the first cycle, and a signal given to the operator.

After the termination of the checking operation in the first cycle C8 cam contacts (Fig. 64d) transmit an impulse at 200°, completing a circuit from line side 202, C8 cam contacts, R36a contacts now transferred, R21b contacts now transferred, R35c contacts now closed, R23b contacts now closed, R28b or R29b contacts or both, depending upon the disagreement condition in RO1 and RO2 readouts, R26PU relay coil to line side 200, and also to R27 and a red signal bulb 1365, both of the latter also being connected to line side 200. R26 closes its hold contacts R26b, the hold circuit for R26, signal bulb 1365, R27 relay, extending through R26b, contacts 986 of keys release key 804, to line side 202. Signal bulb 1365 gives a "line lock" signal to the operator, and further R26a contacts (Fig. 64b) open the energizing circuit of the motor release bar clutch magnets 301, and contacts R26c (Fig. 64a) open the circuit to reel stop solenoid 115 so that a change in position of the sorting drum cannot be effected. R27a (Fig. 64a) contacts are also interlock contacts in the drum rotation reversing circuit to R3 relay to prevent improper operations.

In this operation the incorrect group total 5500 was also printed on the main control tape 507, and it is desirable to identify this by printing an E to the left of this printed amount.

From either 29b or 28b contacts, depending upon which is closed, a circuit also extends through R13a transfer contacts (Fig. 64d) now normal, to the symbol hammer control magnet 1366 to line side 200. The magnet, as was previously described, in connection with Fig. 48, releases a hammer 504 to print the error symbol E adjacent the group total printed on the main control tape.

The error signal and interlocks controlled by R26 and R27 remain effective until keys release key 804 is depressed. When R26b contacts close they are latched by a latch arm 1367. When key release key 804 is depressed it opens contacts 986 and closes contacts 987 (see Fig. 37), which latter closes an obvious circuit to energize the dropout magnet R26DO (Fig. 64d). The latter attracts latch arm 1367 to open hold contacts R26b to open the hold circuit for R26, R27 and signal bulb 1366. With this warning the operator seeks the cause of the error, which may have been in the reading of the deposit ticket total, or an incorrect entry of one of the checks. In either case the error may be corrected as will be explained later. It will be recalled that the group total key 802 is mechanically unlatched at the end of this cycle.

*Rectification of error*

If the error occurred in setting up the deposit ticket total the credit key 405 (Fig. 15) is again depressed, the proper deposit total rekeyed by the ten-key keyboard, and then the group total key 802 is depressed. The operations effected in the next two cycles are the same as previously described when an agreement is ascertained. The group total derived from the group totalizer 451 is again printed on the control tape 507 with the exception that the E, or error symbol is not now printed aside of the second printed group total.

When the error is ascertained to be in the entry the subtraction key 177 is also depressed in setting up by the tens complement on the ten-key keyboard of the amount in error. In other words, the amount printed as a group total and indicated by E is added to the tens complement of the amount in error. For example, it was supposed that 55.00 was set up in RO2, and RO1 represented the correct deposit total. The sub-total was printed as E55.00 and since the error is $10.00 the tens complement 9999999000 is added to
0000005500 in the group totalizer 451

To give a correct balance of 45.00, 9's at the left are automatically entered by the subtraction key 177, as described in the section designated "Subtraction key." Now with this proper balance total on the group totalizer 451 a group balancing operation is reinitiated, as previously described.

*Use of sorting compartment to receive deposit tickets and related compartment totalizer as a grand totalizer*

The present machine is so arranged that when group balancing operations are to take place a selected compartment totalizer 390 may be utilized to receive a grand total of deposits represented by a series of deposit tickets. Herein compartment totalizer No. 24 is shown as, by way of example, the one to function as such a grand totalizer. The associated compartment No. 24 is also used to receive all the deposit tickets. In this event compartment No. 24 is not used to receive sorted checks, the No. 24 compartment totalizer 390 will not receive check amounts and check amounts will not be printed on the No. 24 compartment tape 591.

In group balancing operations the No. 24 compartment totalizer 390 receives its entry by a total transfer operation from the group totalizer 450 during the second cycle, if an agreement is ascertained.

The 24 compartment selector keys 40 are arranged to close an extra set of contacts 1370 (Fig. 64c) in the same fashion as in Fig. 10 of the patent to T. J. Watson, No. 2,314,258, issued March 16, 1943. One side of each of the 24 contacts 1370 is connected to the line side 202, through normally closed contacts C12. To the other side of each of the contacts 1370 there are connected multiple plug sockets 1371, so that a plug connection from the desired plug socket will select and cause certain additional functions to be performed when a selector key 40 is depressed.

To condition the machine to operate in the above manner plug connection 1300 remains and an additional plug connection 1372 is made from a plug socket 1371, associated with No. 24 compartment key contacts 1370 which are closed when compartment key 24 is depressed, to a plug socket 1373. Thus, at the beginning of group balancing operations the compartment No. 24 selector key 40 is depressed before or after the credit key 405 is depressed to cause the sorting drum to rotate to select No. 24 compartment totalizer 390 and compartment No. 24. When contacts 1370 related to No. 24 selector key is closed a circuit is completed from line side 202, cam contacts C12 now closed, contacts 1370, plug socket 1371, plug connection 1372, plug socket 1373, R35d contacts now closed, R19H relay coil to line side 200. A hold circuit for R19P is completed through R19a contacts, C9 cam contacts, to line side 202. C9 cam contacts hold R19 relay energized for nearly the first cycle of the group balancing operation. R19c contacts (Fig. 64b) open the energizing circuit of clutch magnets 301 to prevent initiation of a machine cycle by the motor release bar 175. R19d relay contacts (Fig. 64d) close to enable the energization of the R20 and R23 and R24 relays by the same circuit previously described as controlled by the R22a contacts. The circuits are now conditioned for a group balancing operation. The ten-key keyboard is operated to set and store up the deposit ticket total and thereafter the group total key 802 is depressed which initiates the group balancing operation, as before. The first comparing cycle takes place as previously described, and need not be repeated. If RO1 and RO2 amounts agree then the total in the group totalizer 451 is transferred in the second cycle to compartment accumulator No. 24, this being performed by energization of the compartment totalizer add control magnet 1301. At the beginning of the second cycle C5 cam contacts (Fig. 64c) transmit an impulse from line side 202, cam contacts C5, R23a contacts now normal, R24b contacts now closed, R22d contacts now closed, control magnet 1301 to line side 200.

As has been described in the section "Total taking mechanism—group totals—key 802," the depression of the total key 802 moves control slide 861-3 to rock the bell crank 457C (Fig. 41) so that pin 412C is in a neutral position in associated recess 870, and said pin 412C remains in such position during the first comparing cycle. Early in the next cycle when C5 cam contacts close at 5° magnet 1301 will be energized to rock its armature 1375 and a shaft 1376 to which said armature 1375 is attached. Attached to rock shaft 1376 is an arm 1377 which is underneath a pin 1378 carried by link 414. With pin 412C in its recess 870 the arm 414 will be rocked against the action of a spring 1380 connected to arm 414 with pin 412C as a fulcrum point, as the arm 1377 is rocked clockwise, due to the energization of magnet 1301. Pin 416 on link 414 will now cooperate with the horizontal part of the bayonet slot 415 now enabling a spring 1381 connected to link 424 to shift link 414 to the left to cause pin 412C to engage its associated recess 413 in the adding engaging slide 410. Now in the second comparing cycle, after slides 376 and racks 385 have been positioned upwardly to differential positions under control of the group totalizer 451, cam 425 will actuate the adding engaging slide 410 in the same manner as in compartment totalizer adding operations to cause the pinions of the No. 24 compartment totalizer 390 to engage the racks 385. Downward movement of racks 385 will transefer the amount on group totalizer to the No. 24 compartment totalizer. This amount is also printed on No. 24 compartment tape, as will now be described, since group totals are not normally printed on a compartment tape.

*Means to print amount transferred from group totalizer 451 to No. 24 compartment totalizer on No. 24 compartment tape*

It was explained in the section "Total taking mechanism—group totals—key 802" that said key prevents printing of a group total on any compartment tape. This was effected by raising the left end of link 669 (Figs. 31 and 41) so that it is disconnected from pin 670, it being recalled that pin 902 is now coacting with the bottom edge of the horizontal slot portion of bayonet slot 897.

Attached to rock shaft 1376 is an upstanding arm 1385 to which is pivoted the link 901. When said arm 1385 is rocked due to the energization of magnet 1301 link 901 is moved to the right moving pin 902 out of the horizontal slot portion and into the vertical slot portion of bayonet slot 897. A spring 1386 attached to link 901 moves the left end of link 901 downwardly, causing a slot in the end of link 669 to re-engage the pin 670. Link 669 will now be rocked by its cam 676 in the usual manner so that the amount transferred from the group totalizer will be printed on No. 24 compartment tape 591.

Means to print amount transferred from group totalizer 451 to main control tape and also print the associated compartment group number The transferred amount is set up on the main control tape printer in the usual manner so that the operator will have a notation on the main control tape of such amount. It is also desirable to print the number of the compartment totalizer involved in this operation and additional means is hereby provided since it will be recalled that normally the compartment number is not printed when a group total is taken as a result of the operation of the group total key 802.

The aforesaid link 901 carries a pin 1080 (see Fig. 41) receiving a bifurcation of an interconnecting double arm 1081 pivotally mounted on a rod 1082. The upper portion of said arm is also bifurcated to receive a pin 1083 carried by the arm 1067 of said bell crank 1066—1067.

Movement of the link 901 to the right will thus rock the double arm counterclockwise and the bell crank 1067 clockwise as viewed in Fig. 38. Arm 1066 of said bell crank will, through its contact with pin 1065, rock the pitman 1063 upwardly about its pivot 1069 against the action of the spring 1064. The horizontal portion of the bayonet slot 1062 will now be correlated with pin 1061, enabling a spring 1084 attached to the control plate 1070 to rock the latter counterclockwise, elevating the lug 531 so as to restore the thrust bar 524 in the position shown in Fig. 18c. It will be recalled that this is the position of the bar 524 required for effecting operation of the compartment number printing hammer 504. Thus, in this particular operation, the compartment number will now be printed alongside of the amount which has been transferred and printed on the main control tape.

Subtract key circuits

When subtract key 177 is depressed it closes its contacts to energize, by an obvious circuit, R14 relay (Fig. 64c), R14a contacts (Fig. 64e) open the impulse circuit from wire 1335 so that if the subtraction key is inadvertently depressed in a group balancing operation an error will be indicated. R14c contacts (Fig. 64b) open the impulse circuit to the R8 relay so that in the absence of feeding of a check in a subtraction operation (which is not required) an error will not be indicated as will be made clearer later on. R14d contacts (Fig. 64b) open so as to place the normally opened R7c contacts in the energizing circuit of the clutch release magnets 301. When the ten-key carriage moves at least one column contacts 370 close to pick up the R7 relay to close R7c contacts (Fig. 64b). Thus 1–9¢ is not subtracted unless set up on the ten-key carriage, as was explained in the section "Ten-key escapement contact."

Adding machine key circuits

By completion of an obvious circuit, closure of contacts 926 by the adding machine key 805 energizes a relay R34 (see Fig. 64b). R34 relay closes its R34a contacts (Fig. 64c) to light a signal bulb 1367 to indicate that the adding machine key 805 has been depressed and is in operation. R34c contacts close to connect a plug socket 1388 to the line side 202, from which plug socket a plug connection may be made to other plug sockets connected to magnets or solenoids to effect desired operations when the adding machine key 805 is depressed. R34b contacts (Fig. 64b) are in shunt with R36b contacts, and since the latter are opened when the three total keys 801, 802, 803 are operated, the adding machine key 805 cannot be operated in conjunction with the three total keys and the machine cycled because R34b and R36b both open the energizing circuit to clutch release magnets 301.

Progressive total key circuits

It will be recalled that when progressive total key 807 is depressed it closes contacts 963, opens contacts 964 (Fig. 64b), and closes contacts 965 (Fig. 64c) which have the following functions: Contacts 964 are interlock contacts and when opened break the circuit to the clutch release magnets 301 when key 807 is partially depressed. The circuit to magnets 301 is completed when contacts 963 are closed upon a full depression of key 807.

Figure 64C:
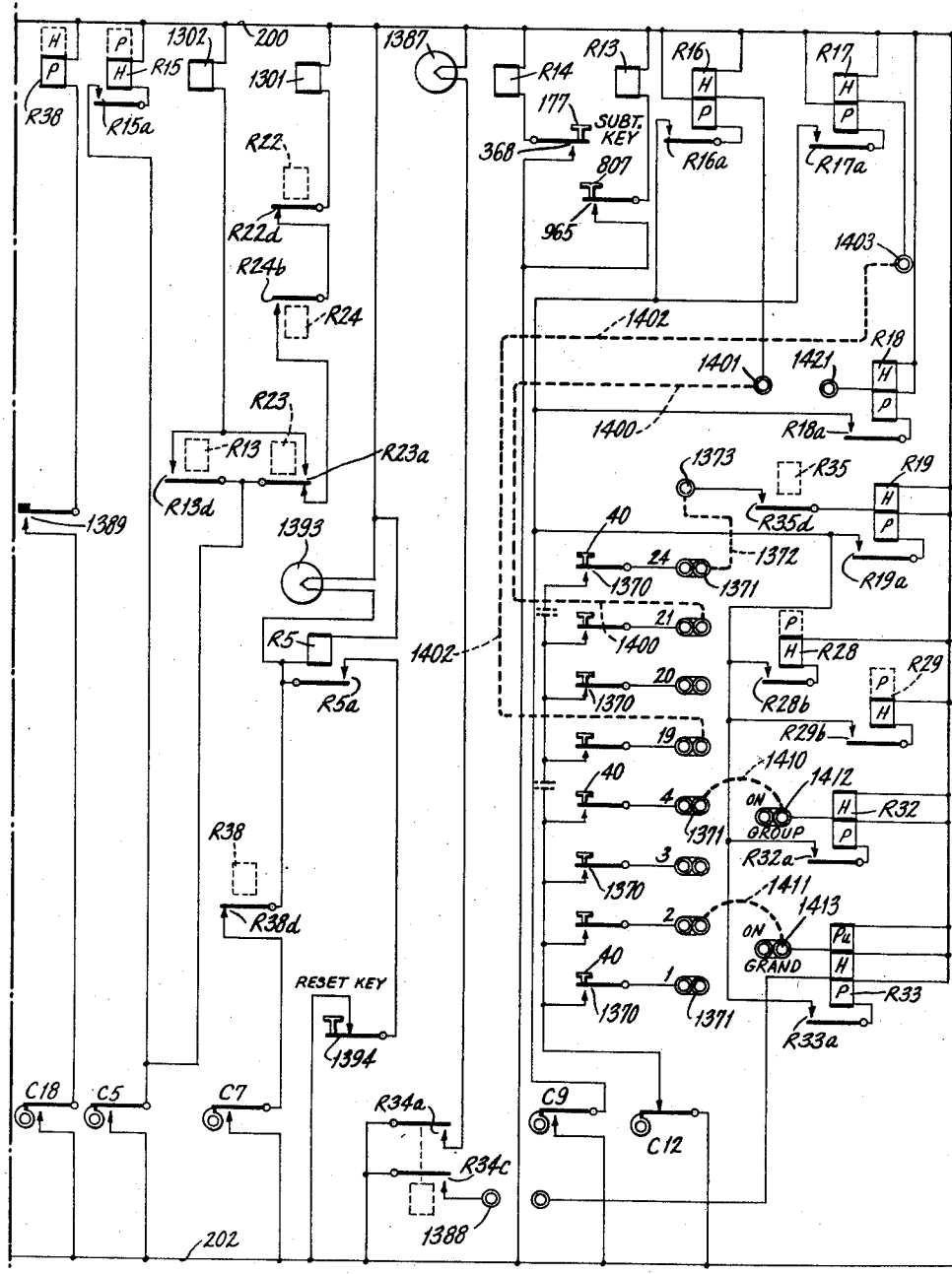
Figure 64D:
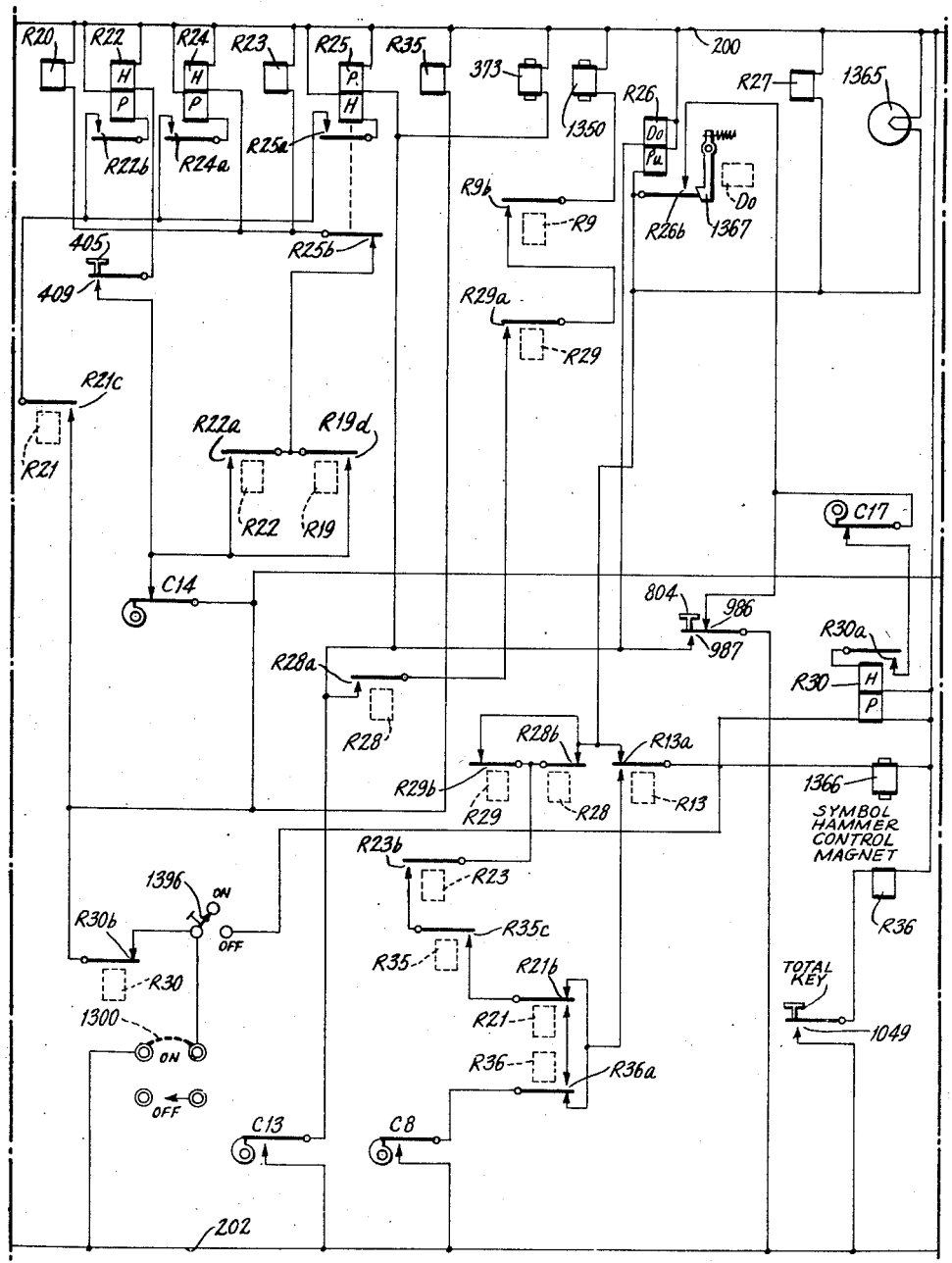
Figure 64E:
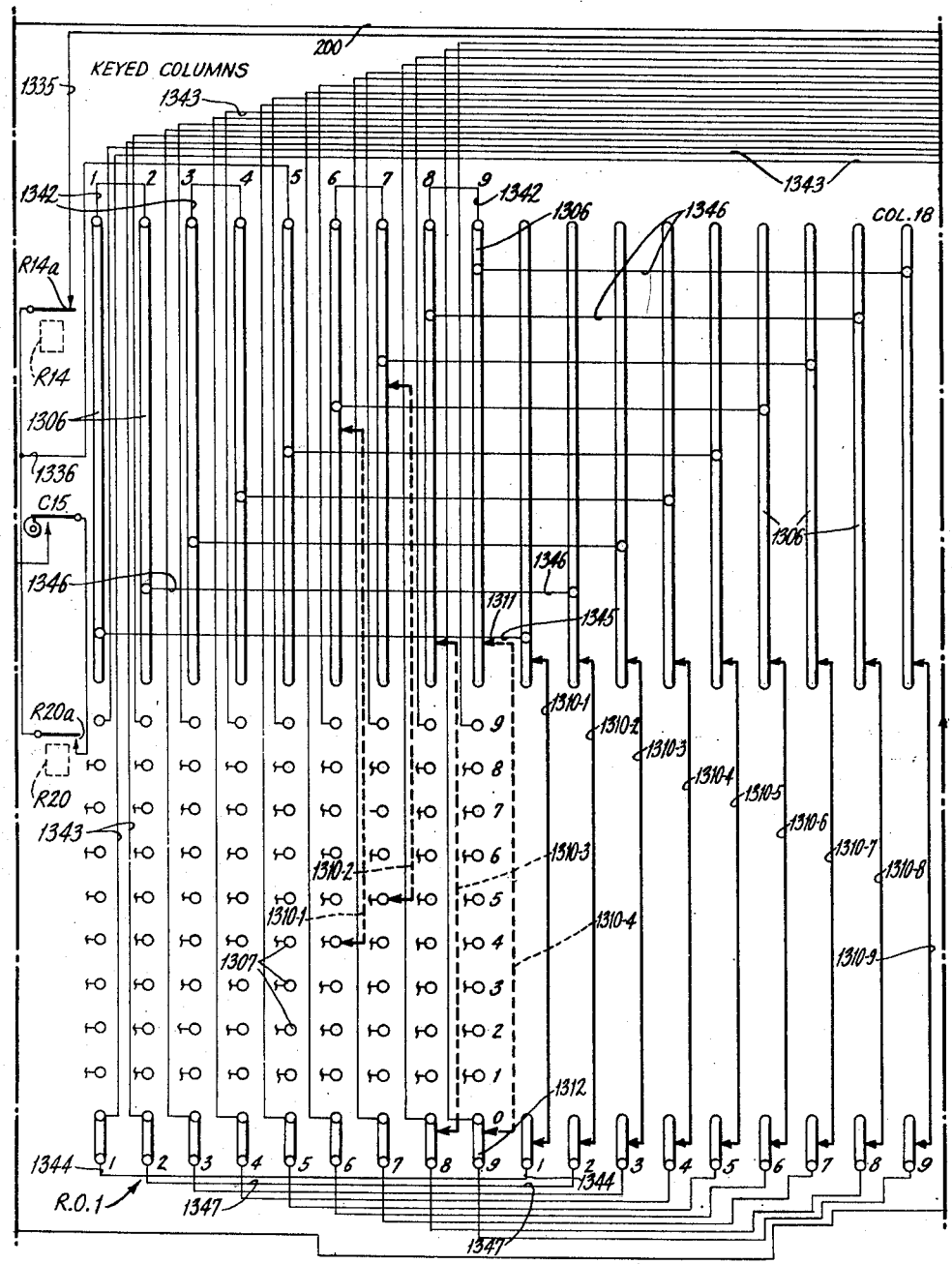
Figure 64F:
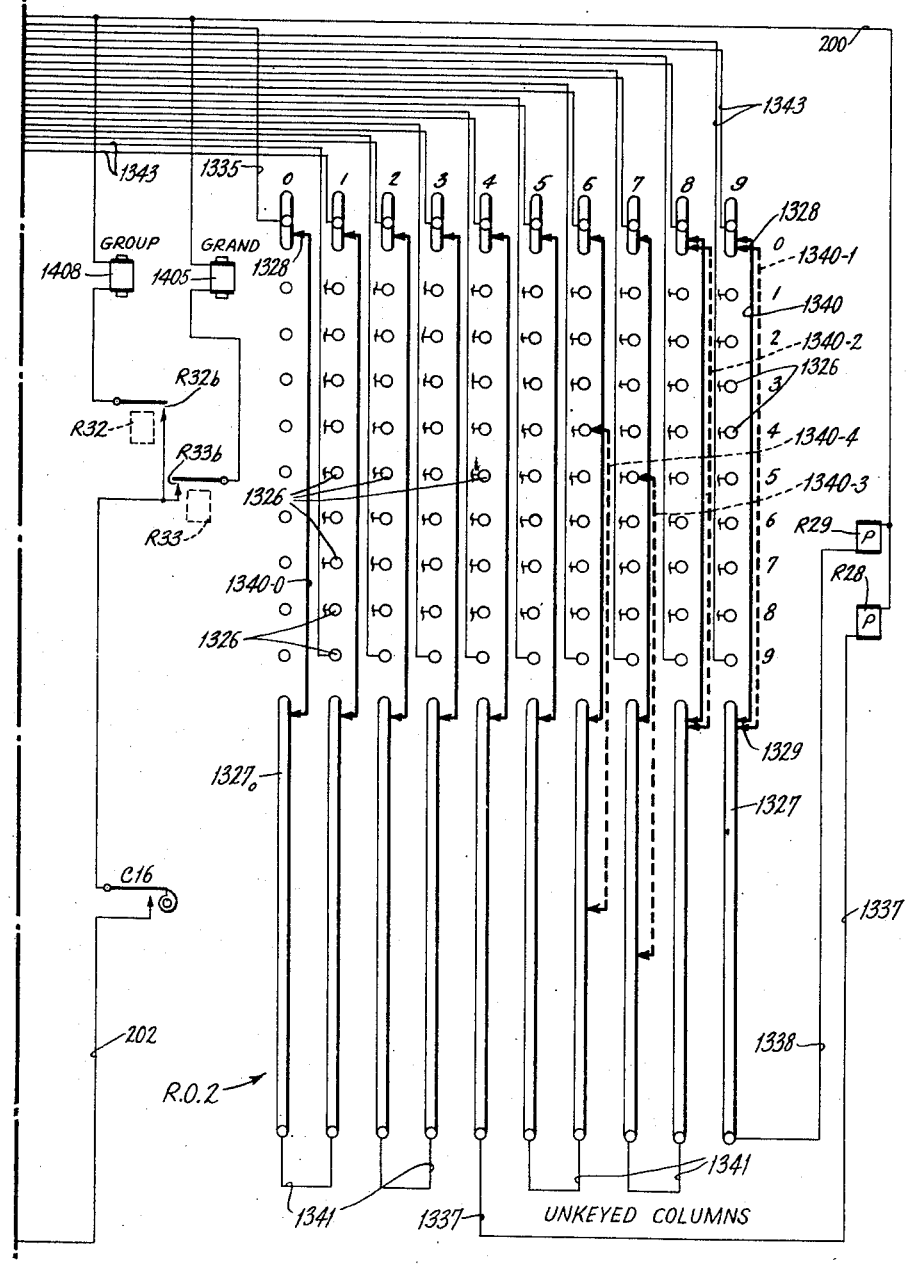

Closure of contacts 965 causes, by an obvious circuit, the energization of R13 relay (Fig. 64c). R13 relay closes R13d contacts (Fig. 64c) to energize, by an obvious circuit, the progressive total magnet 1302 when cam contacts C5 close. Thus, if the progressive total key 807 is operated in conjunction with the compartment total key 801, group total key 802, grand total key 803, a progressive total can be taken from any compartment totalizer 390, the group totalizer 451 or grand totalizer 450.

R13c contacts (Fig. 64b) are interlock contacts in shunt with R23c contacts to prevent use of the progressive total key during a group balancing operation, since opening of both contacts prevents the energization of clutch release magnet 301, even if contacts 963 are closed by the progressive total key 807.

R13b contacts (Fig. 64b) close to lock the ten-key keyboard in a manner to be explained.

R13a normally closed contacts (Fig. 64d) permit the energization of the symbol hammer control magnet 1366 to print an error symbol E as was explained. When R13a contacts are transferred they place the symbol hammer control magnet 1366 in a series circuit with R36a relay contacts and C8 cam contacts. It will be recalled (Fig. 21a) that when contacts 1049 (Fig. 64d) close as a result of operating any total key 801, 802, 803, R36 relay is picked up and closes R36a contacts. Thus, a PT symbol will not be printed unless a total key 801, 802, 803 is depressed with the progressive total key 807.

Group total key circuits

Whenever the group total key 802 is depressed, with or without group balancing operations, contacts 907 (Fig. 64b) close a previously described circuit to the R21 relay. When group balancing operations are not required R35 relay is deenergized so that R35b contacts (Fig. 64b) are closed. This enables completion of the circuit from line 202, contacts 907 (Fig. 64b), R35b relay contacts, relay R21, to line side 200. Thus, the clutch magnets 301 are energized to cycle the machine automatically when group total key 802 is depressed. There is also a circuit closed to R9 relay in an obvious manner when contacts 907 are closed; either for group balancing operations or normal group total operations.

R9b contacts (Fig. 64d) close to enable the energization of the key release suppression magnet 1350, by a previously described circuit.

Check sensing circuit

The present machine includes circuits for determining the failure of a check to feed, and whether a check that has been fed is wider than normal and was not completely fed into the selected compartment in one cycle, and thus required a second cycle to complete the check feed.

One arrangement devised for the above purposes is fully shown and described in the patent to S. Brand et al., No. 2,146,695, issued February 7, 1939. The present machine has a different and improved circuit for securing these functions which will now be described.

As was previously described, upon the failure of a check to be inserted or fed contacts 1389 (Fig. 64c) will be retained closed, whereas if a check is properly fed and completely into the selected compartment these contacts will be opened. In the absence of a check, contacts 1389 are closed at 30°, and since C18 cam contacts are closed up to 65° of the cycle R38P relay coil will be energized at this time to transfer its R38a contacts (Fig. 64b). At 30° in the cycle, or thereabout, C4 cam contacts which are closed between 17°–42° close a circuit from line side 202, C4 cam contacts, R38a contacts now transferred, R16b contacts now closed, R7d contacts now closed because an amount has been set up on the keyboard, R14c contacts now closed, contacts 842 now closed, contacts 936 now closed, R8PU relay coil to line side 200, as well as a circuit through R17b contacts now closed to a signal light 1391 which is also connected to the line side 200. This light signifies an erroneous operation and R8PU relay also indicates it in a further manner. The R8PU relay coil closes its contacts R8a which are latched closed by a latch arm 1392, and thus a hold circuit is completed through relay contacts R8a and C3 cam contacts, back to line 202 to hold R8PU relay coil energized (and signal light 1391 illuminated) from 37° to the end of the cycle and to 12° of the next cycle. R8b contacts (Fig. 64a) open the circuit to the solenoid 115 to prevent turning of the sorting drum to another position and R8d contacts (Fig. 64a) open the circuit to the R3 relay, which are also interlock contacts provided for safety purposes.

It will be seen that C4 cam contacts transmit through R38c contacts now closed an impulse at 17° of each cycle to energize the R8DO relay coil, which attracts the latch arm 1392 to allow contacts R8a to open, if they have been closed, to deenergize R8 relay coil, and extinguish the lighted signal light 1391. Thus, in the early part of the next cycle that the check is fed the circuits are restored to normal.

When the R8PU relay coil is energized the R15PL relay coil and R10H relay coil (Fig. 64b) in shunt therewith are energized and are held energized as long as R8PU relay coil is. R15PL relay coil closes its R15a relay contacts (Fig. 64c) and through such contacts and C5 cam contacts, R15H relay coil is energized up to 155° of the cycle. When the check which should have been fed is fed in the next cycle the ten-key keyboard is not operated and, therefore, R7d contacts (Fig. 64b) are open. Contacts R15b are closed, however, so that the impulse from C4 is directed in this second cycle through R15b contacts and in the same manner as before to the R8PU relay coil, to test and determine whether in this second cycle the check is fed.

It will be noted that the aforedescribed detecting circuit is ineffective when any total key 801, 802, 803, Non-Add C&C key 808 and subtraction key 325 are depressed because of the opening of respective contacts 842, 936 and R14c. Thus, operations controlled by these keys can be performed without requiring the feed of a check.

If a check is fed too late in the feed operation, or if it is too wide, an indication is made by the following circuit: As a result of a check being too wide or fed into the chute too late, sensing finger contacts 1389 remain open and R38 relay is deenergized so that R38d contacts (Fig. 64c) are closed at the time C7 cam contacts close at 132° of the cycle. A circuit is now closed from line side 202, C7 cam contacts, R38d relay contacts, R5 relay coil, to line side 200. At the same time a circuit is completed to a signal light 1393 indicating this condition. The signal light 1393 and R5 relay are held lighted and energized through R5a hold contacts and manually operated reset contacts 1394 back to line side 202. R5b contacts (Fig. 64b) open the circuit of the release bar clutch magnets 301 to prevent the cycling of the machine by depression of motor release bar 175 until manually operated contacts 1394 are opened and R5 relay deenergized. Thereafter, the motor release bar 175 can be depressed to completely feed the check in this next cycle.

*Selective means for rendering check sensing circuit inoperative*

It is desirable to render the check sensing circuit inoperative when items are entered into certain compartment totalizers without accompanying checks. To this end a plug connection 1400 is made, for example, from a plug socket 1371 of the desired compartment selector key 40 to a plug socket 1401 (Fig. 64c) to pick up a relay coil R16H. A hold circuit for R16P is effected through the R16a and cam contacts C9 back to line side 202 which holds R16 relay energized for nearly the complete cycle. R16 relay opens contacts R16b (Fig. 64b) to disable the check sensing circuit. Thus, even in the absence of the feed of a check a new sorting compartment may be selected and the ten-key keyboard operated to cause the entry of another item.

*Check sensing circuit rendered effective for deposit ticket feeding*

It will be recalled that for group balancing operations the group control key 802 is utilized and since this opens contacts 842 (Fig. 64b) the aforedescribed check sensing circuit would be ineffective for use when deposit tickets are to be fed to No. 24 sorting compartment. Accordingly, a switch 1395 lever is switched to "on" position and the aforedescribed sensing circuit is directed from R14c contacts, switch lever 1395, R19b contacts now closed, and to the R8PU relay coil, R15PL relay coil, R10H relay coil, and signal light 1391. Thus, the same error indications are given for a failure to feed a deposit ticket as for check feeding.

*Impulse circuit to energize endorse control solenoid 1200*

This impulse circuit is from line side 202, through contacts 299 (Fig. 64b), relay contacts R19c, R7c, R9a, R22c, R23c, R34b, R26a contacts, all of which are closed and thence to a switch 1420 in "on" position, R18b contacts now closed, C10 cam contacts, solenoid 1200, to line side 200. This impulse circuit energizes the endorse control solenoid 1200 upon each depression of the motor release bar 175 to effect endorsing as long as the switch 1420 is in "on" position.

Signal to indicate failure to engage clutch to endorse

At 65° the C18 cam contacts open to deenergize the R38PU relay coil to allow R38a transfer contacts to go back to normal. At 90° cam contacts C11 close to complete a branch circuit of the endorser control impulse circuit from R18b contacts, through the endorse contacts 1230 which remain closed upon failure of the endorser clutch to be engaged to contacts R38a now normal. The rest of the impulse circuit from here on was described in the section "Check sensing circuit" to give the same sginals and indications for failure to endorse a check or print on a deposit ticket when either should occur.

Selective endorsement

The R18 relay coil is also one which like R19 relay may be picked up when a desired selector key 40 is depressed as by a desired plug connection from a plug socket 1371 (Fig. 64c) to a plug socket 1421, associated with the R18 relay. The R18b contacts (Fig. 64b) open the impulse circuit for endorse control solenoid 1200, and also suppress giving an improper signal under control of endorse control contacts 1230. In other words R18b contacts cripple the non-endorse test.

It should be noted that the selector key 40 utilized to select a desired compartment totalizer 390 in group balancing operations may also pick up R18 relay to suppress endorsement of the deposit ticket, if it should not be endorsed. If it should be endorsed switch 1420 is "on" and R18 relay is not picked up.

Means to suppress group balancing operations even when called for

It is desirable at times to suppress group balancing operations even though plug connection 1300 (Fig. 64d) has been made. To this end there is provided a toggle switch lever 1396 which has an "off" and "on" position. In the "off" position it completes a circuit from line side 202, plug connection 1300, switch 1396, to the R30P relay coil, to line side 200. The latter closes hold contacts R30a to effect a hold circuit from line side 200, R30H relay coil, R30a relay contacts, cam contacts C17 now closed, keys release key contacts 986 back to line side 202. Cam contacts C17 retains R30H relay coil energized up to 344° of the next cycle. R30 relay opens R30b contacts (Fig. 64d) which prevents the energization of R22, R23, R24 and R25 relays used in group balancing operations. This will permit normal, group, grand or compartment totalizing operations, as previously described, when group balancing operations are not required. Depression of keys release key 804 will open contacts 986 to deengize R30 relay to restore the machine to normal group balancing operations.

Means for locking ten-key keyboard under certain conditions

It is desirable to prevent operation of the ten-key keyboard when certain conditions exist, as will now be described.

It was explained that when any arm 164 is operated by a ten-key 160 it passes between a series of disks 206 to lock out the other keys (see Fig. 11). Referring now to Fig. 11a it will be observed that when a magnet 1390 is energized it attracts its armature 1381 to project an extension 1382 which is the width of an arm 164 in between said disks 206 to lock the ten keys. Referring now to the wiring diagram of Fig. 64b, the circuit to magnet 1390 is completed by:

Contacts R36d which are closed when any total key 801, 802, 803 is depressed to thus prevent operation of the ten-key keyboard with any total key 801, 802, 803;

Contacts R26d to lock the ten-key keyboard when a disagreement between RO1 and RO2 is found;

Contacts R13b which are closed to lock the ten-key keyboard when the progressive total key 807 is depressed, and also by R10a contacts when the latter are closed by energization of R10H relay coil effected upon detecting failure of a check to feed as will now be explained.

It will also be recalled that when either the group total key 802, or motor release bar 175 was depressed the R4 relay was energized. In shunt therewith is the R10PL relay coil which also closes the R10a contacts to lock the ten-key keyboard when the machine is being cycled as a result of the depression of the key 802 or motor release bar 175.

This will prevent operation of the ten-key keyboard when any of such conditions exist so that the next cycle can be used to feed the check which should have fed in the first cycle.

Multiple entries without requiring feeding of a check for each entry cycle

From the previous description it is evident that if a check fails to feed through the check feeding mechanism the ten-key keyboard is locked against operation in the second cycle that such check is fed. It is desirable at times to enable the repeated operation of the ten-key keyboard without feeding a check each time that a desired compartment totalizer 390 and related sorting compartment are selected by a particular selector key 40 which is effected herein by suppressing the locking of the ten-key keyboard by the normal pickup of the R10H relay to energize magnet 1390. This is especially useful when the operator desires to enter a series of amounts in the same compartment totalizer 390 taken from one deposit ticket, or other document, and which is fed into the related sorting compartment at the termination of the amount entries and in the last entry cycle.

To so condition the machine a plug connection 1402 (Fig. 64c) is made from the plug socket 1371 of such selector key 40 to a plug socket 1403 to energize the R17H relay coil which is held energized as long as the same selector key 40 is held depressed. A holding circuit for R17P relay coil is from line side 200, R17P relay coil, R17a relay contacts, and cam contacts C9 which hold R17P energized to nearly the end of the cycle. While the check sensing magnet circuit to R8 relay coil is effective in the first entering cycle to energize the R8PU relay coil (Fig. 64b), the opening of R17b relay contacts prevents the energization of the R10H relay coil, and lighting of signal night 1391. Since R10a relay contacts (Fig. 64b) do not close, the ten-key keyboard lock magnet 1390 is not energized and the ten-key keyboard can be used for successive entry cycles. However, R8 relay opens its R8b and R8d contacts (Fig. 64a) to prevent changing the position of the sorting drum, and the latter stays in the selected position until the deposit ticket is fed. When the operator reads the last amount on the deposit ticket and sets it up on the ten-key keyboard he places it in the check feeding chute so that it is fed into the selected compartment in the last entry cycle.

Feeding of the deposit ticket or document releases R8 relay, and a new sorting drum position can now be derived.

*Disabling mechanism for group totalizer and grand totalizer*

By means of selective plug circuits the group totalizer 451 and grand totalizer 450 may be prevented from engaging their respective racks 384 and 383 (Figs. 18a and 18b) during an entering operation to thereby suppress entries. This arrangement is under control of the operator and it is specially useful when it is desired that when certain compartment totalizers are selected for operation the group or grand totalizer will not receive the entered items.

Referring to Fig. 44 it will be seen that this control for group totalizer 451 comprises a solenoid 1405 carrying a pin 1406 on its core which is over a tail 1407 of the bell crank 457GD which, it will be recalled, determines by its position whether the totalizer is to be actuated or nonactuated by its racks 383. The energization of solenoid 1405 will rock the bell crank 457GD, thus positioning the control stud 412GD so that it is in a neutral position, preventing rocking of the group totalizer 451 by the adding engaging slide 410. In the same manner a solenoid 1408 (Fig. 21b) is adapted to rock bell crank 457GP to prevent engagement of the group totalizer 451 with the respective actuating racks 384. The above mentioned solenoids 1405 and 1408 are selected for operation by selective plugging means now to be described in connection with the wiring diagram. Solenoid 1405 (Fig. 64f) for controlling the grand totalizer 450 is selected for operation by closure of the R33b contacts, whereas the solenoid 1408 controlling the group totalizer 451 is selected for operation when R33b relay contacts (Fig. 64f) are closed. Closure of either of these contacts or both completes a circuit from the line side 200, through the respective solenoid 1405 or 1408, the closed contacts R33b or R32b, cam contacts C16, to the line side 202. Cam contacts C16 are timed to energize the selected solenoid between 160 and 325° so that prior to the time that the group or grand totalizer would be normally moved by the adding engaging slide 410, associated bell cranks 457GP and 457GD will position pins 412GP and 412GD to a neutral position. Closure of contacts R32b and R33b is effected by respective relays R32 and R33 (see Fig. 64c). By means of plug connections 1410 or 1411 from a plug socket 1371 related to the selector key 40 which is depressed when a certain compartment totalizer is selected for operation to plug sockets 1412 and 1413, either the R32 or the R33 relay coils or both may be selectively energized. The energized coils close the R32a and R33a contacts to pick up the R32P and R33P relay coils providing a holding circuit for the respective relay, through the C9 cam contacts back to line side 202. Said relays close the aforementioned contacts R33b and R32b (Fig. 64f) to energize the respective controlling solenoids 1405 and 1408. This arrangement is fully selective so that at the option of the operator when a compartment totalizer is selected by the depression of the selector key that selector key will prevent the engagement of either the group totalizer 451 or grand totalizer 450, or both.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a combined check sorting and accounting machine, a totalizer to which a total is transferred, a deposit ticket receiving compartment for receiving a deposit ticket having a series of amounts and a total written thereon presumably agreeing with the total transferred, means for feeding said deposit ticket into said deposit ticket receiving compartment, a group totalizer, an amount entering keyboard, means under control of said keyboard to enter by successive cyclic operations of the machine said amounts represented on said deposit ticket in said group totalizer to represent a group or deposit ticket total, storage means settable under control of said keyboard for representing a group or deposit ticket total presumably agreeing with the group or deposit ticket total in said group totalizer, means for initiating a total taking cycle of operation, means for comparing the group total on said storage means with the deposit ticket total on said group totalizer, means controlled by said total taking initiating means to cause during the total taking cycle the operation of said comparing means and simultaneously said deposit ticket feeding means to feed the deposit ticket in said compartment, means controlled by said comparing means to effect, upon an agreement, a transfer of the total on said group totalizer to said first named totalizer which represents the total on said deposit ticket, means cooperating with said deposit ticket feeding means for detecting the failure to feed said deposit ticket into the compartment, means for locking said keyboard, and means controlled by said detecting means to cause said locking means to lock said keyboard upon detecting the failure to feed said deposit ticket to thereby prevent further amount entries represented by another deposit ticket in said group totalizer.

2. In a combined check sorting and accounting machine, a totalizer which is normally out of position to receive a total transferred thereto, a deposit ticket receiving compartment for receiving a deposit ticket having a series of amounts and a total written thereon presumably agreeing with the total transferred, means for selecting and positioning said totalizer to receive a transferred total, a group totalizer, an amount entering keyboard, means under control of said keyboard to enter by successive cyclic operations of the machine said amounts represented on said deposit ticket in said group totalizer to represent a group or deposit ticket total, storage means settable under control of said keyboard for representing a group or deposit ticket total presumably agreeing with the group deposit ticket total in said group totalizer, means to initiate a total taking cycle of operation, means to transfer a total from said group totalizer to said first named totalizer, means for comparing the group total on said storage means with the deposit ticket total on said group totalizer, means for feeding a deposit ticket in said deposit ticket receiving compartment, means controlled by said total taking initiating means for taking a total from said group totalizer in a total taking cycle, for causing the operation of said comparing means and for effecting the operation of said deposit ticket feeding means during said total taking cycle, means controlled by said comparing means upon detecting an agreement for causing the operation of said total transfer means, means cooperating with said feeding means for detecting the failure to feed a check into the compartment, means controlled by said total taking initiating means to disable the detecting means during the first total taking cycle, and means controlled by said selecting and positioning means when said first named totalizer is selected and positioned to receive a transferred total to render said disabling means ineffective during said total taking cycle whereby said detecting means detects the failure to feed the deposit ticket into the compartment.

3. In a combined check sorting and accounting machine, a deposit ticket receiving compartment for receiving a deposit ticket having a series of amounts thereon and a total of all checks written thereon, means for feeding a deposit ticket into said compartment, means for printing data on said deposit ticket as said ticket is fed in the said compartment, a group totalizer, an amount entering keyboard, means under control of said keyboard to enter by successive cyclic operations of the machine the series of amounts on said deposit ticket in said group totalizer to represent said group or deposit ticket total, means for taking a total from said group totalizer in a total taking cycle of operation, means for initiating a total taking cycle of operation at the end of a series of check amount entering operations related to said deposit ticket, means controlled by said total taking initiating means for causing the operation of the means for taking a total from said group totalizer, said deposit ticket feeding means and said means for printing data on said deposit ticket in the same total taking cycle, means for detecting the failure to feed a deposit ticket into the compartment, further means for detecting the failure of operation of said printing means to print data on the deposit ticket as the latter is fed into said compartment, and signal means controlled by both of the aforesaid detecting means for manifesting the failure to feed either the check into the compartment or to print the data thereon.

4. In an accounting machine, a group totalizer, a manually operable amount entering keyboard, means under control of said keyboard to enter by successive cyclic operations of the machine successive amounts in said group totalizer, amount representing means settable under control of said keyboard and settable to represent an operator setup group total presumably agreeing with the group total in said totalizer, said amount representing means representing zeros when said keyboard is unoperated prior to a normal group total taking and non-comparing cycle, means for comparing a group total in said group totalizer with the amount set on said amount representing means during each group total taking cycle whether said amount representing means represents zeros or an operator setup group total, means operable when a group total is set up on said amount representing means by the operator for causing the operation of said comparing means, and operator controlled means to prevent said last named means from causing said comparing means to be effective to compare the zeros set up on the representing means with the group total on said group totalizer in a normal group total taking cycle.

5. In an accounting machine, a group totalizer, an amount entering keyboard, means under control of said keyboard to enter by successive cyclic operations of the machine successive amounts in said group totalizer, amount representing means settable under control of said keyboard and settable to represent an operator setup group total presumably agreeing with the group total in said totalizer, said amount representing means representing zeros when said keyboard is unoperated prior to a normal group total taking and non-comparing cycle, means for comparing a group total in said group totalizer with the amount set on said amount representing means during each total taking whether said amount representing means represents zeros or an operator setup group total, a key, means controlled by said key and operable when a group total is set up on said amount representing means by the operator under control of said keyboard for causing the operation of said comparing means, and operator controlled means to prevent said key if it is inadvertently operated prior to a normal total taking cycle from causing said comparing means to be effective to compare the zeros set up on the representing means with the group total on said group totalizer in a normal group total taking cycle.

6. In a combined check sorting and accounting machine, a check receiving compartment, means for feeding a check into said compartment, a compartment selecting key adapted when operated to be retained operated, means controlled by said key to position said compartment for receiving a check, means for sensing and detecting the failure to feed a check into said compartment, an amount entering keyboard, a totalizer associated with said check receiving compartment, entering means under control of said keyboard to enter an amount represented on each check into said totalizer, means operable in a cyclic operation of the machine to effect the operation of the check feeding means to feed a check into the check receiving compartment and concomitantly effect the entry in the totalizer, means for locking said keyboard to prevent its operation, means controlled by said sensing and detecting means to normally cause upon failure to feed a check in the check receiving compartment said locking means to lock said keyboard, and means rendered operable by said compartment selecting key upon its operation and retained operation to render said means controlled by said sensing and detecting means from being effective to cause said locking means to lock said keyboard upon failure to feed a check into said compartment, thereby permitting as long as said compartment selecting key is retained depressed and said keyboard locking means is ineffective multiple entries in said totalizer under control of the keyboard without requiring the feeding of a check for each entry operation.

7. In a combined check sorting and accounting machine, a plurality of check receiving compartments, an amount entering keyboard, a plurality of totalizers associated with said check receiving compartments, a plurality of compartment and totalizer selecting keys, means controlled by each key for selecting a desired totalizer and an associated check receiving compartment, check feeding means for feeding a check in a selected compartment, entering means under control of said keyboard to enter an amount represented on each check into said totalizer, means operable in a cyclic operation of the machine to effect the operation of the check feeding means to feed a check into the selected compartment and concomitantly effect the entry by said entering means in the selected and associated totalizer, locking means for said keyboard to prevent its operation, means for sensing and detecting the failure to feed a check into the selected compartment, means controlled by said sensing and detecting means to cause upon failure to feed a check into the selected compartment said locking means to lock said keyboard, means for causing said preceding means to be ineffective to cause said locking means to lock said keyboard upon failure to feed a check, and selecting means operatively associating said last named means with selected compartment and totalizer selecting keys for causing said last named means to be effective upon the operation of certain compartment and totalizer selecting keys, thereby permitting multiple entries in selected totalizers without requiring the feeding of a check in the related compartments for each entry.

References Cited in the file of this patent

UNITED STATES PATENTS

| Number | Name | Date |
| --- | --- | --- |
| 1,870,073 | Shipley et al. | Aug. 2, 1932 |
| 1,989,840 | Armbruster | Feb. 5, 1935 |
| 2,116,653 | Armbruster | May 10, 1938 |
| 2,142,352 | Fuller et al. | Jan. 3, 1939 |
| 2,146,695 | Brand et al. | Feb. 7, 1939 |
| 2,343,268 | Wheeler | Mar. 7, 1944 |
| 2,545,649 | Capellaro | Mar. 20, 1951 |